US008624699B2

(12) United States Patent
Hunter et al.

(10) Patent No.: US 8,624,699 B2
(45) Date of Patent: Jan. 7, 2014

(54) ELECTRIC COIL AND METHOD OF MANUFACTURE

(75) Inventors: Ian W. Hunter, Lincoln, MA (US); Timothy A. Fofonoff, Cambridge, MA (US)

(73) Assignee: Nucleus Scientific, Inc., Lincoln, MA (US)

( * ) Notice: Subject to any disclaimer, the term of this patent is extended or adjusted under 35 U.S.C. 154(b) by 675 days.

(21) Appl. No.: 12/590,493

(22) Filed: Nov. 9, 2009

(65) Prior Publication Data
US 2011/0109413 A1    May 12, 2011

(51) Int. Cl.
*H01F 5/00* (2006.01)
*H01F 27/29* (2006.01)
*H01F 27/28* (2006.01)

(52) U.S. Cl.
USPC ............ 336/200; 336/192; 336/225; 336/232

(58) Field of Classification Search
USPC .................................. 336/192, 200, 225, 232
See application file for complete search history.

(56) References Cited

U.S. PATENT DOCUMENTS

| | | | |
|---|---|---|---|
| 3,118,432 A | 1/1964 | Perterson | |
| 3,289,886 A | 12/1966 | Goldsholl et al. | |
| 3,575,341 A | 4/1971 | Tarver | |
| 3,964,450 A | 6/1976 | Lockshaw | |
| 4,228,373 A | 10/1980 | Funderburg | |
| 4,253,079 A * | 2/1981 | Brosh | 336/200 |
| 4,345,174 A | 8/1982 | Angus | |
| 4,384,221 A | 5/1983 | Brandly | |
| 4,473,763 A | 9/1984 | McFarland | |
| 4,486,667 A | 12/1984 | Srogi | |
| 4,503,751 A | 3/1985 | Pinson | |
| 4,507,579 A | 3/1985 | Turner | |
| 4,981,309 A | 1/1991 | Froeschle et al. | |
| 5,036,930 A | 8/1991 | Bisel et al. | |
| 5,179,365 A * | 1/1993 | Raggi | 336/65 |
| 5,276,372 A | 1/1994 | Hammer | |
| 5,631,507 A | 5/1997 | Bajric et al. | |
| 5,685,798 A | 11/1997 | Lutz et al. | |
| 6,113,119 A | 9/2000 | Laurent et al. | |
| 6,218,925 B1 * | 4/2001 | Iwao | 336/200 |

(Continued)

FOREIGN PATENT DOCUMENTS

| | | |
|---|---|---|
| EP | 0 435 461 A2 | 7/1991 |
| EP | 0 616 412 A1 | 9/1994 |

(Continued)

OTHER PUBLICATIONS

Unpublished U.S. Appl. No. 12/590,495, filed Nov. 9, 2009, Ian W. Hunter.

(Continued)

*Primary Examiner* — Tsz Chan
(74) *Attorney, Agent, or Firm* — Hamilton, Brook, Smith & Reynolds, P.C.

(57) ABSTRACT

Instead of being made from one continuous piece of material, a coil includes multiple flat coil segments that are stacked together and electrically coupled in series. In many embodiments, the coil segments are U-shaped segments, and the segments are arranged so that each segment is rotated (e.g., by 270 degrees) with respect the segment it follows. The stacked coils may then be fastened together using, for example, bolts through the corners of the coil segments. The combined coil segments form a continuous coil.

25 Claims, 52 Drawing Sheets

(56) References Cited

U.S. PATENT DOCUMENTS

| | | | |
|---|---|---|---|
| 6,239,683 B1* | 5/2001 | Roessler et al. | 336/200 |
| 6,291,901 B1 | 9/2001 | Cefo | |
| 6,321,863 B1 | 11/2001 | Vanjani | |
| 6,328,123 B1 | 12/2001 | Niemann et al. | |
| 6,552,450 B2 | 4/2003 | Harty et al. | |
| 6,675,462 B1* | 1/2004 | Takahashi | 29/602.1 |
| 6,852,061 B2 | 2/2005 | Schoon | |
| 6,948,578 B2 | 9/2005 | Prucher | |
| 6,974,399 B2 | 12/2005 | Lo | |
| 7,059,437 B2 | 6/2006 | Heinen | |
| 7,108,090 B2 | 9/2006 | Turner | |
| 7,150,340 B2 | 12/2006 | Beck et al. | |
| 7,156,196 B2 | 1/2007 | Katsaros | |
| 7,249,643 B2 | 7/2007 | Etzioni et al. | |
| 7,347,427 B2 | 3/2008 | Heinen | |
| 7,357,743 B2 | 4/2008 | Mao et al. | |
| 7,557,473 B2 | 7/2009 | Butler | |
| 2003/0034697 A1 | 2/2003 | Goldner et al. | |
| 2003/0234585 A1 | 12/2003 | Tu | |
| 2004/0198170 A1 | 10/2004 | Tilbor et al. | |
| 2005/0164528 A1 | 7/2005 | Furguth | |
| 2005/0173851 A1 | 8/2005 | Lloyd | |
| 2005/0212640 A1* | 9/2005 | Chiang et al. | 336/200 |
| 2005/0252706 A1 | 11/2005 | Thomas | |
| 2006/0071561 A1 | 4/2006 | Chiu et al. | |
| 2007/0090697 A1 | 4/2007 | Bittner | |
| 2007/0176722 A1* | 8/2007 | Podlisk et al. | 336/200 |
| 2008/0023237 A1 | 1/2008 | Houle | |
| 2008/0093913 A1 | 4/2008 | Katsaros | |
| 2009/0090334 A1 | 4/2009 | Hyde et al. | |
| 2009/0091196 A1 | 4/2009 | Cooper | |
| 2010/0253465 A1 | 10/2010 | Yeh | |
| 2011/0108339 A1 | 5/2011 | Hunter | |
| 2011/0109051 A1 | 5/2011 | Hunter | |
| 2011/0109174 A1 | 5/2011 | Hunter | |

FOREIGN PATENT DOCUMENTS

| | | | |
|---|---|---|---|
| EP | 1 587 135 A1 | 10/2005 | |
| EP | 1 607 251 A1 | 12/2005 | |
| EP | 1 848 014 A1 | 10/2007 | |
| GB | 2 065 983 A | 7/1981 | |
| GB | 2 344 223 A | 5/2000 | |
| JP | 04 175530 A | 6/1992 | |
| JP | 2006 050853 A | 2/2006 | |
| WO | WO 02/095912 A1 | 11/2002 | |
| WO | WO 2008/010669 A1 | 1/2008 | |
| WO | WO 2011/057051 A1 | 5/2011 | |
| WO | WO 2011/057052 A1 | 5/2011 | |
| WO | WO 2011/057070 A2 | 5/2011 | |
| WO | WO 2011/057071 A1 | 5/2011 | |

OTHER PUBLICATIONS

Unpublished U.S. Appl. No. 12/590,496, filed Nov. 9, 2009, Ian W. Hunter.

Unpublished U.S. Appl. No. 12/590,494, filed Nov. 9, 2009, Ian W. Hunter.

Invitation to Pay Additional Fees and, Where Applicable, Protest Fee and Annex to Form PCT/ISA/206 Communication Relating to the Results of the Partial International Search Report from PCT/US2010/055616, 8 pages, Date of mailing Feb. 11, 2011.

Notification of Transmittal of the International Search Report and the Written Opinion of the International Searching Authority, or the Declaration, International Search Report and Written Opinion in International Application No. PCT/US2010/055581, 12 pages, mailed Feb. 22, 2011.

Notification of Transmittal of the International Search Report and the Written Opinion of the International Searching Authority, or the Declaration, International Search Report and Written Opinion in International Application No. PCT/US2010/055582, 13 pages, mailed Feb. 21, 2011.

Notification of Transmittal of the International Search Report and the Written Opinion of the International Searching Authority, or the Declaration, International Search Report and Written Opinion in International Application No. PCT/US2010/055619, 9 pages, mailed Jan. 31, 2011.

Notification of Transmittal of The International Search Report and The Written Opinion of the International Searching Authority, for International Application PCT/US2010/055616, 19 pages, mailed on May 27, 2011.

Muetze, A., and Tan, Y. C., Performance Evaluation of Electric Bicycles, Fourth IAS Annual Meeting, Conference Record of the 2005 [online] 2005 [retrieved on Jul. 8, 2009] Retrieved from the Internet URL: http://www.ieeexplore.ieee.org.

Zapworld, ZAPPY3 Takes Scooters to the Next Dimension [online] 2004 Retrieved from the Internet URL: http://www.zapworld.com/node/93.

Frost & Sullivan, "Overview of Electric Vehicles Market and Opportunities for Supply of Electric Motors," 13 pages (Jul. 26, 2009).

Office Action, U.S. Appl. No. 12/590,496, Date of mailing: Jan. 18, 2012.

\* cited by examiner

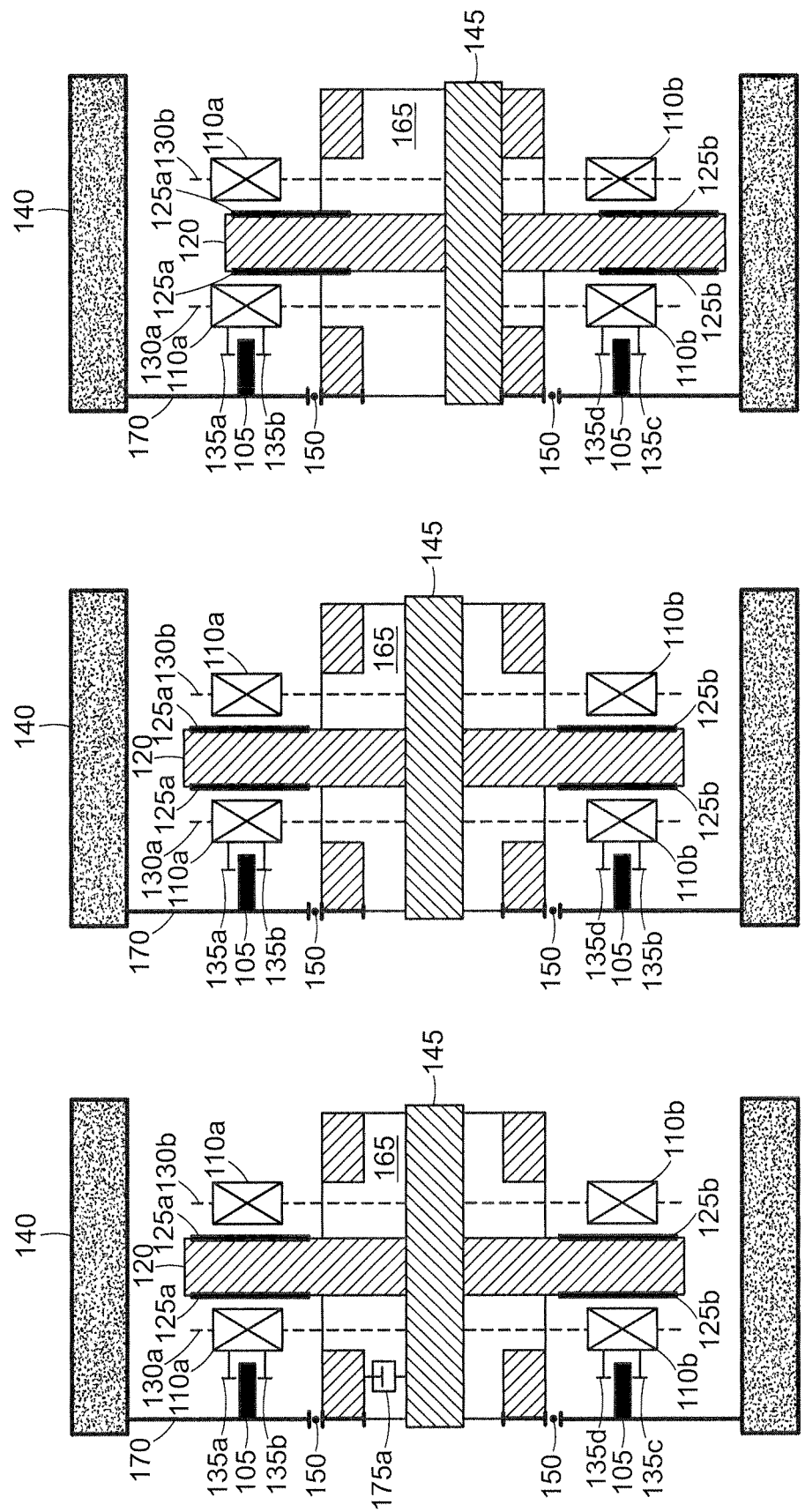

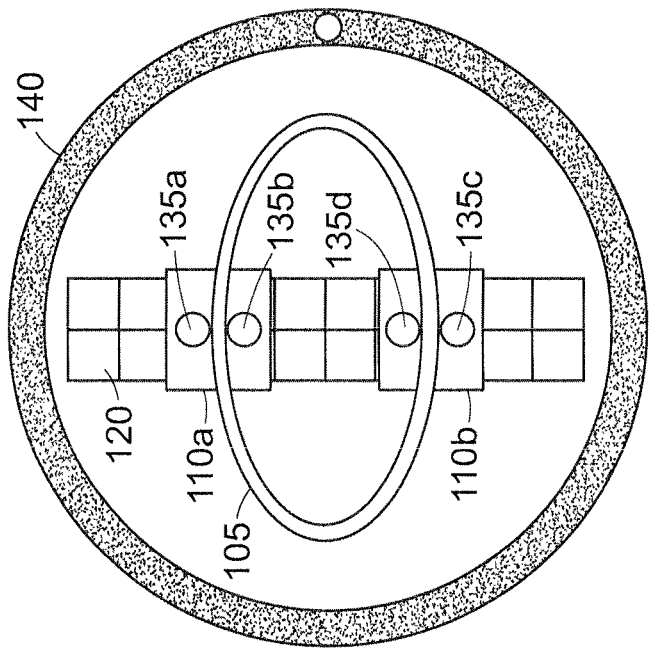
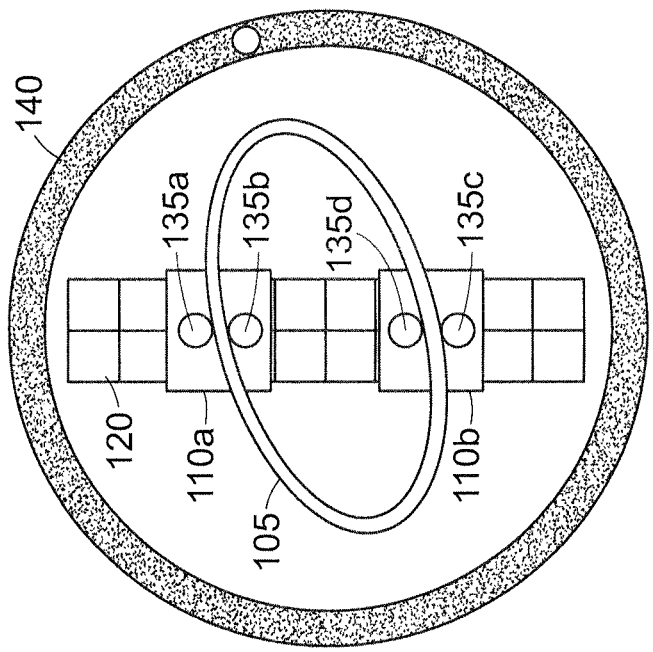

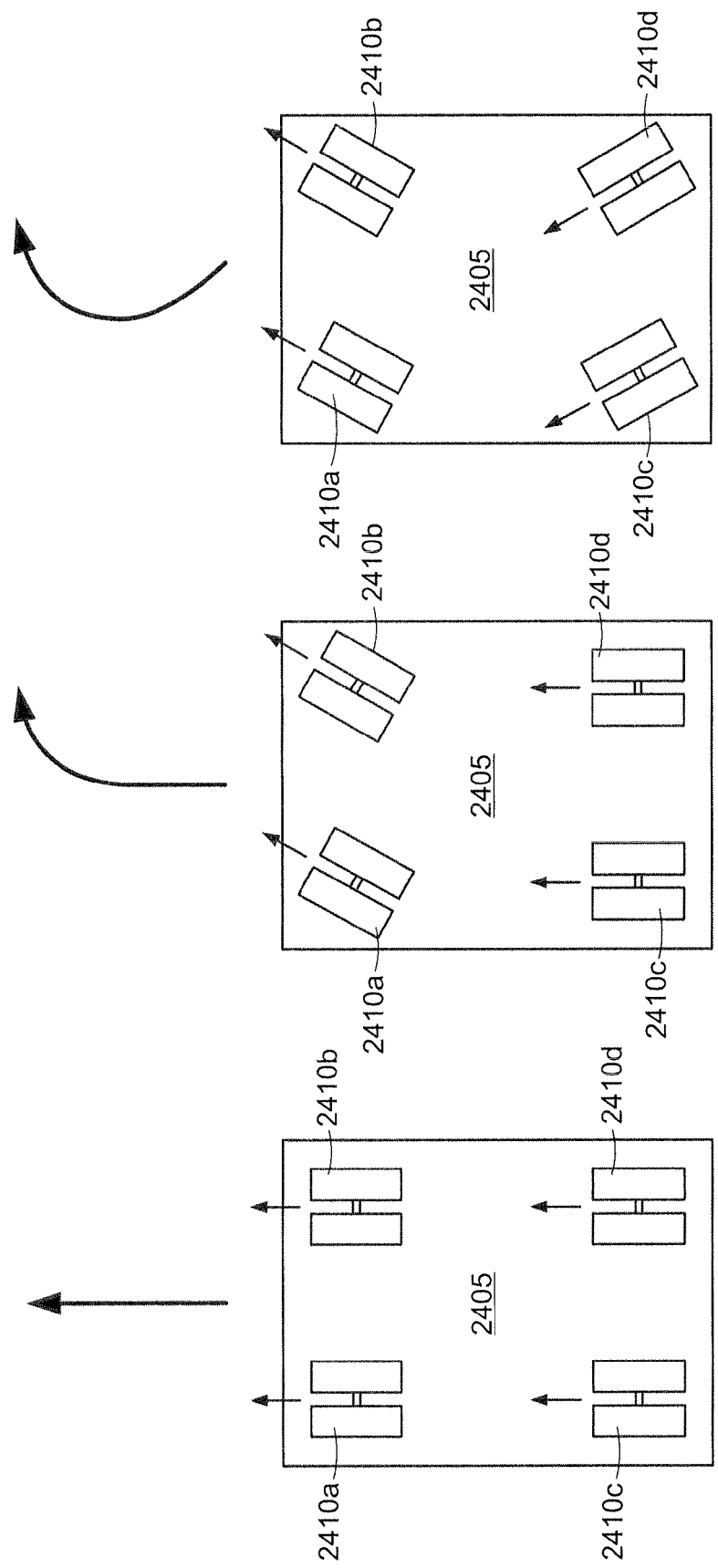

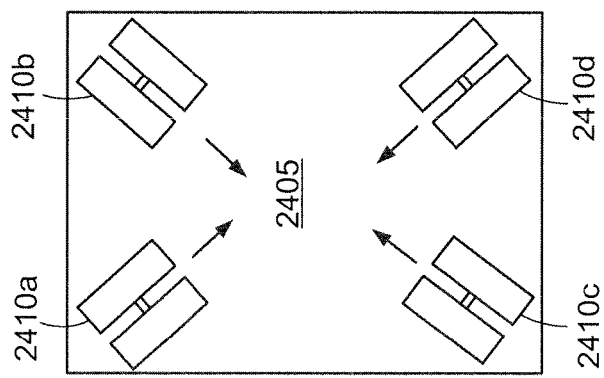
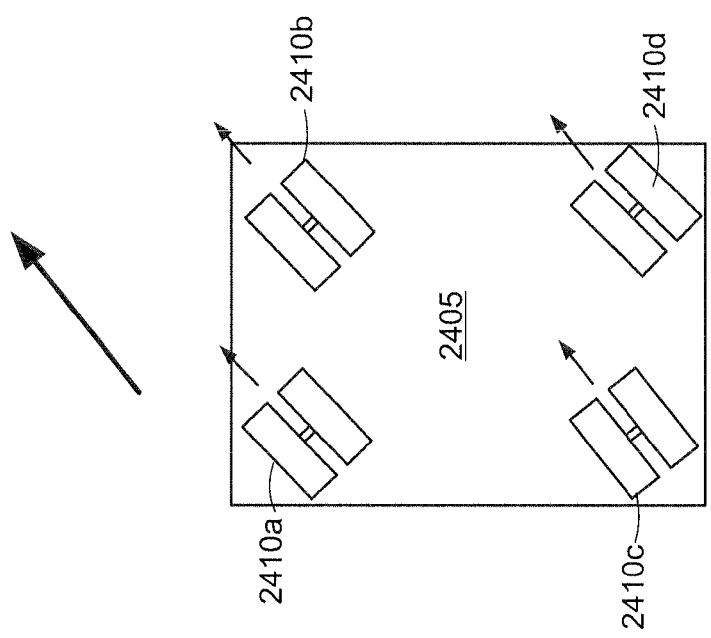
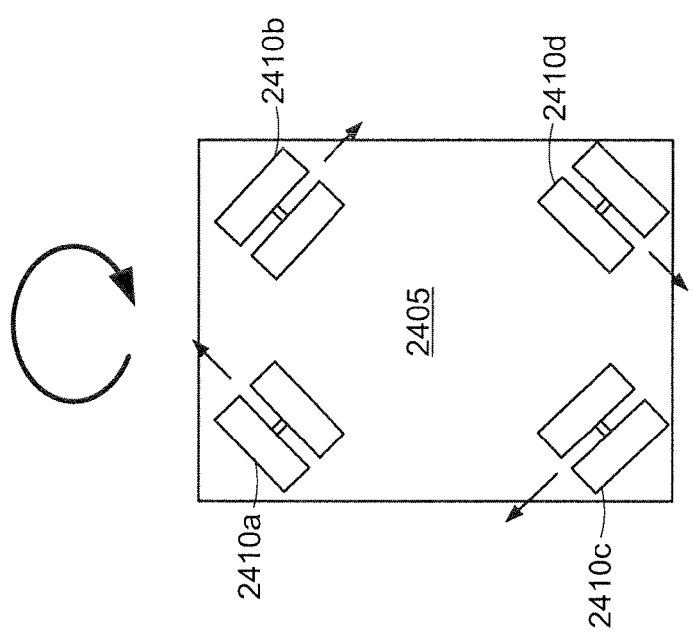

ELECTRIC COIL AND METHOD OF MANUFACTURE

BACKGROUND OF THE INVENTION

Electric motors convert electrical energy to mechanical energy through the interaction of magnetic fields and a current-carrying medium, which is typically a coiled wire. Electric generators convert mechanical energy to electrical energy by forcing electric charges to move through an electrical circuit, which is also typically a coiled wire.

SUMMARY OF THE INVENTION

Coils used with electric motors or generators typically consist of a single continuous piece of material wound into a coil. Manufacture of a flat, square cross-section coil can be very expensive if made from one continuous piece of material. Instead of being made from one continuous piece of material, an electric coil may include multiple flat coil segments stacked together and electrically coupled in series, where each coil segment is rotated with respect to the coil segment it follows in the stack. Manufacturing of the coil segments may be much less expensive, and the segments can be combined into a single coil. For example, each coil segment may be U-shaped and may be rotated 270 degrees with respect to the coil segment it follows in the stack of coil segments. A method of manufacturing such an electric coil includes fabricating multiple flat coil segments, stacking together and electrically coupling the multiple coil segments in series where each coil segment is rotated with respect to the coil segment it follows, and fastening the coil segments together to form the electric coil.

The coil segments may be inexpensively formed by stamping or etching and bending the coil segments from a flat sheet of metal, for example. All sides of a coil segment may be equal in length or, alternatively, adjacent sides of a coil segment may be different lengths while opposite sides of the coil segment may be equal lengths. The coil may further include electrically-insulating material on portions of the coil segments. In a stack of coils segments, for example, all surfaces of the coil segments may be coated with an electrically-insulating layer of material except for the top surface of the finishing end of a lower coil segment in the stack and the bottom surface of the starting end of an immediately upper coil segment in the stack. The segments may be fastened together using bolts, for example, that may be inserted through the corners of the coil segments. A layer of electrically-insulating material may also cover the bolts. When assembled, electrically-insulating spacers may be placed in any gaps between the coil segments.

This application relates to U.S. patent application titled "ELECTRIC MOTOR" by inventor Ian W. Hunter Ser. No. 12/590,495 , U.S. patent application titled "ELECTRIC GENERATOR" by inventor Ian W. Hunter, Ser. No. 12/590, 496 and U.S. patent application titled "TUNABLE PNEUMATIC SUSPENSION" by inventor Ian W. Hunter. Ser. No. 12/590,494. These applications are being filed concurrently with the present application, and the contents of these applications are incorporated herein by reference in their entirety.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 1D-1F illustrate cross-sections of example rotary devices.

FIGS. 2E-2H illustrate an example rotary device in action and coupled to a wheel.

FIGS. 24A-24F illustrate a top view of a vehicle having four pairs of rotary devices with respective wheels.

DETAILED DESCRIPTION OF THE INVENTION

A description of example embodiments of the invention follows.

Figure 1A:
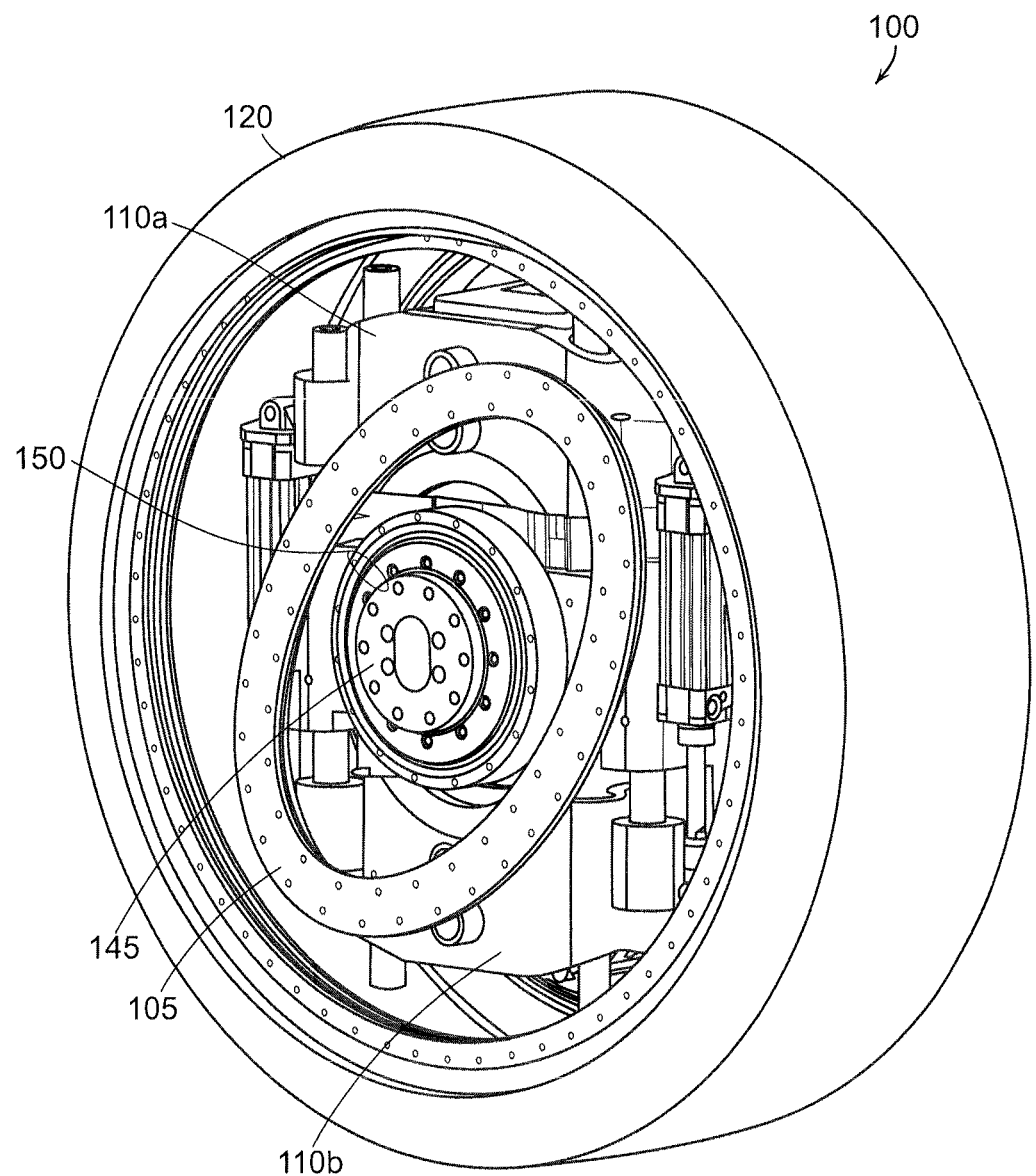
FIGS. 1A and 1B illustrate example rotary devices.

FIG. 1A shows an example rotary device 100 inside a wheel. The device includes a magnetic stator assembly 120, opposed electromagnetic actuators 110a, 110b, and a linear-to-rotary converter (e.g., cam) 105. The device may be attached to the chassis of a vehicle, for example, at a point on the far side of the wheel (not shown). The rotary device depicted inside the wheel may be attached to the wheel via the cam 105 using a circular plate, for example, which has been removed to show the inside of the wheel. Such a plate may be attached to both the rim of the wheel and the cam 105 using fasteners, such as bolts. The wheel and cam support plate rotate relative to a hub 145 about a bearing 150. It is important to note that the cam 105 is shown as an oval shape, but may take other forms, such as, for example, a cam having multiple lobes.

Figure 1B:
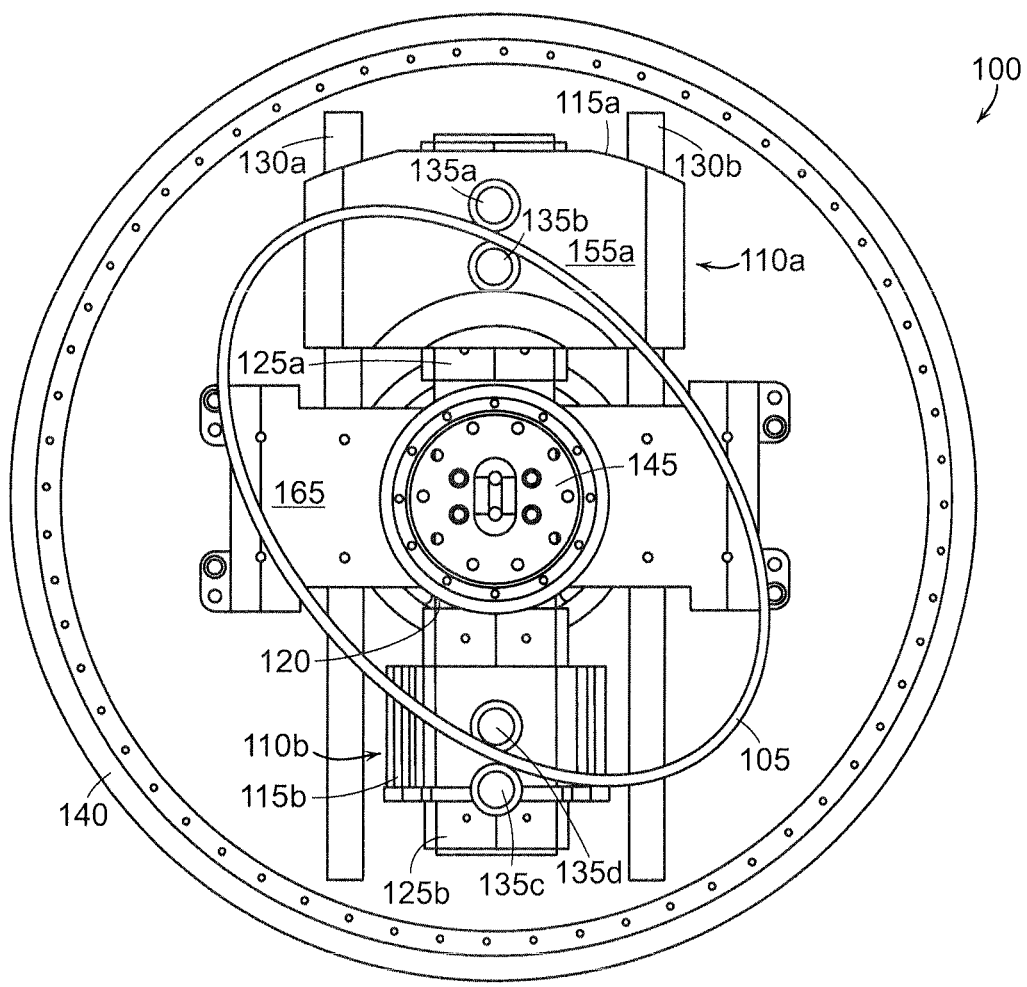

FIG. 1B shows the example rotary device 100 from the side of the wheel 140 and with the tire of the wheel 140, and some other components, removed. The core of the rotary device includes the cam 105, two opposed electromagnetic actuators 110a, 110b, and magnetic stator assembly 120. The electromagnetic actuators 110a, 110b each include a coil 115a, 115b that is arranged to reciprocate relative to the magnetic stator assembly 120. One electromagnetic actuator 110a is shown having a housing 155a surrounding its coil 115a and the other electromagnetic actuator 110b is shown with its housing removed to show its coil 115b.

The magnetic stator assembly 120 depicted in FIG. 1B is oriented vertically and may include a plurality of magnetic stators 125a, 125b. Each of the magnetic stators 125a, 125b may include a single magnet or multiple magnets. As current is applied to the coils 115a, 115b of the electromagnetic actuators 110a, 110b (e.g., alternating current), the actuators 110a, 110b are forced to reciprocate vertically along the magnetic stator assembly 120 due to the resulting electromagnetic forces. As known in the art, when a coil carrying an electrical current is placed in a magnetic field, each of the moving charges of the current experiences what is known as the Lorentz force, and together they create a force on the coil. As depicted, the rotary device 100 may include a plurality of shafts 130a, 130b, coupled to a bearing support structure 165. The electromagnetic actuators 110a, 110b may slide along the shafts using, for example, linear bearings. Other bearings that may be used include air bearings, silicon nitride bearings, graphite bearings, and linear recirculating ball bearings. Attached to each electromagnetic actuator 110a, 110b may be a pair of followers 135a-d used to interface with the cam 105. To reduce friction, the followers 135a-d may spin to roll over the surfaces of the cam 105. The followers 135a-d may be attached to the electromagnetic actuators 110a, 110b via, for example, the actuators' housings. As the electromagnetic actuators 110a, 110b reciprocate, the force exerted by the followers 135a-d on the cam 105 drives the cam 105 in rotary motion.

Figure 1C:
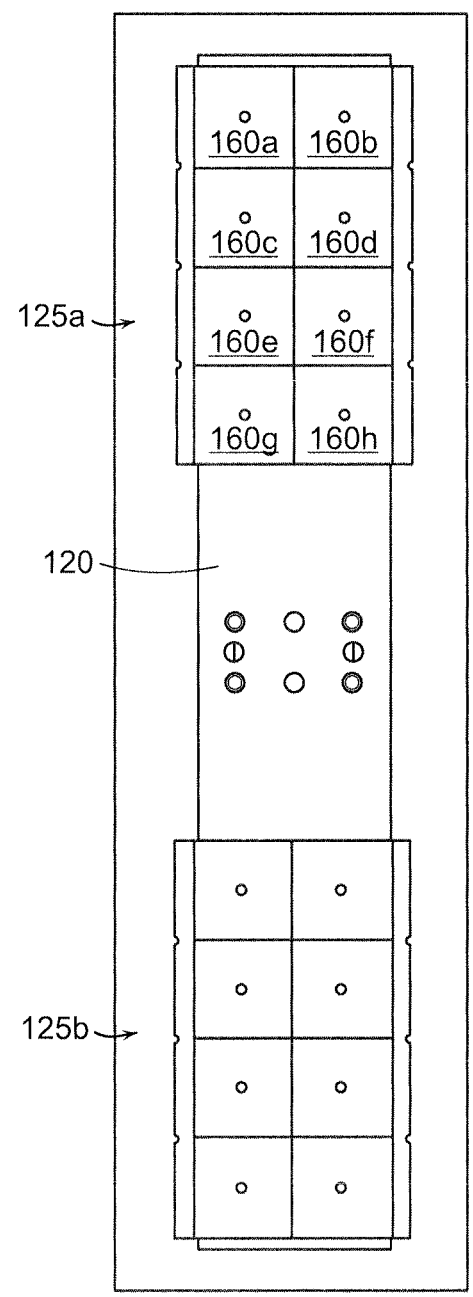
FIG. 1C illustrates an example magnetic stator assembly.

FIG. 1C illustrates an example magnetic stator assembly 120 with two magnetic stators 125a, 125b. The magnetic stators 125a, 125b each include multiple magnets. For example, magnetic stator 125a includes, on one surface of the stator 125a, eight magnets 160a-h.

FIGS. 1D-1F illustrate simplified cross-sections of example rotary devices. The device of FIG. 1D is within a wheel 140 of a vehicle and includes a hub (or mount) 145 coupled to a magnetic stator assembly 120 having two magnetic stators 125a, 125b. Also shown are two electromagnetic actuators (including coils) 110a, 110b that reciprocate relative to the magnetic stator assembly 120 along shafts 130a, 130b (shown as dashed lines). The shafts 130a, 130b are coupled to a bearing support structure 165, keep the components of the device in vertical alignment, and prevent the wheel 140 from falling off of the device. A cam plate 170 coupled to the wheel 140 is rotably coupled to the bearing support 165 through a bearing 150. Affixed to the cam plate 170 is a cam 105 used to drive the plate 170 and, thus, the wheel 140 in rotary motion. The cam 105 is driven by the reciprocation of the electromagnetic actuators 110a, 110b using followers 135a-d that are coupled to the electromagnetic actuators 110a, 110b and that interface with the cam 105. Also included in the example device is a fluid damper 175a coupling the bearing support 165 and the mount 145. The fluid damper 175a suspends the mount 145 above the ground and may allow for some movement between the bearing support 165 and the mount 145, depending on the amount of resistance of the damper. For example, if the damper is a pneumatic damper, higher gas pressures inside the chambers of the damper allow for less movement than lower air pressures.

FIG. 1E illustrates that in the absence of the fluid damper 175a, the electromagnetic forces caused by the electromagnetic actuators 110a, 110b and magnetic stators 125a, 125b may suspend the mount 145 above the ground. If, however, electrical current is removed from the electromagnetic actuators 110a, 110b, the associated electromagnetic forces will also be removed and the mount 145 may drop toward the ground, along with the magnetic stator assembly 120 and vehicle chassis, as illustrated in FIG. 1F.

Figure 2A:
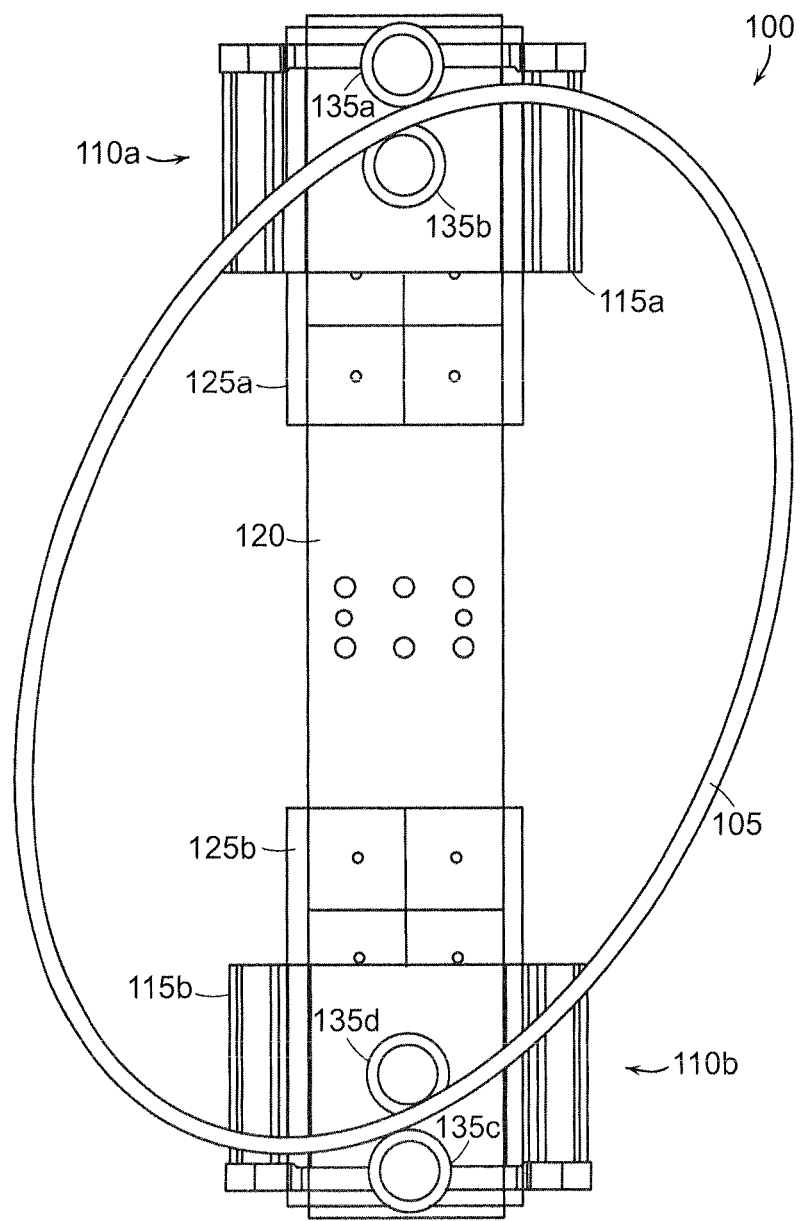
FIGS. 2A-2C illustrate components of an example rotary device in action.
Figure 2B:
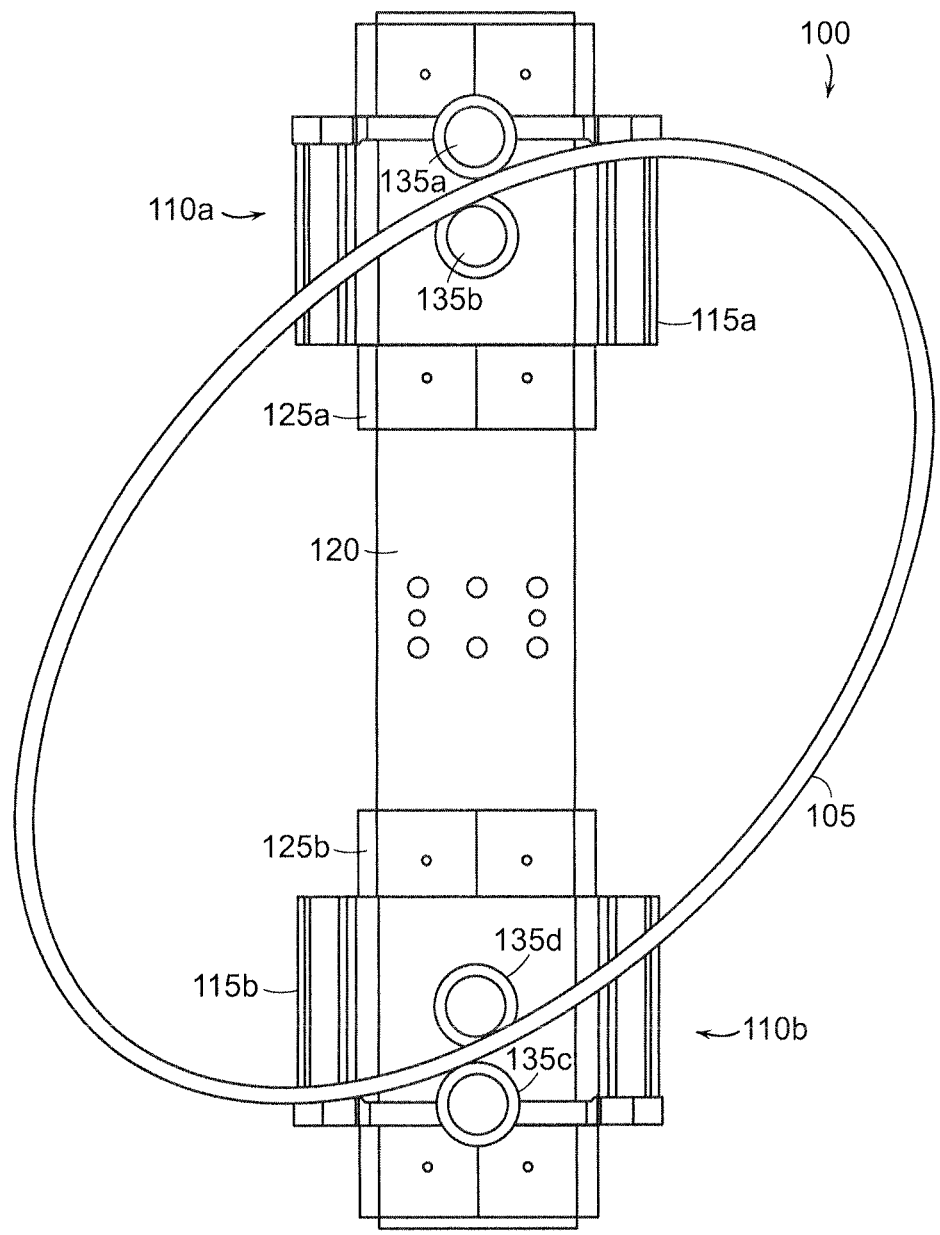
Figure 2C:
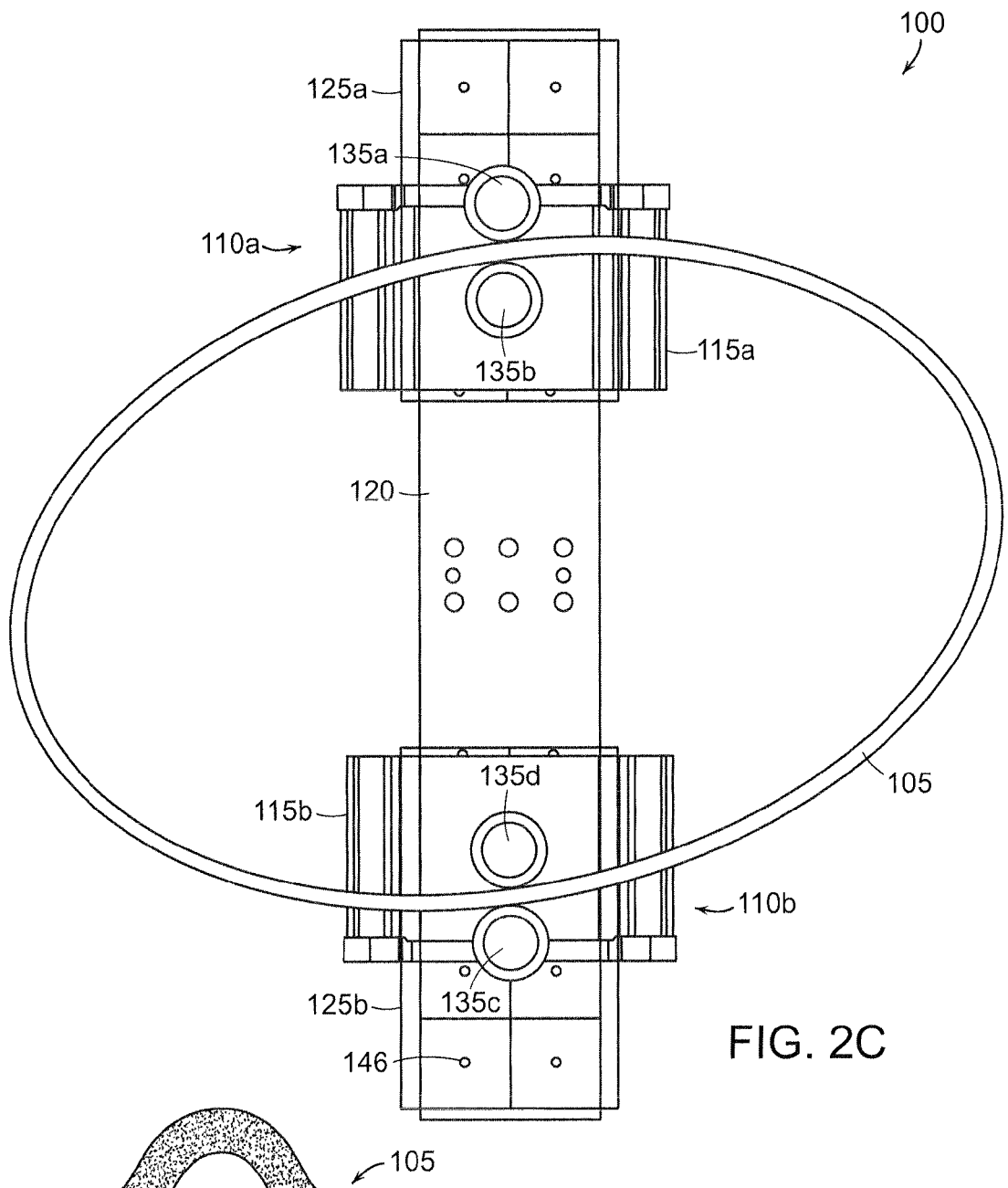

FIGS. 2A-2C illustrate components of the rotary device 100 in action, including the rotary device's electromagnetic actuators 110a, 110b (with associated coils 115a, 115b and followers 135a-d) and cam 105 moving relative to the magnetic stator assembly 120 (including associated magnetic stators 125a, 125b). The housings by which the followers are attached to the coils are not shown in these figures. As illustrated by FIGS. 2A-2C, the reciprocal movement of the coils 115a, 115b in opposition drives the cam 105 to rotate, which, in turn, may cause a wheel attached to the cam 105 to rotate. The coils 115a, 115b are shown in FIG. 2A as being at almost their furthest distance apart. FIG. 2B shows that as the coils 115a, 115b move closer to each other, the coils 115a, 115b drive the cam 105 to rotate in a clockwise direction, thereby causing any attached wheel to also rotate clockwise. In the example device, the force exerted on the cam 105 is caused by the outer followers 135a, 135c squeezing-in on the cam 105. FIG. 2C shows that the coils 115a, 115b are yet closer together causing further clockwise movement of the cam 105.

Figure 2D:
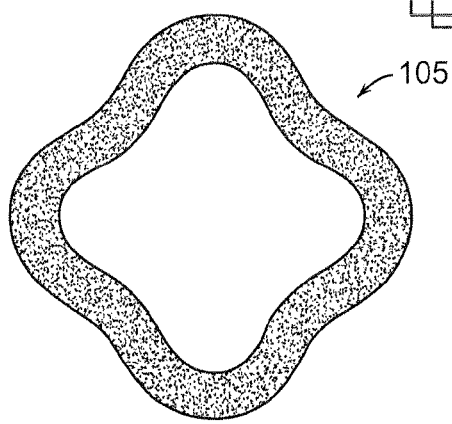
FIG. 2D illustrates an example shape of a cam.
Figure 2F:
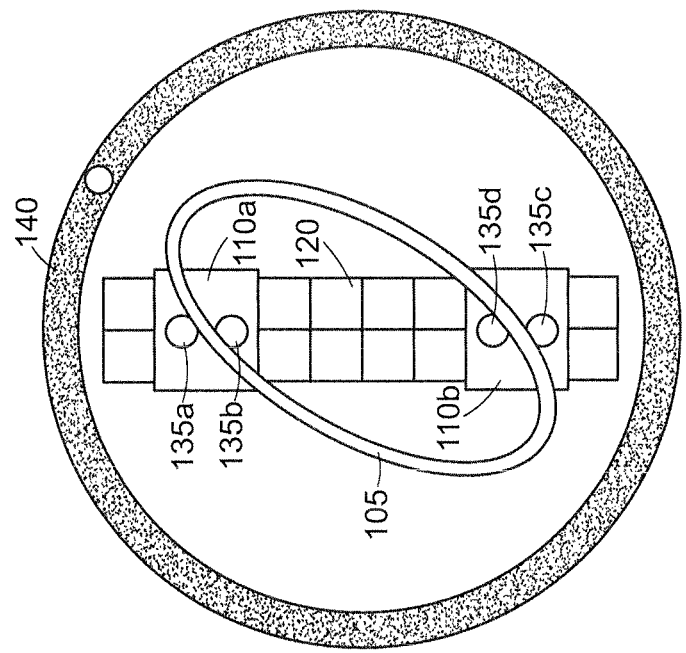
Figure 2E:
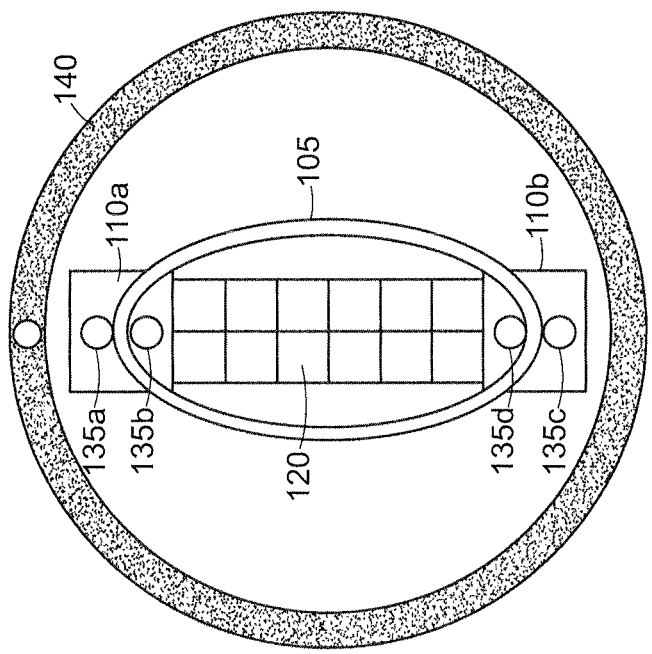

After the coils 115a, 115b have reached their closest distance together and the cam 105, in this case, has rotated ninety degrees, the coils 115a, 115b begin to move away from each other and drive the cam 105 to continue to rotate clockwise. As the coils 115a, 115b move away from each other, the inner followers 135b, 135d exert force on the cam 105 by pushing outward on the cam 105. Again, it is important to note that the cam 105 is shown in the figures as an oval shape, but the cam 105 may be shaped in a more complex pattern, such as, for example, a shape having an even number of lobes, as illustrated in FIG. 2D. The sides of each lobe may be shaped in the form of a sine wave or a portion of an Archimedes spiral, for example. The number of lobes determines how many cycles the coils must complete to cause the cam to rotate full circle.

A cam with two lobes will rotate full circle upon two coil cycles. A cam with four lobes will rotate full circle upon four coil cycles. Additionally, more lobes in a cam creates a higher amount of torque. In addition to driving the cam in rotational motion, the electromagnetic actuators may act as generators by drawing current from the coils as the cam rotates. This also has the effect of reducing the rotational movement of the cam when energy is absorbed from the rotational movement of the cam. In an application of the device in a vehicle, drawing current from the coils may act as a regenerative braking mechanism for the vehicle. Because the devices may act as generators, rotation of the wheel caused by an outside force may recharge the batteries of a vehicle. For example, the vehicle may be positioned so that at least one of its wheels is placed on a recharging device that causes the wheel to rotate. Such a recharging device may be similar to a dynamometer, which may be placed on or in a floor. But while a vehicle causes a dynamometer to rotate, it is the rotation of the recharging device that causes the vehicle's wheel to rotate, thereby causing the electromagnetic actuators to act as generators and to charge the vehicle's batteries. The recharging device may be powered by, for example, electricity or fuel.

In some devices, heat produced by the reciprocation of the coils 115a, 115b may be reduced by spraying a liquid coolant, such as, for example, water, on the coils 115a, 115b. This may be accomplished by spraying liquid through openings 146 in the magnets of the magnetic stators 125a, 125b and onto the coils 115a, 115b as they pass by the openings 146. The liquid coolant may be transported to the openings 146 through channels in the magnetic stator assembly 120. The sprayed liquid may then be collected for reuse or may be allowed to convert to a gas and be vented from the rotary device.

FIGS. 2E-2H also illustrate components of an example rotary device in action, but with a wheel 140 that is attached to the cam 105 through a plate, or similar structure (not shown). A white circle appears on the wheel 140 to show the wheels position at different points during reciprocation of the electromagnetic actuators 110a, 110b. As illustrated by the white circle in 2E-2H, the wheel 140 rotates along with the rotating cam 105.

Figure 3A:
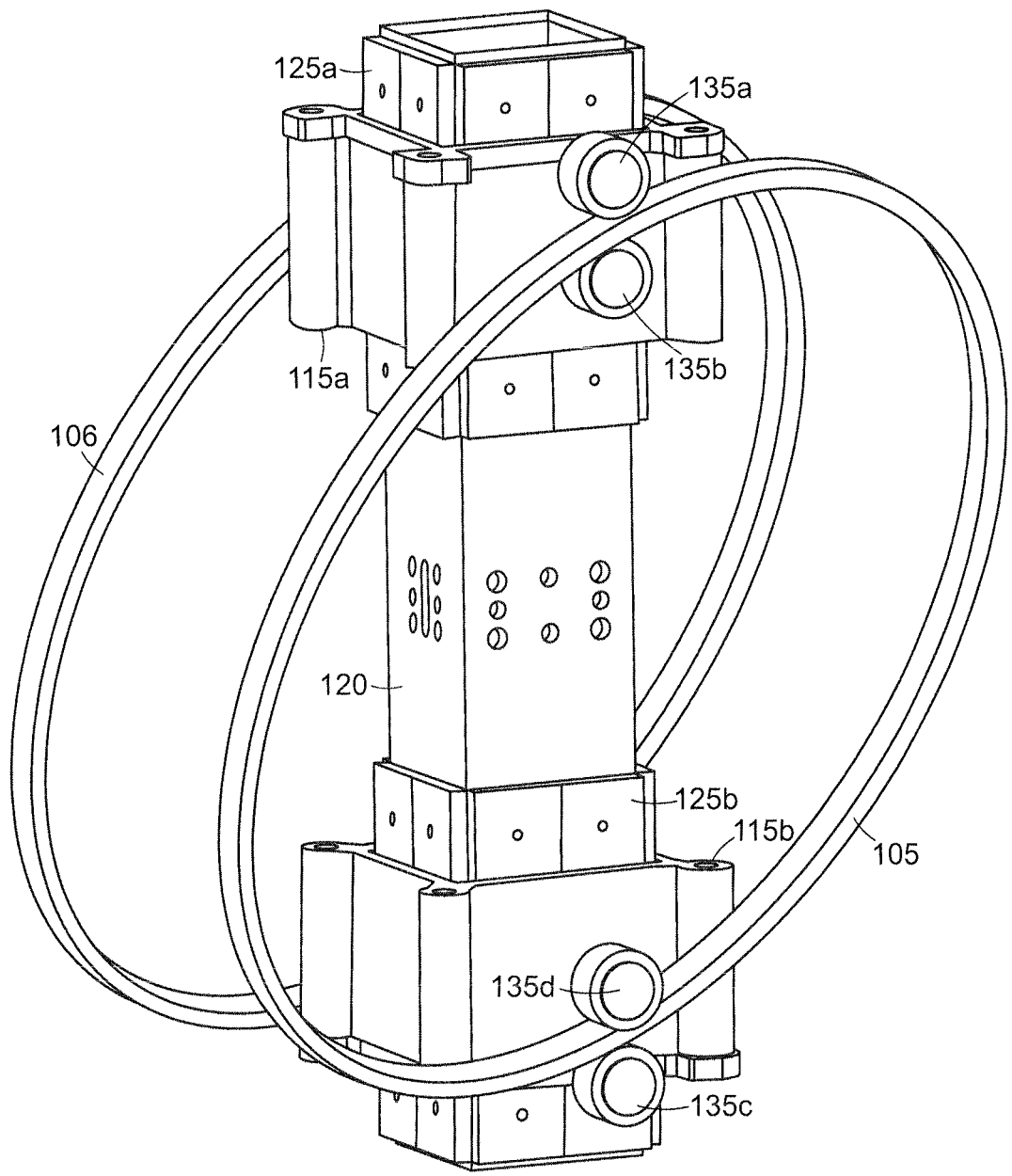
FIGS. 3A and 3B illustrate an example rotary device with an additional cam and magnetic stator components.

FIG. 3A illustrates a rotary device similar to the device of FIGS. 2A-2C, but with an additional cam 106 on the other side of the magnetic stator assembly 120. Reciprocation of the coils 115a, 115b acts to also drive the second cam 106 in rotary motion, and the second cam 106 may be attached to the other side of a wheel using, for example, another circular plate. Also shown is that the magnetic stator assembly 120 of the example device may be in the shape of a long extended box-shaped core of magnetically permeable material, with a magnetic stator 125a, 125b at either end. In the example device, each magnetic stator 125a, 125b includes magnets on all four sides of the magnetic stator assembly 120. The box-shaped core, on which the magnetic stators 125a, 125b are affixed in the example device, may act as a return path for the magnetic flux of the magnetic stators 125a, 125b. Also shown in FIG. 3A is that the coils 115a, 115b of the electromagnetic actuators may have a rectangular shaped cross-section and arranged to surround the magnetic stators 125a, 125b. This arrangement allows for efficient utilization of the electromagnetic forces between the coils 115a, 115b and the magnetic stators 125a, 125b.

Figure 3B:
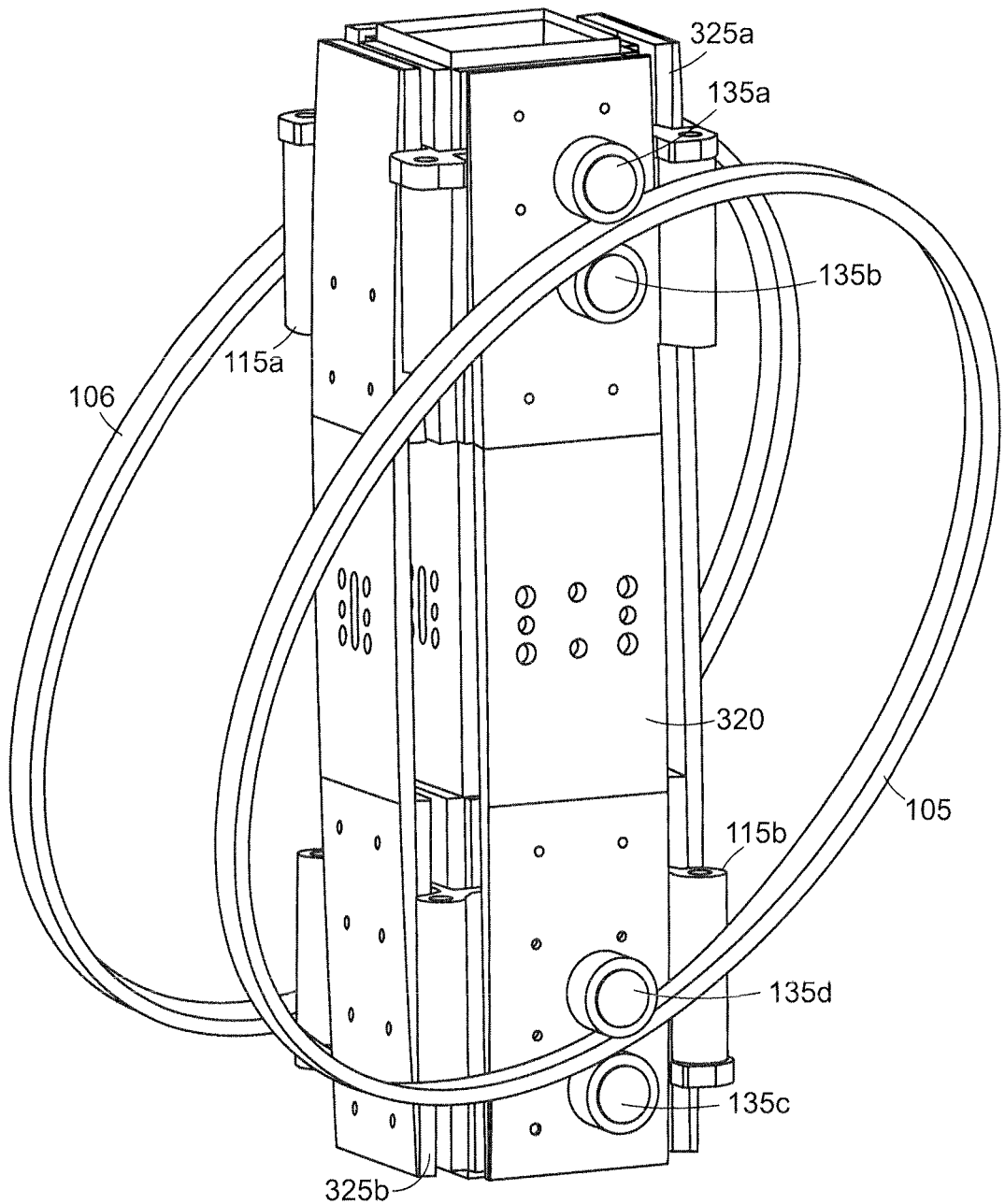

FIG. 3B illustrates the rotary device of FIG. 3A, but with additional magnets 325a, 325b arranged outside of the coils 115a, 115b. According to the example device, each end of the magnetic stator assembly 120 includes an additional four magnet arrays, one on each side of a rectangular cross-section coil 315a, 315b. The additional magnets 325a, 325b enables the creation of more electromagnetic force. Also shown in FIG. 3B is an additional magnetic return path 320 for the additional magnets 325a, 325b.

Figure 4A:
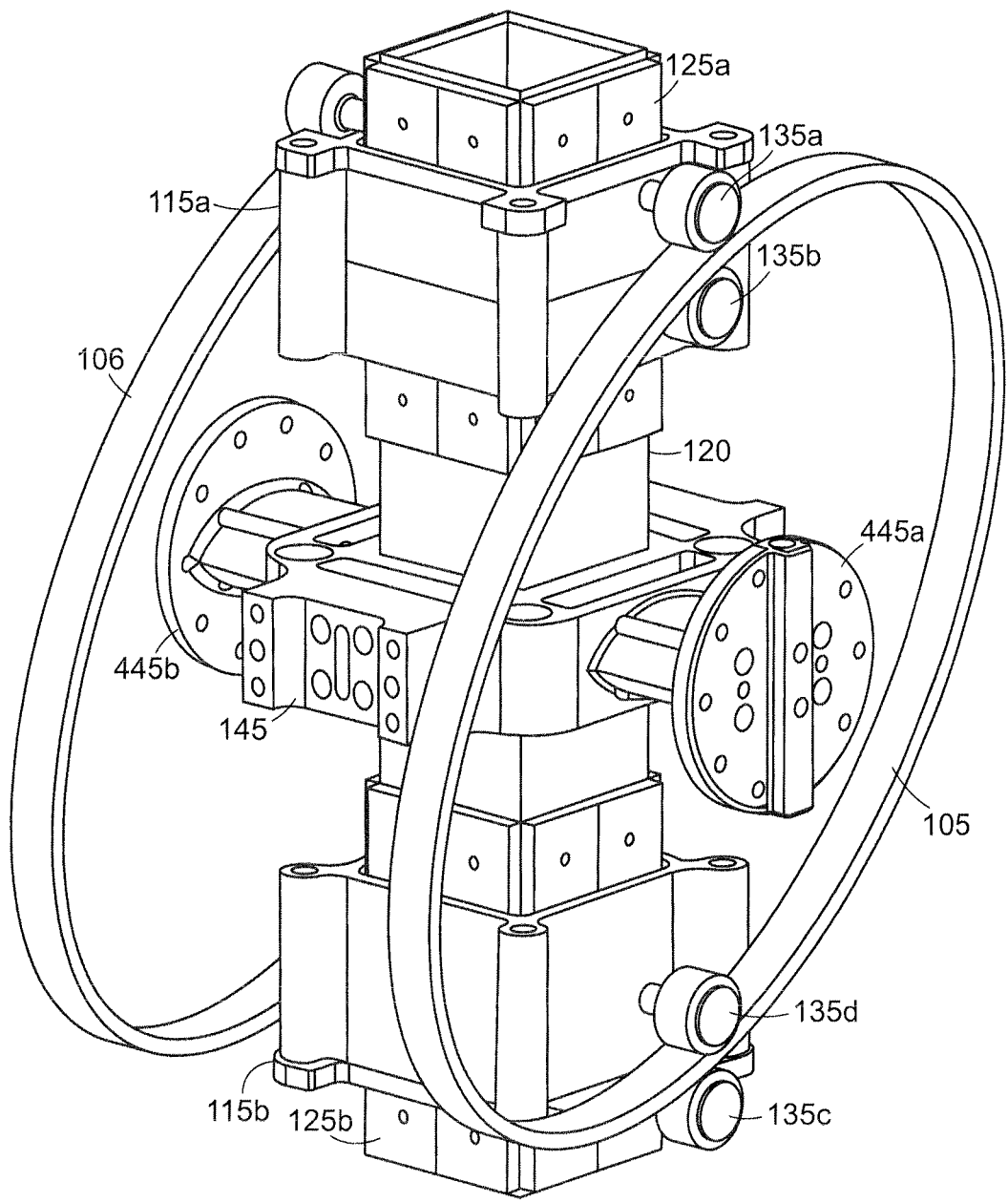
FIG. 4A illustrates a mount attached to the magnetic stator assembly of an example rotary device.

FIG. 4A illustrates a mount 145 to which the magnetic stator assembly 120, including magnets and return paths, may be attached. The mount may be part of, or further attached to, for example, a chassis of a vehicle (not shown). Specifically, the mount 145 includes outer and inner hub plates 445a, 445b, the latter of which may be bolted to the chassis of a vehicle. Delivery of electrical current to the coils 115a, 115b may be accomplished using electricity-conducting flexures (not shown in FIG. 4A) that extend from the mount 145 to the coils 115a, 115b. The flexures allow current to be delivered to the coils 115a, 115b even as the coils reciprocate along the magnetic stator assembly 120. Thus, the flexures may electrically couple to an electrical supply (not shown in FIG. 4A), such as a battery, coupled to the mount or located in the chassis of a vehicle, the supply delivering electrical current to the coils 115a, 115b.

Figure 4B:
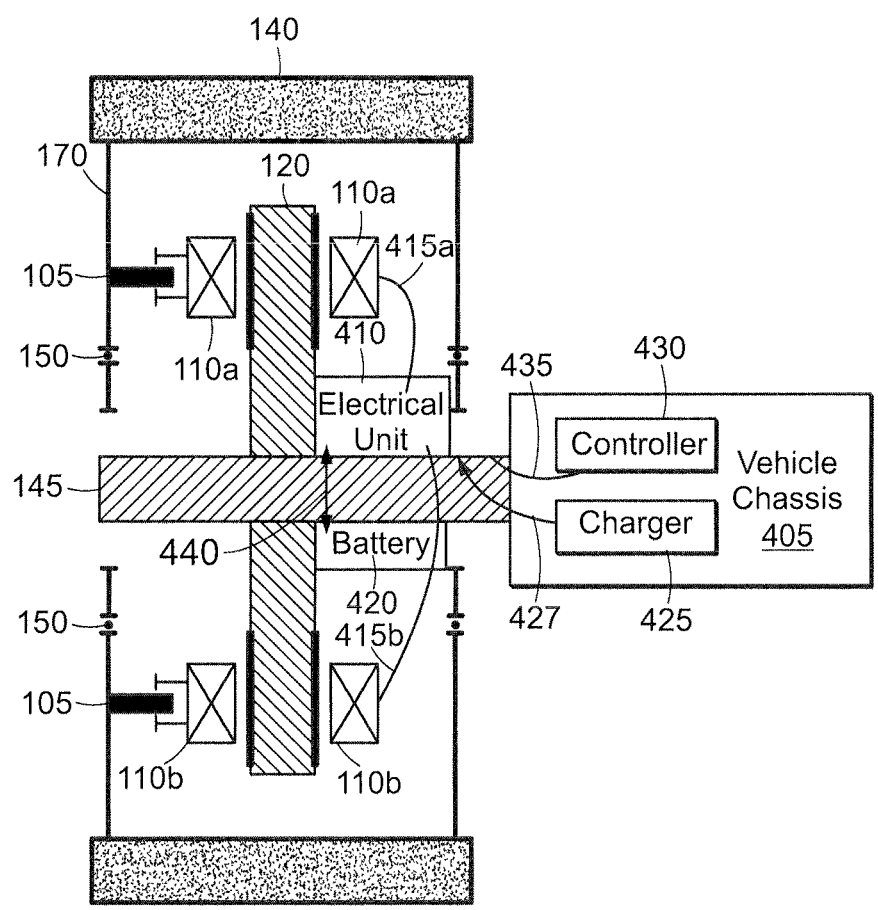
FIG. 4B illustrates a simplified cross-section of an example rotary device attached to the chassis of a vehicle.

FIG. 4B illustrates a simplified cross-section of an example rotary device attached to the chassis of a vehicle 405. FIG. 4B is similar to FIGS. 1D-1F, but with some components removed for clarity. The figures shows a mount 145 coupled to the chassis of a vehicle 405 and a magnetic stator assembly 120. Also shown are a cam 105, cam plate 170, wheel 140, bearing 150, and electromagnetic actuators 110a, 110b. Coupled to the mount 145 is an electrical unit 410, which is used to deliver electricity to the electromagnetic actuators 110a, 110b through a pair of flexures 415a, 415b. Also coupled to the mount 145 is a battery 420 for storing electrical energy. Although the electrical unit 410 and the battery 420 are shown as being coupled to the mount 145, the electrical unit 410, battery 420, or both may, instead, be coupled to the support structure 165 (FIG. 1D).

According to the example rotary device, the electrical unit 410 may be controlled by a controller 430 on the chassis of the vehicle 405 and through a fiber-optic cable 435 running between the controller 430 and the electrical unit 410. The example rotary device also includes a bidirectional power line 440 connecting the electrical unit 410 and the battery 420. During operation as a motor, power may flow from the battery 420 to the electrical unit 410 and on to the electromagnetic actuators 110a, 110b. During operation as a generator, power may flow from the electromagnetic actuators 110a, 110b to the electrical unit 410 and on to the battery 420. The vehicle may also include a charger 425 for charging the battery 420 using an external power source (not shown), such as an electrical outlet or gasoline engine in the case of a hybrid vehicle. During such charging, power flows from the external power source to the charger 425 and on to the battery 420 through line 427, the electrical unit 410, and the bidirectional power line 440. Thus, the battery 420 may be charged by either an external power source or by the rotary device acting as a generator.

Through delivery of electricity to the electromagnetic actuators 110a, 110b, the electrical unit 410 may control the reciprocation of the coils. For example, when at speed, the electrical unit 410 may control the constant reciprocation of the coils. In vehicular embodiments, the controller 430 may be operated by a driver (not shown) of a vehicle and, in response to actions by the driver, the controller 430 may send commands to the electrical unit 410 to cause the rotary device to accelerate, decelerate, or change direction, for example. In addition, the electrical unit 410 may be configured to provide an electrical component to the electromagnetic actuators 110a, 110b to drive their coils in the same direction, thereby creating a vertical translational movement of the wheel 140.

Any translational movement of the wheel 140, caused by the rotary device or not, may be sensed by the electrical unit 410. In some configurations, the electrical unit 410 may be configured to absorb energy from the translational movement of the wheel by causing the electromagnetic actuators 110a, 110b to act as electrical generators and dampers. This energy may be transferred to the battery 420 for storage.

Figure 5A:
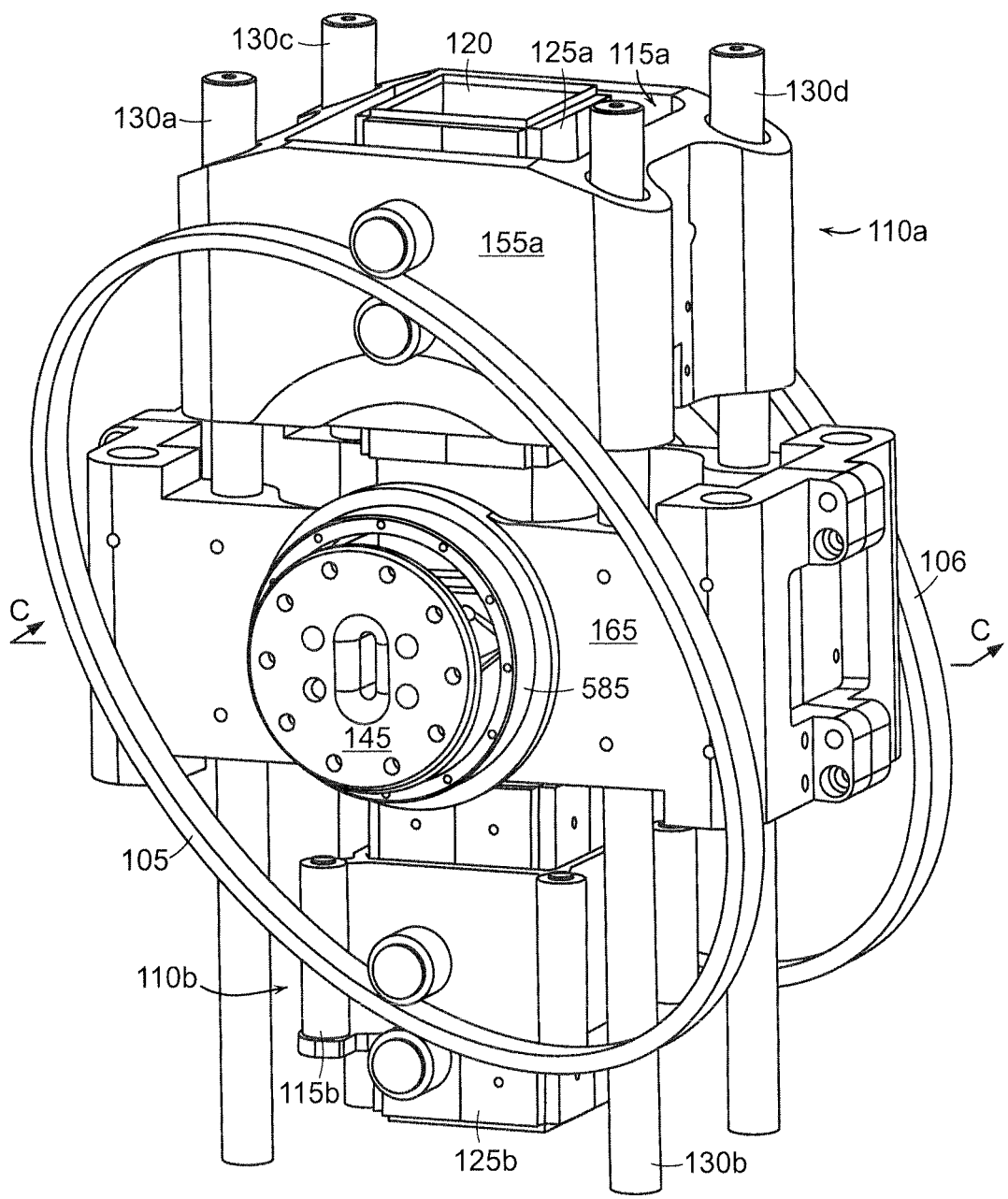
FIGS. 5A-5D illustrate a support structure coupling a magnetic stator assembly and mount of an example rotary device with electromagnetic actuators and coils of the device through a plurality of shafts.

FIG. 5A illustrates a bearing support structure 165. A rotary bearing (not shown) that supports the cam plate and, thus, the wheel is mounted to a flange 585. The bearing support 165 and the electromagnetic actuators 110a, 110b with coils 115a, 115b are kept in vertical alignment using a plurality of shafts 130a-d. If the rotary device is employed in the wheel of a vehicle, the support structure 165 allows the magnetic stator assembly 120, mount 145, and chassis of the vehicle (not shown) to remain suspended above the ground without electrical power. In the absence of the support structure 165, the magnetic stator assembly 120, mount 145, and vehicle chassis may drop toward the ground when current is not applied to the coils 115a, 115b. Thus, both the support structure 165 and the electromagnetic actuators 110a, 110b can provide suspension for the vehicle, but the electromagnetic actuators 110a, 110b require electrical power to lift the magnetic stator assembly 120, mount 145, and vehicle chassis off the ground. The support structure 165, on the other hand, may use fluid dampers (not shown) for suspension.

The support structure 165 also enables the use of multiple flexures in series for delivering electricity to the coils. For example, one set of flexures may run between the mount 145 and the support structure 165, and another set of flexures may run between the support structure 165 and the coils 115a, 115b. Use of multiple flexures is advantageous when the bearing support 165 moves in a vertical direction. During such vertical movement of the bearing support 165 and reciprocation of the coils 115a, 115b, one set of flexures may flex with respect to the vertical movement of the bearing support 165, and the other set of flexures may flex with respect to the reciprocation of the coils 115a, 115b. If only one set of flexures were used (e.g., connected directly between the mount 145 and the coils 115a, 115b), more flex would be required upon vertical movement of the bearing support 165 and reciprocation of the coils 115a, 115b, possibly leading to increased stress and wear on the flexures.

Figure 5B:
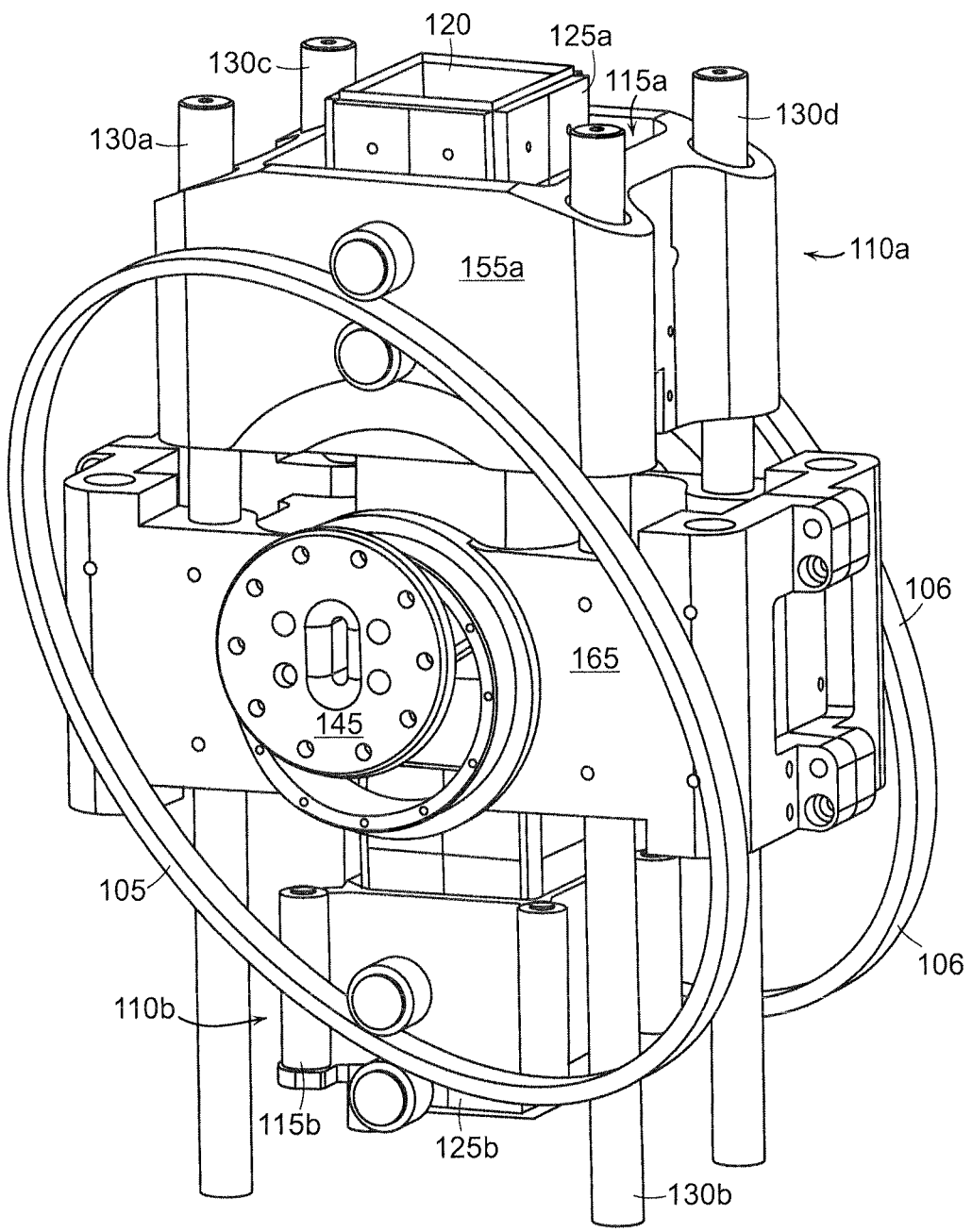

FIG. 5B illustrates the magnetic stator assembly 120, mount 145, and vehicle chassis as being raised with respect to the other components of the rotary device. This is accomplished either by adding an electrical component to the coils 115a, 115b to cause both coils to move in the same direction (e.g., in this case down relative to the stator assembly and chassis) or by using the fluid dampers (not shown) of the support structure 165, as described below. The vertical movement of the coils 115a, 115b may occur concurrently with, or apart from, opposed coil reciprocation. The effect that the vertical movement has on a vehicle, for example, is to raise or lower the vehicle's ride height or to act as a shock absorber (e.g., going over bumps). To raise a vehicle's ride height, either the fluid dampers or the coils 115a, 115b may be used to raise, and keep raised, the chassis of the vehicle with respect to the wheels. To act as a shock absorber, either the fluid dampers or the coils 115a, 115b may react to a bump in the road by allowing the wheels to quickly rise with respect to the chassis of the vehicle and then return to their normal position. In addition, all four wheels of a vehicle may be thrust rapidly downwards with respect to the chassis of the vehicle to cause the vehicle to jump off of the ground. Thus, the rotary device may exhibit at least two degrees of movement: rotational movement with opposed reciprocation of the coils and linear movement with movement of the coils in a common direction. These degrees of movement may be performed either separately or together.

Figure 5C:
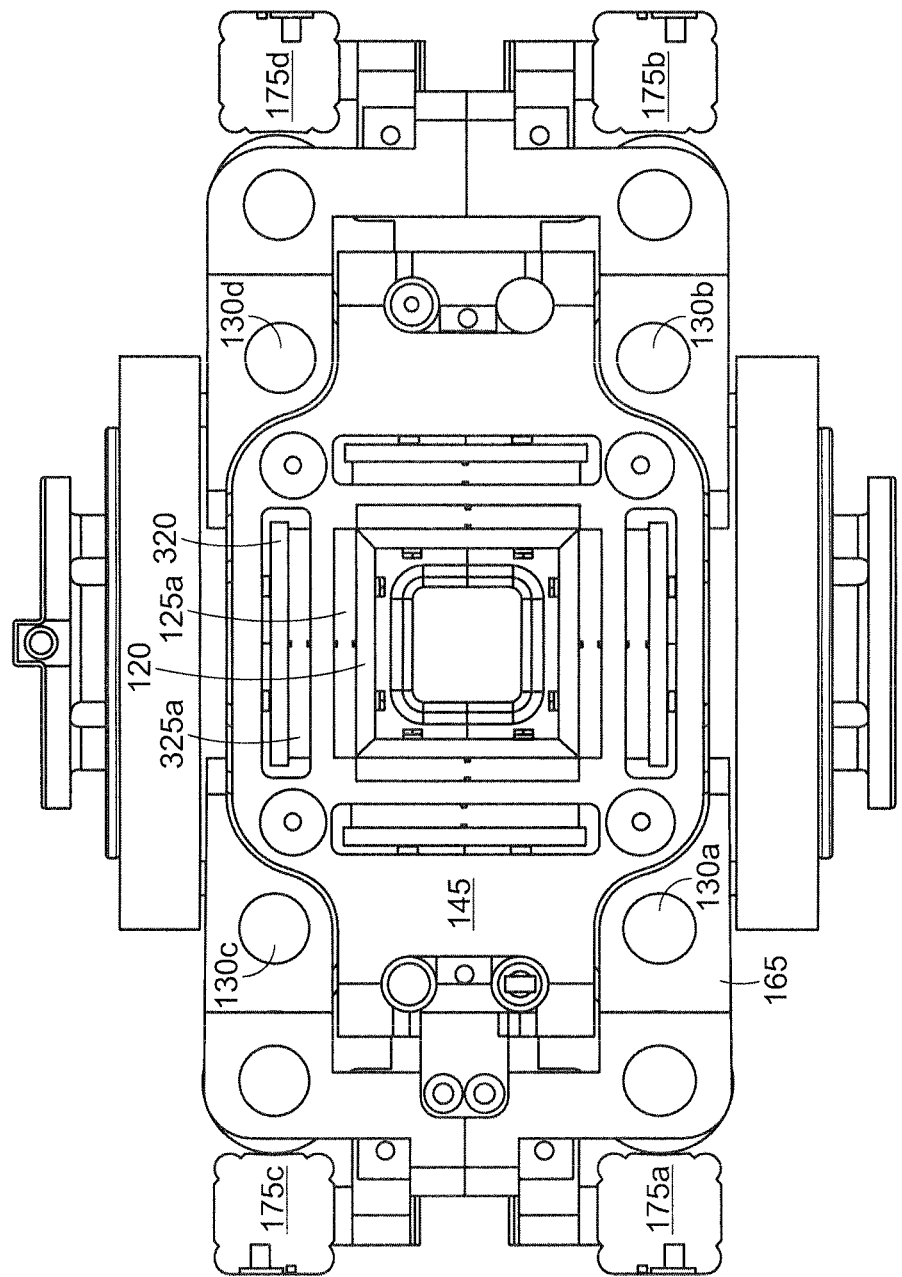

FIG. 5C shows a horizontal cross-section through the device showing the support structure 165 as surrounding, but not coupled to, the mount 145. Also shown are a plurality of shafts 130a-d coupled to the support structure to maintain alignment among the components of the rotary device. A plurality of fluid dampers 175a-d, described below, are also shown.

Figure 5D:
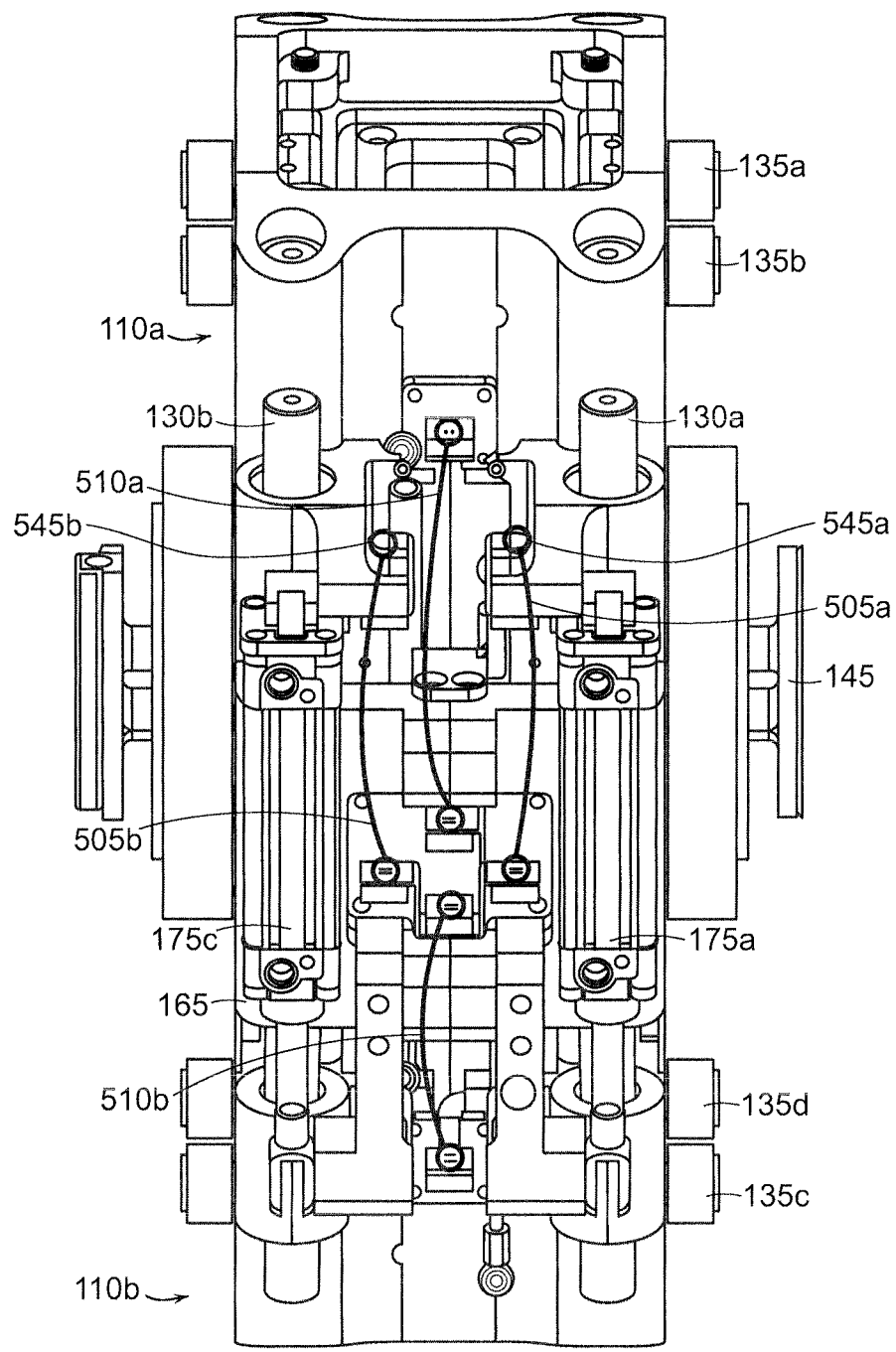

FIG. 5D illustrates the side of an example rotary device including one pair of flexures 505a, 505b running between components 545a, 545b of the mount 145 and the support structure 165, and another pair of flexures 510a, 510b running between the support structure 165 and the electromagnetic actuators 110a, 110b.

Figure 6A:
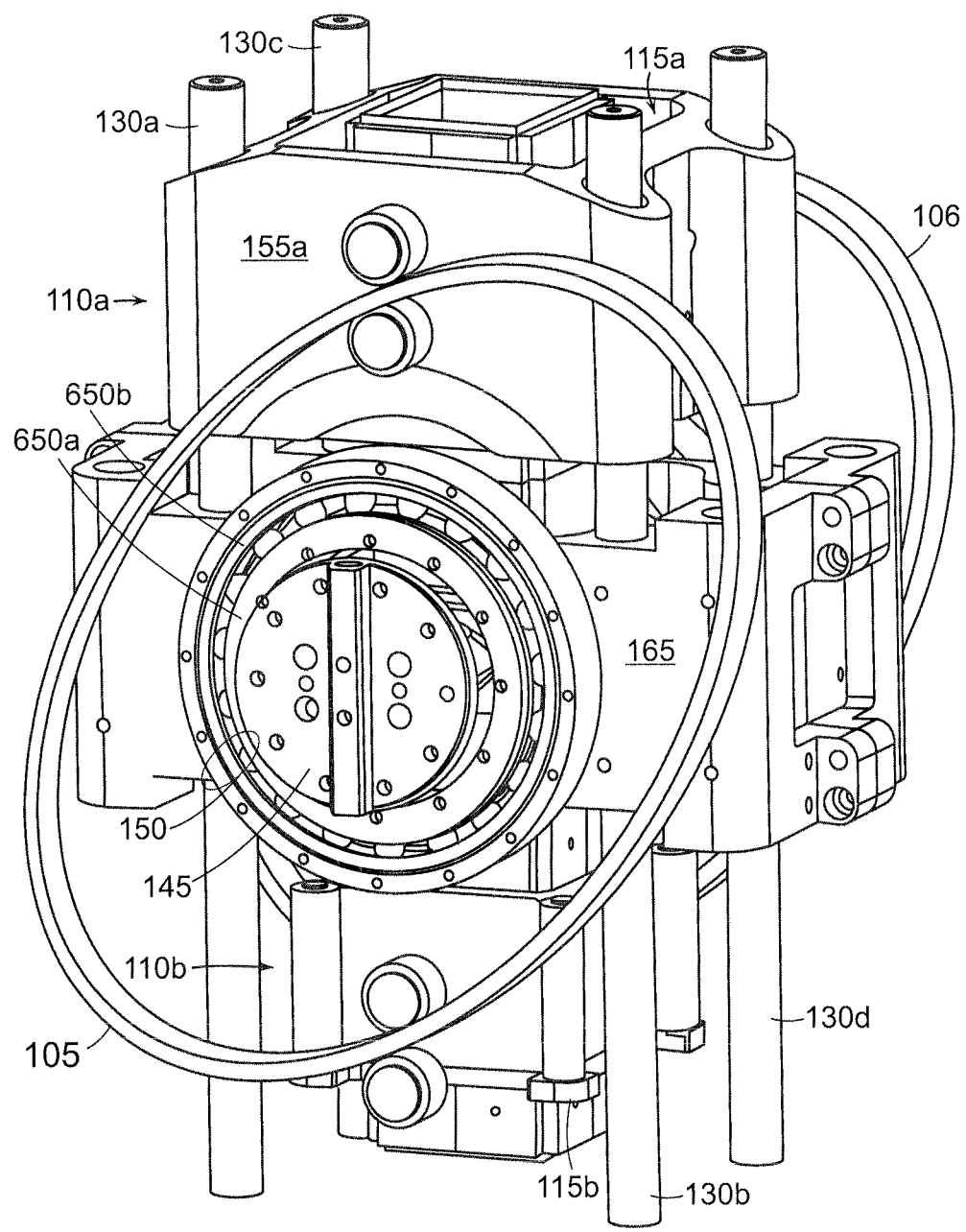
FIG. 6A illustrates a rotary bearing coupling a support structure of an example rotary device with a cam of the device.

FIG. 6A illustrates a rotary bearing 150 used to couple the bearing support structure 165 with one of the cams 105. An inner race 650a is coupled to the bearing support 165 and an outer race 650b couples a wheel structure (not shown), such as a cam plate and, thus, to the cam 105 and outer wheel rim. The wheel structure may be a plate, a plurality of spokes, a lattice, or other appropriate structure as known in the art. The rotary bearing 150 is not coupled directly to the mount 145, but rather, in the example device, through a fluid damper. Another rotary bearing (not shown) may be used to couple the support structure 165 with the other cam 105 on the other side of the rotary device. Because the rotary bearing 150 rotably couples the bearing support structure 165 with an outer wheel rim, the support structure 165 and wheel have the same vertical position with respect to each other. Because of its constant vertical position with respect to the wheel, the shafts 130a-d may be fixed to the support structure 165, thereby preventing the shafts from coming into contact with the wheel.

Figure 6B:
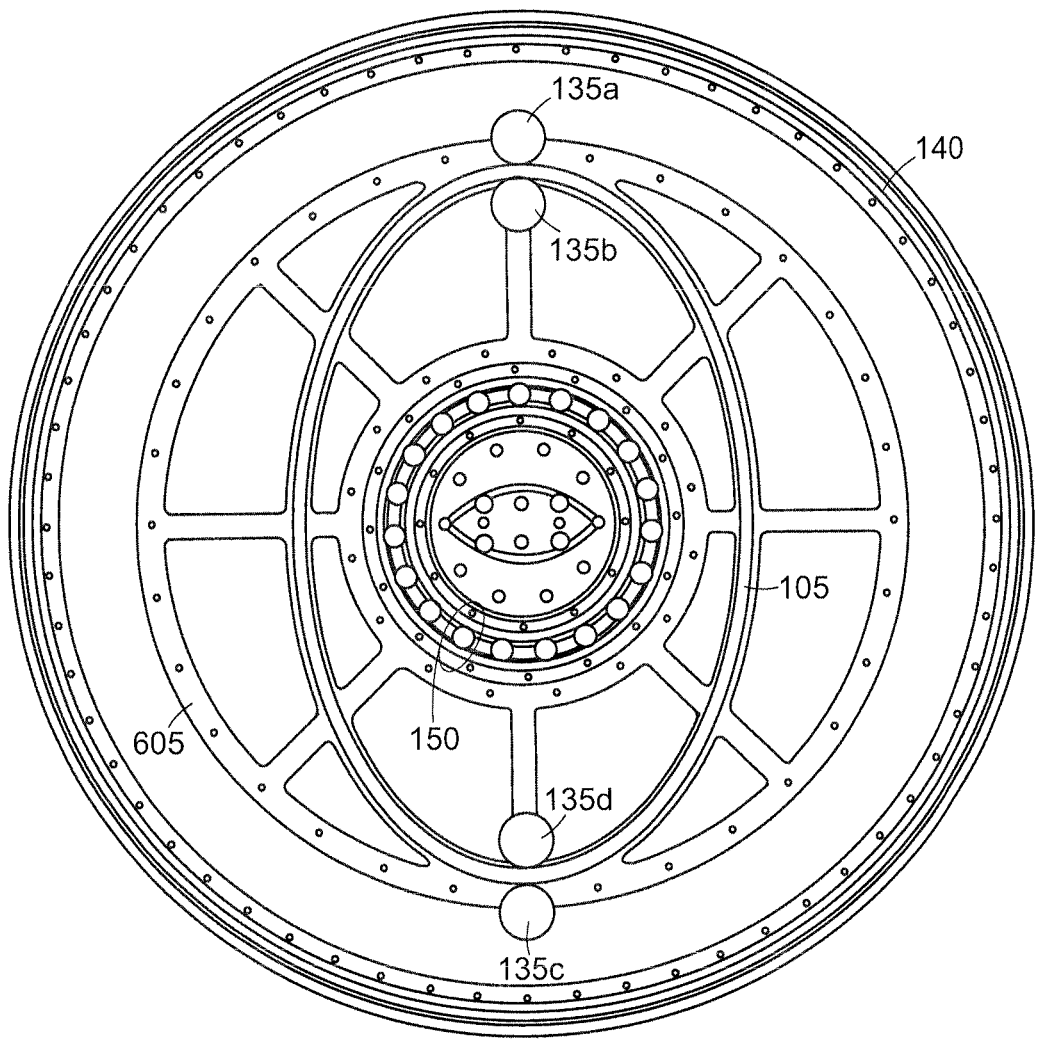
FIG. 6B illustrates a wheel structure coupling a cam of an example rotary device with a wheel of a vehicle.

FIG. 6B illustrates a wheel structure 605 coupling a cam 105 of an example rotary device with a wheel rim 140 of a vehicle. As illustrated, the cam 105 is fixed to the wheel structure 605, and the wheel structure 605 is fixed (e.g., using bolts) to the wheel 104 rim. Rotation of the cam 105, thus, causes rotation of the wheel structure 605 and the wheel 104.

Figure 7:
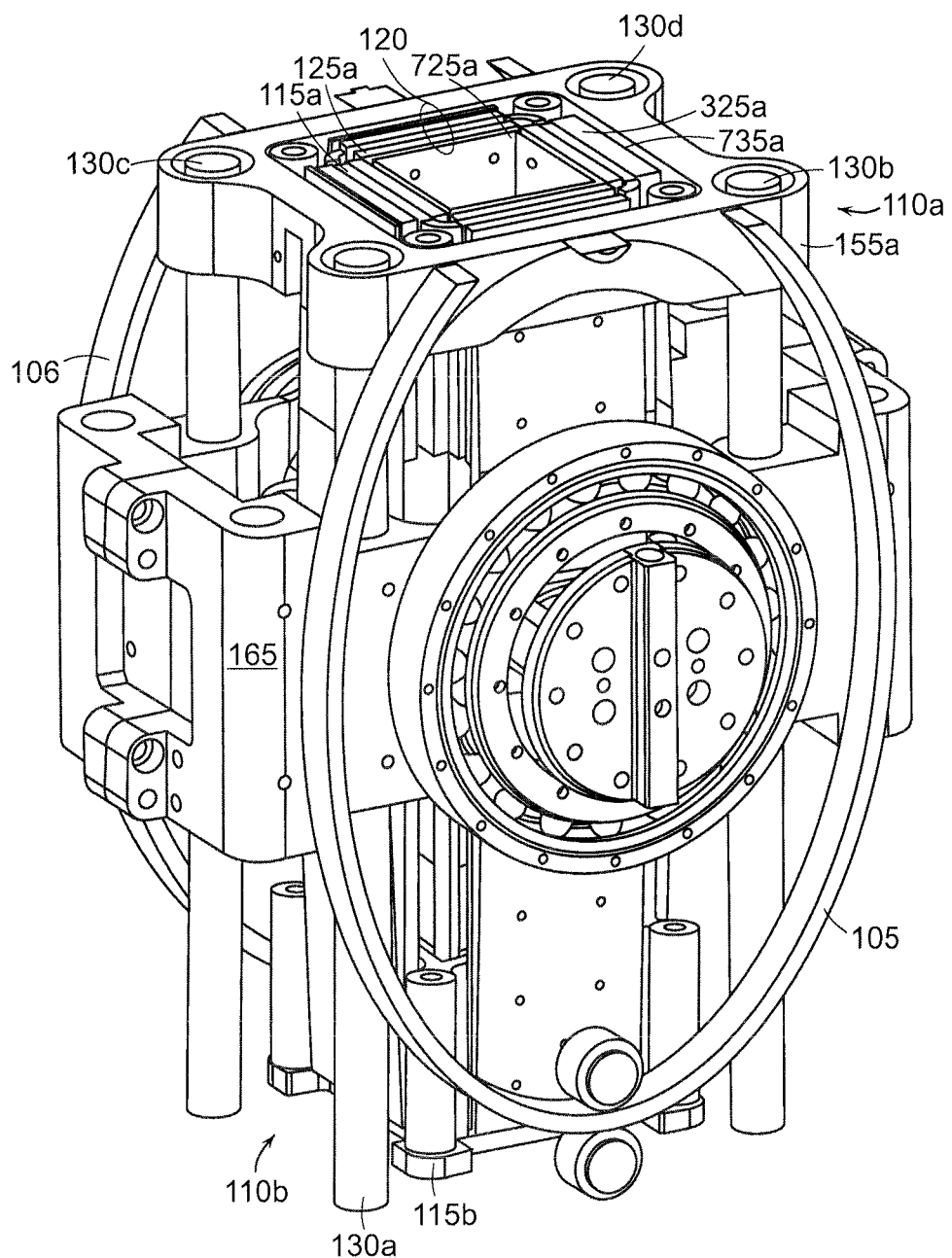
FIG. 7 illustrates a horizontal cross-section of an example rotary device.

FIG. 7 shows a horizontal cross-section of an example rotary device. The cross-section is cut through one of the electromagnetic actuators 155. Inside the electromagnetic actuator 155 is shown a coil 115a and the components of the magnetic stator assembly 120. According to the illustrated device, the magnetic stator assembly 120 includes an inner magnetic stator component 125a, including a plurality of magnets, and an outer magnetic stator component 325a, also including a plurality of magnets. The magnetic stator assembly 120 also includes an inner magnetic flux return path 725a for the inner magnetic stator component 125a and includes an outer magnetic flux return path 735a for the outer magnetic stator component 325a. As described above, the inner magnetic stator component 125a and inner magnetic flux return path 725a are located inside of the coil 115a, and the outer magnetic stator component 325a and outer magnetic flux return path 735a are located outside of the coil 115a. Also shown in the cross-section is the housing of the electromagnetic actuator 155, which surrounds the coil 115a and magnetic stator assembly 120 and slides along the long axis of the magnetic stator assembly 120 by sliding along a plurality of shafts 130a-d. The housing of the electromagnetic actuator 155 may hold the coil 115a using, for example, four bolts that run through the corners of the rectangular-shaped coil 115a.

Figure 8:
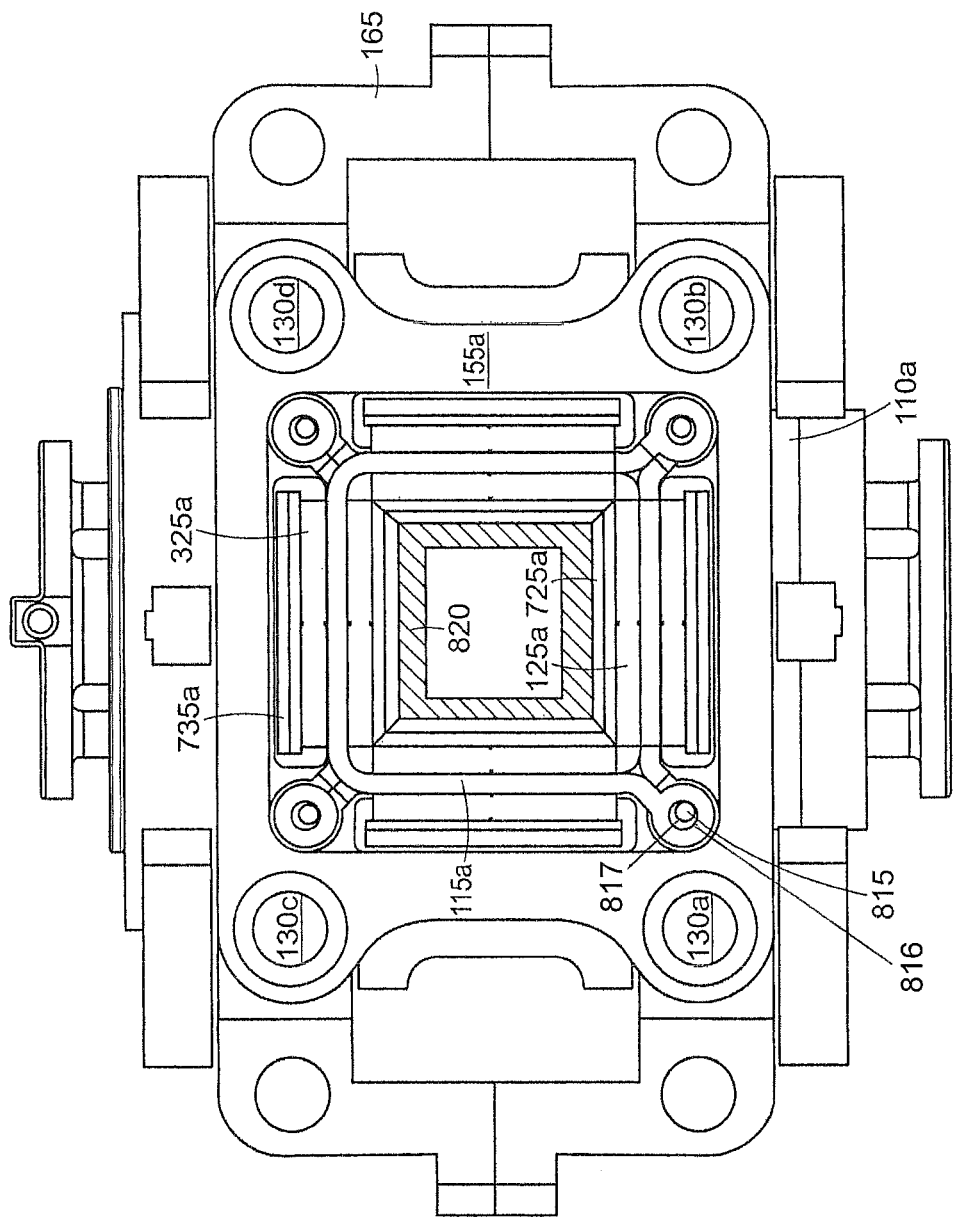
FIG. 8 illustrates a horizontal cross-section of an example rotary device from a top-down view.

FIG. 8 shows another cross-section of the example rotary device, but from a top-down view. As in FIG. 7, the cross section shows a coil 115*a*, inner magnetic stator component 125*a*, outer magnetic stator component 325*a*, inner magnetic flux return path 725*a*, outer magnetic flux return path 735*a*, electromagnetic actuator housing 155*a*, and shafts 130*a-d*. The inner magnetic stator component 125*a* and inner magnetic flux return path 725*a* are mounted to an inner structure 820 of an example magnetic stator assembly. As can be seen, bolts 815 having electrically insulating cover material 817 may be inserted through bolt holes 816 at the corners of the coil 115*a* to fix the coil 115*a* to the housing 155*a*.

Figure 9:
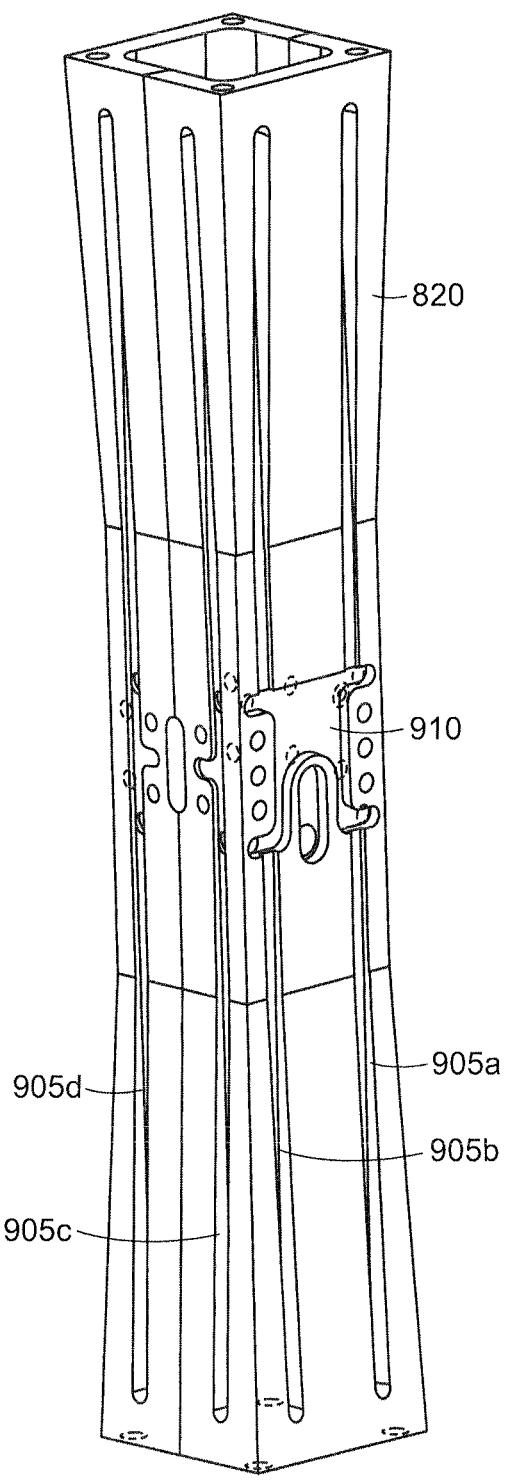
FIG. 9 illustrates an inner structure of a magnetic stator assembly of an example rotary device.

FIG. 9 illustrates an inner structure 820 of an example magnetic stator assembly. A mount 145 (FIG. 4A) may be attached at point 910 to, for example, couple the structure 820 to the chassis of a vehicle. Channels 905*a-d* may be used to transport a cooling fluid within the magnetic stator assembly to spray on the coils through the magnets.

Figure 10:
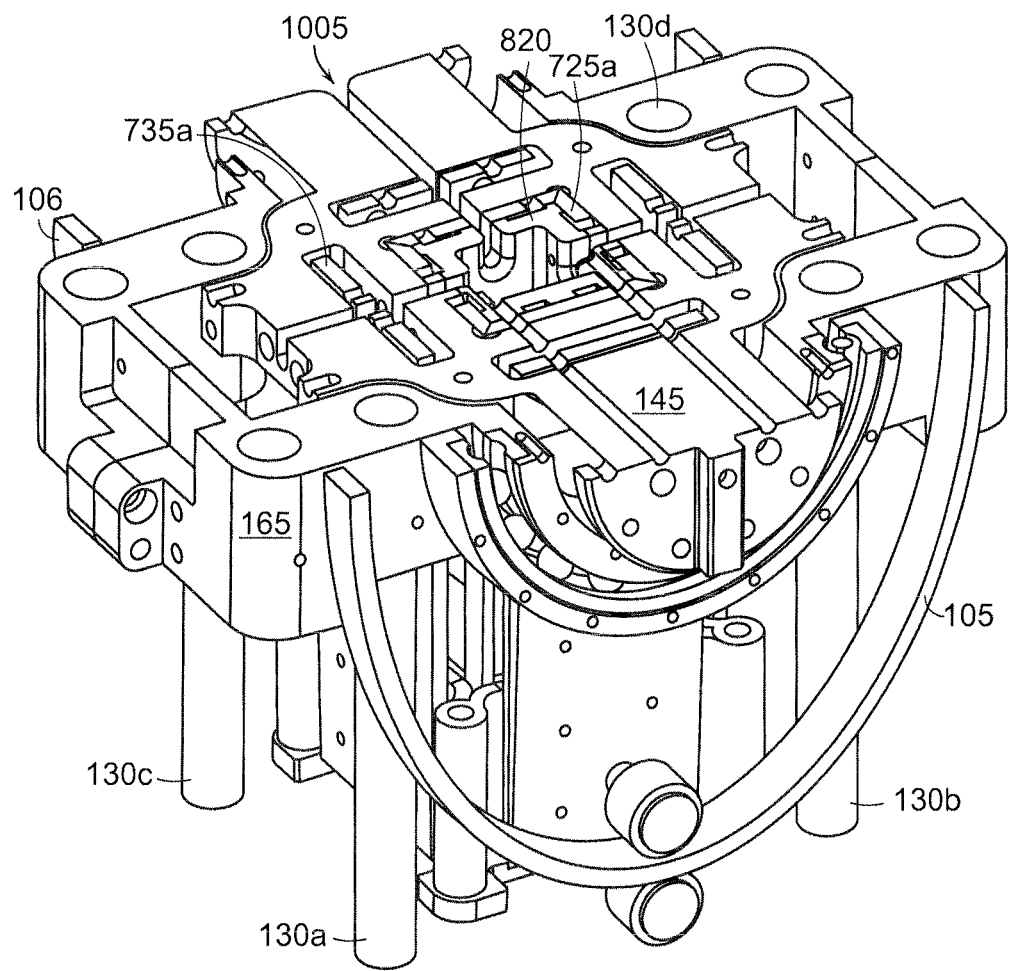
FIG. 10 illustrates a horizontal cross-section of an example rotary device.

FIG. 10 shows a cross-section of the example rotary device. The cross-section is cut through the middle of the device and shows the inner structure 820 of the magnetic stator assembly, mount 145, inner magnetic flux return path 725*a*, and outer magnetic flux return path 735*a*. The cross-section also shows a channel 1005 used to access the inner part of the magnetic stator assembly for running wires or cooling fluid, for example.

Figure 11:
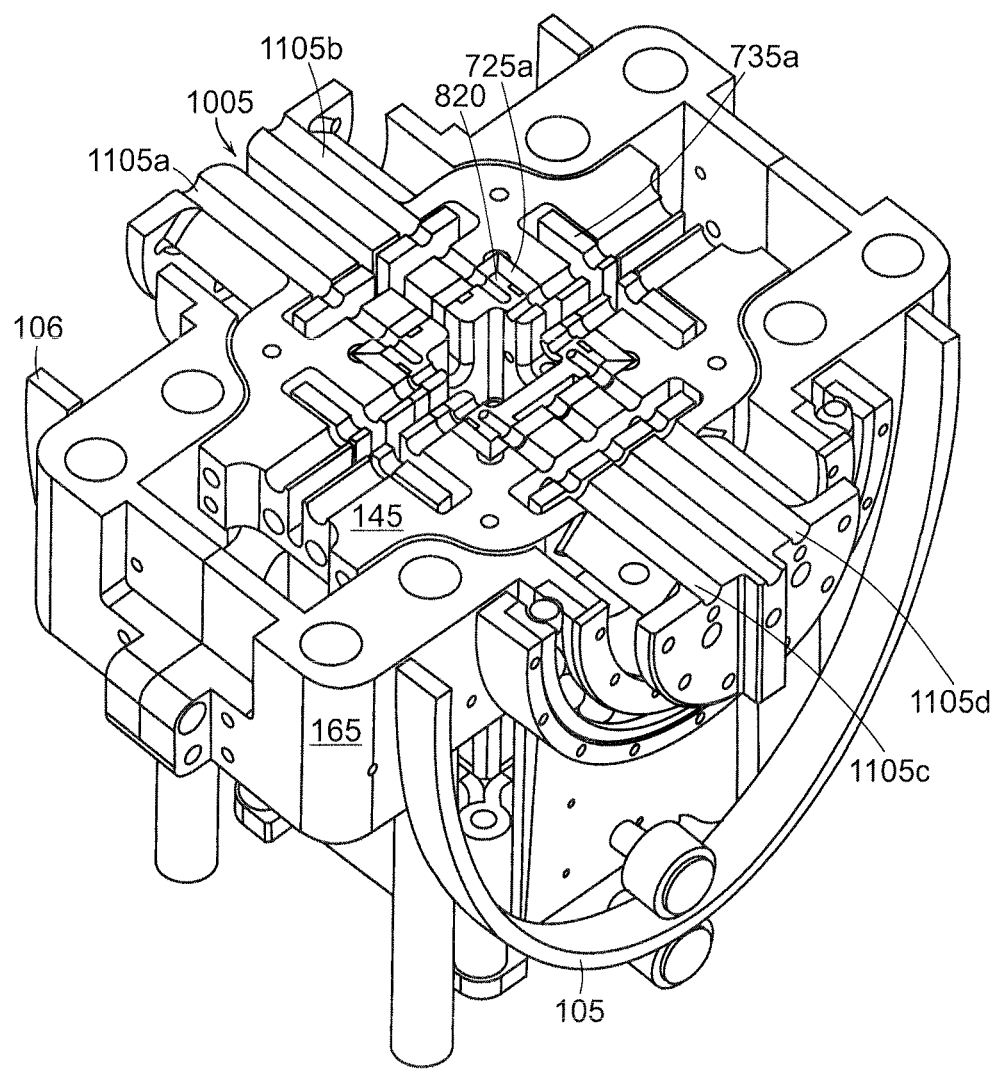
FIG. 11 illustrates a horizontal cross-section of an example rotary device.

FIG. 11 shows another cross-section of a rotary device as in FIG. 10, but at a point slight higher than the cross-section of FIG. 10. In addition to the channel 1005 for running wires or cooling lines, the cross-section shows channels 1105*a-d* for inserting fasteners, such as screws.

Figure 12A:
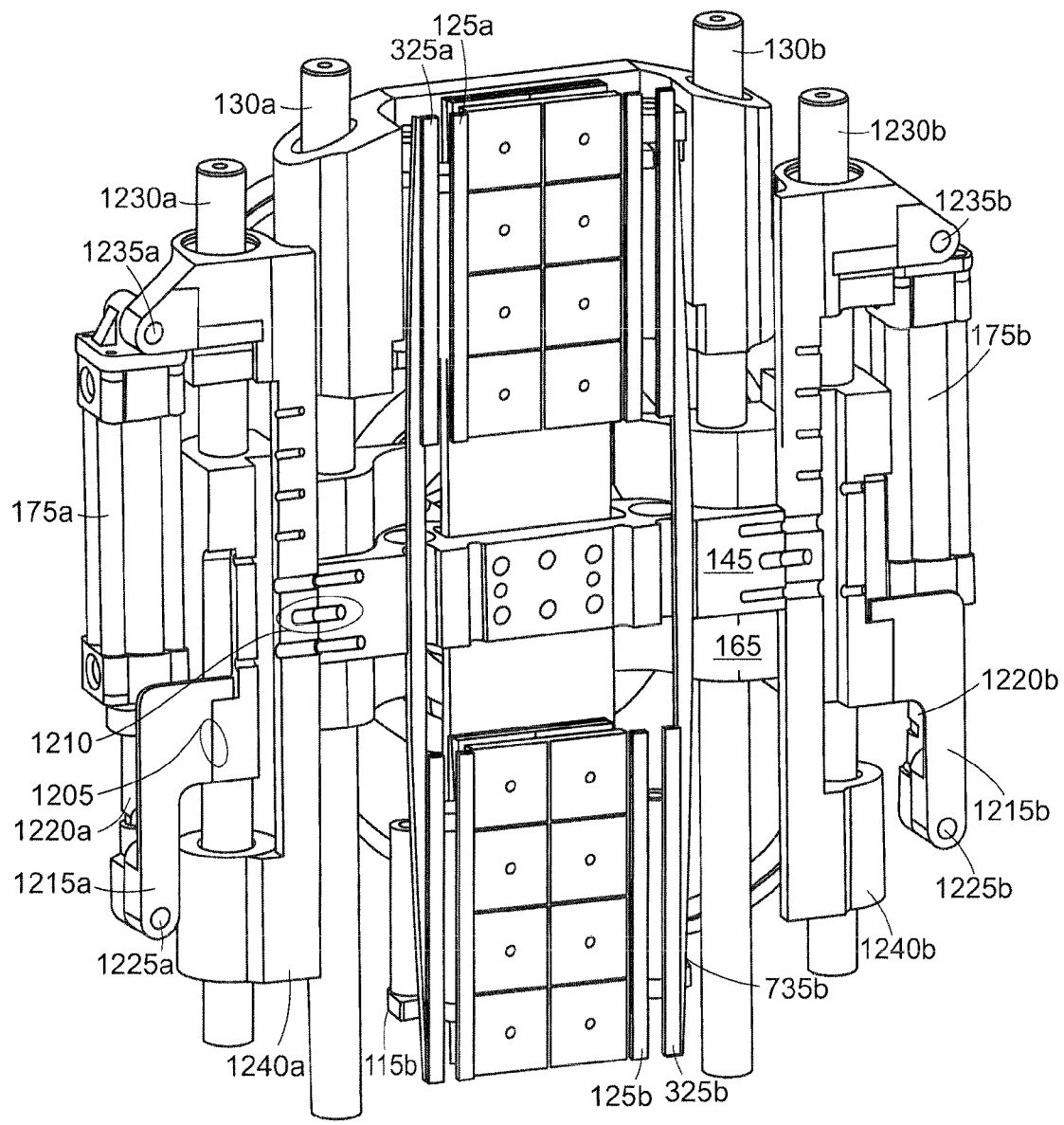
FIG. 12A illustrates a vertical cross-section of an example rotary device showing how a support structure of an example rotary device may be arranged.

FIG. 12A shows a vertical cross-section of the example rotary device. The cross-section shows how the support structure illustrated in FIGS. 5A and 5B may be slidably coupled to the magnetic stator assembly and the mount 145 using additional shafts 1230*a*, 1230*b* and fluid dampers 175*a*, 175*b*. As illustrated in FIG. 12A, the support structure 165 may be coupled to the lower rod of a fluid damper 175*a*. Specifically, a connecting arm 1215*a* pinned at point 1225*a* to the lower end of the rod 1220*a* is joined to the support at point 1205. An upper rod of the fluid damper 175*a* may be connected to the mount 145 of the device, which may be part of a vehicle's chassis. The mount 145 joins suspension arm 1240*a* at point 1210. The shaft 1230*a*, fixed to the support 165, slides through the suspension arm 1240*a* at opposite ends. The upper rod of the damper 175*a* is pinned to the suspension arm 1240*a* at point 1235*a*.

The fluid dampers 175*a*, 175*b* may be a pneumatic suspension, such as a piston with opposing gas chambers. The pressure of the gas in each chamber above and below the piston may also be dynamically adjusted to either change the position of the magnetic stator assembly and the mount 145 (e.g., move up or down) or to change the stiffness of the dampers 175*a*, 175*b*. To change the position of the magnetic stator assembly and the mount 145, pressure in the gas chambers may be adjusted so that the chambers have different pressures. For example, if the fluid dampers 175*a*, 175*b* each include a top and bottom chamber, more pressure would be applied to the top chamber to move the magnetic stator assembly and the mount 145 in the upward direction, and more pressure would be applied to the bottom chamber to move the magnetic stator assembly and the mount 145 in the downward direction. To change the stiffness of the dampers 175*a*, 175*b*, equal pressure may be added to or removed from the top and bottom chambers. If the rotary device is used in the wheel of a vehicle, changing the position of the magnetic stator assembly and the mount 145 can change the ride height of the vehicle, and changing the stiffness of the dampers 175*a*, 175*b* can change the stiffness of the vehicle's suspension.

The cross-section of FIG. 12A also shows the inside of the magnetic stator assembly. An example arrangement of the coil 115*b* of an electromagnetic actuator, inside magnetic stator component 125*b*, and outside magnetic stator component 325*b* can be seen through the cross-section. Also visible is the magnetic flux return path 735*b* for the outside magnetic stator component 325*b*.

Figure 12D:
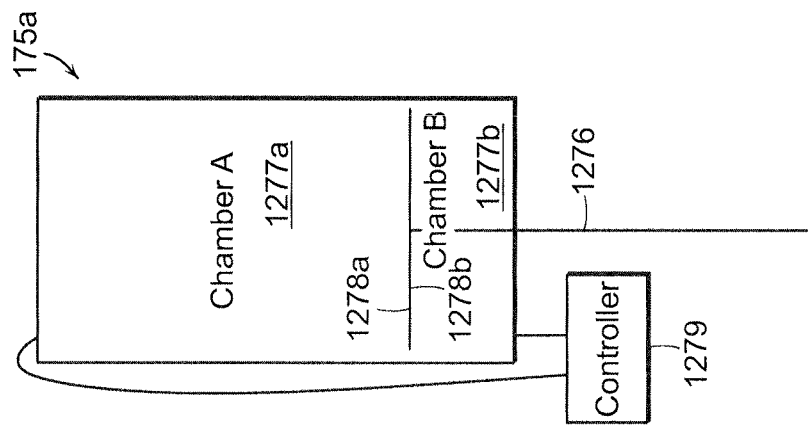
FIGS. 12B-12D illustrate an example tunable pneumatic suspension.
Figure 12C:
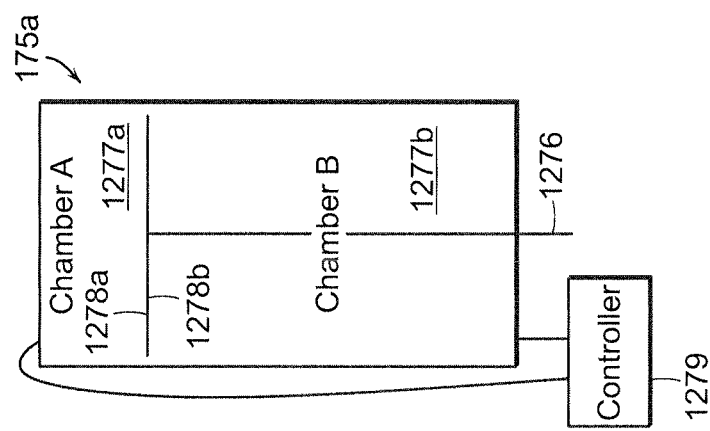
Figure 12B:
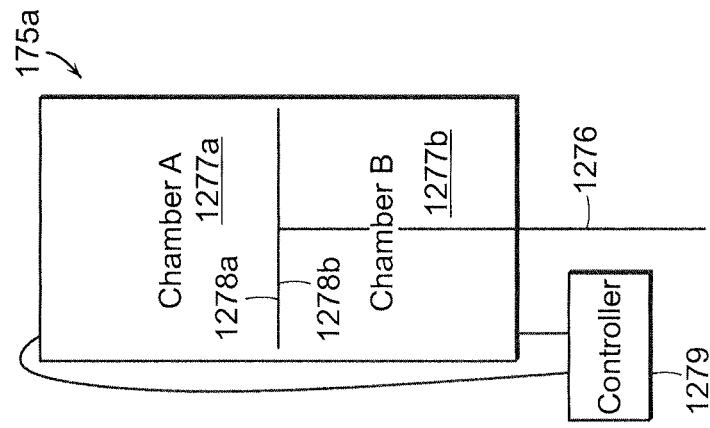

FIGS. 12B-12D illustrate an example tunable pneumatic suspension. FIG. 12B shows that the suspension 175*a* includes a piston 1276 and opposed chambers 1277*a*, 1277*b* applying respective opposed pneumatic pressures to opposite faces 1278*a*, 1278*b* of the piston 1276. The example suspension 175*a* includes a top chamber 1277*a* and a bottom chamber 1277*b*. Also shown is a pneumatic controller 1279 that independently controls the pneumatic pressures in the chambers 1277*a*, 1277*b*.

The pressures of the chambers 1277*a*, 1277*b* may be adjusted to change the relative positions of the piston 1276 and the chambers 1277*a*, 1277*b* by differing the pressures. For example, as shown in FIG. 12C, a higher pressure in the bottom chamber 1277*b* of the suspension 175*a*, as compared to the top chamber 1277*a*, exerts more force on the bottom face 1278*b* of the piston 1276, causing the piston 1276 and the bottom chamber 1277*b* to move away from each other. As shown in FIG. 12D, a higher pressure in the top chamber 1277*a*, as compared to the bottom chamber 1277*b*, exerts more force on the top face 1278*a* of the piston 1276, causing the piston 1276 and the top chamber 1277*a* to move to move away from each other. If the suspension 175*a* is part of a vehicle, this movement can change the ride height of the vehicle, the direction of the vehicle's movement depending on whether the chambers 1277*a*, 1277*b* or the piston 1276 are coupled to the chassis of the vehicle. Either the chambers 1277*a*, 1277*b* or the piston 1276 may be grounded, while the other is coupled to the chassis of the vehicle.

In addition to changing the position of the piston 1276, the pressures of the chambers 1277*a*, 1277*b* may be adjusted to change the stiffness of the suspension 175*a* by adding or removing equal pressures to or from the chambers 1277*a*, 1277*b*. Adding equal pressure to both chambers 1277*a*, 1277*b* increases the stiffness of the suspension 175*a*, and removing equal pressures from both chambers 1277*a*, 1277*b* decreases the stiffness of the suspension 175*a*. If the suspension 175*a* is part of a vehicle, changing the stiffness of the suspension 175*a* can change the stiffness of the vehicle's ride.

Figure 13A:
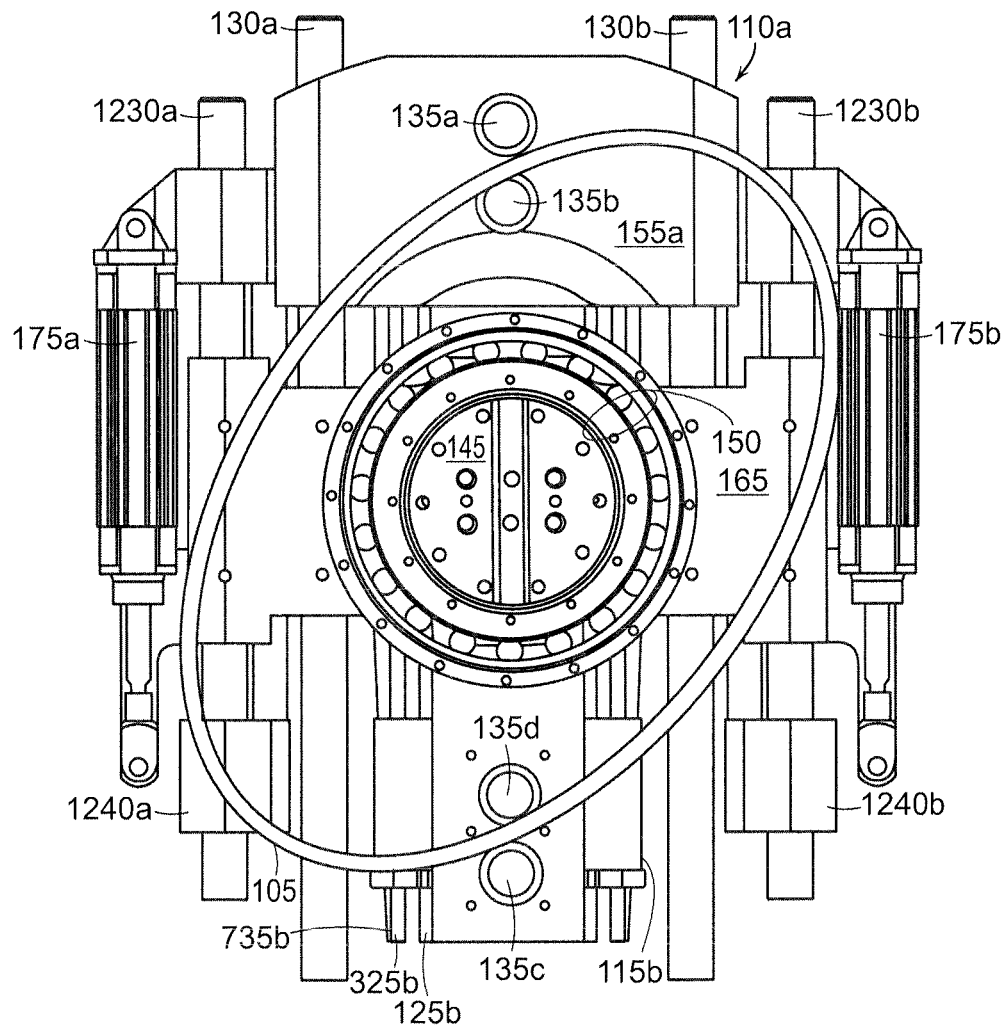
FIGS. 13A and 13B illustrate an example rotary device at different vertical positions.

FIG. 13A illustrates an example rotary device incorporating many of the above-described features. The rotary device includes, for example, a cam 105, two opposed electromagnetic actuators (including an example housing 155*a* and coil 115*b*), a magnetic stator assembly (including an example inner magnetic stator component 125*b*, outer magnetic stator component 325*b*, and outer magnetic flux return path 735*b* for the outer magnetic stator component 325*b*), mount 145, suspension arms 1240*a*, 1240*b*, followers 135*a-d*, support structure 165, rotary bearing 150, shafts 130*a*, 130*b*, 1230*a*, 1230*b*, and fluid dampers 175*a*, 175*b*.

Figure 13B:
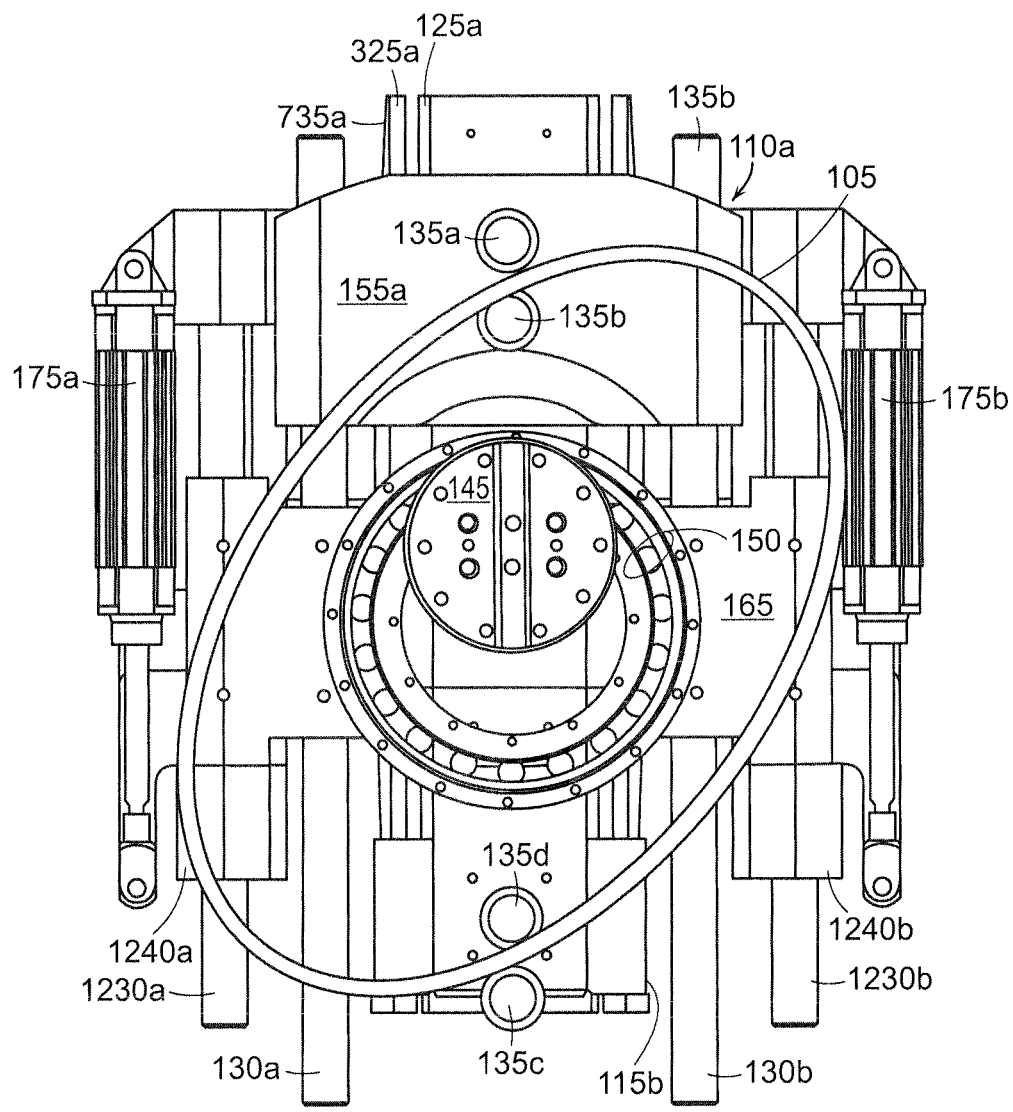

FIG. 13B illustrates the rotary device of FIG. 13A, but where the fluid dampers 175*a*, 175*b* have been used to raise the magnetic stator assembly and the mount 145 by, for example, applying more pressure to a top chamber within each of the fluid dampers 175*a*, 175*b*. As illustrated in FIG. 13B, the fluid dampers 175*a*, 175*b*, suspension arms 1240*a*, 1240*b*, magnetic stator assembly and the mount 145 are in a vertically higher position than illustrated in FIG. 13A.

Figure 14A:
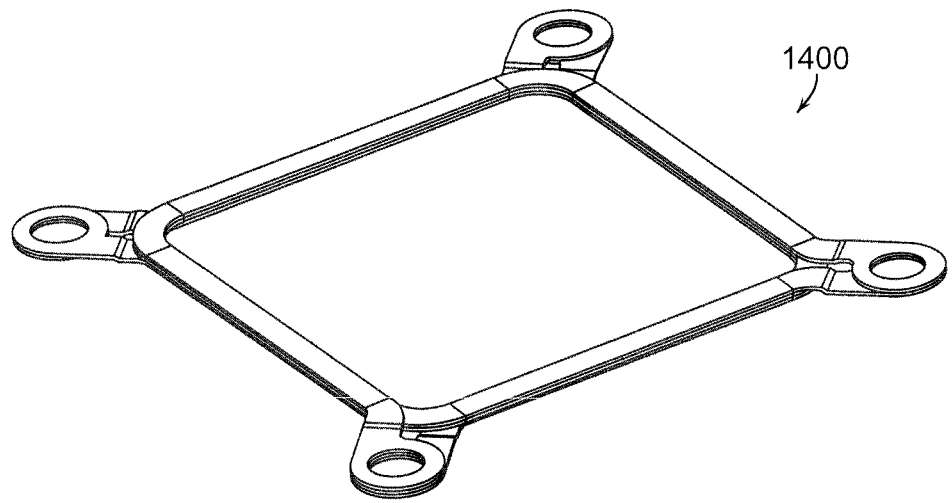
FIGS. 14A-14C illustrate the construction of an example coil of an electromagnetic actuator.
Figure 14B:
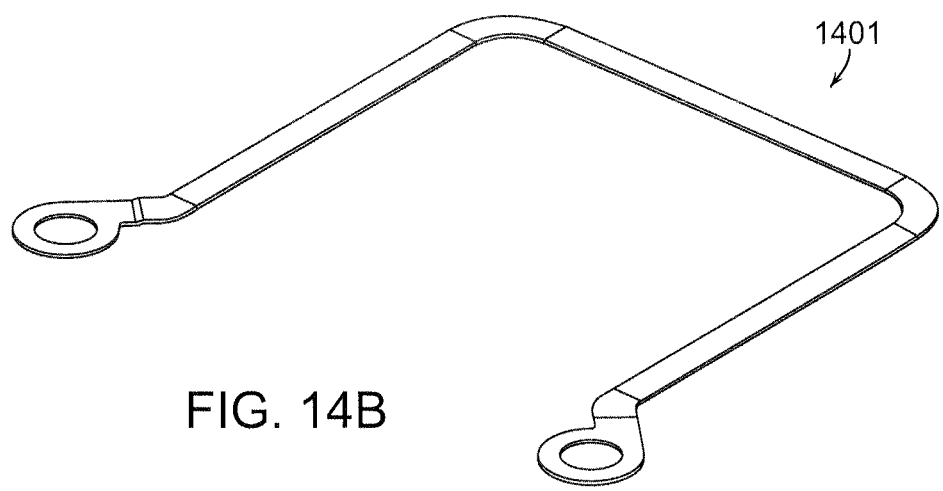
Figure 14C:
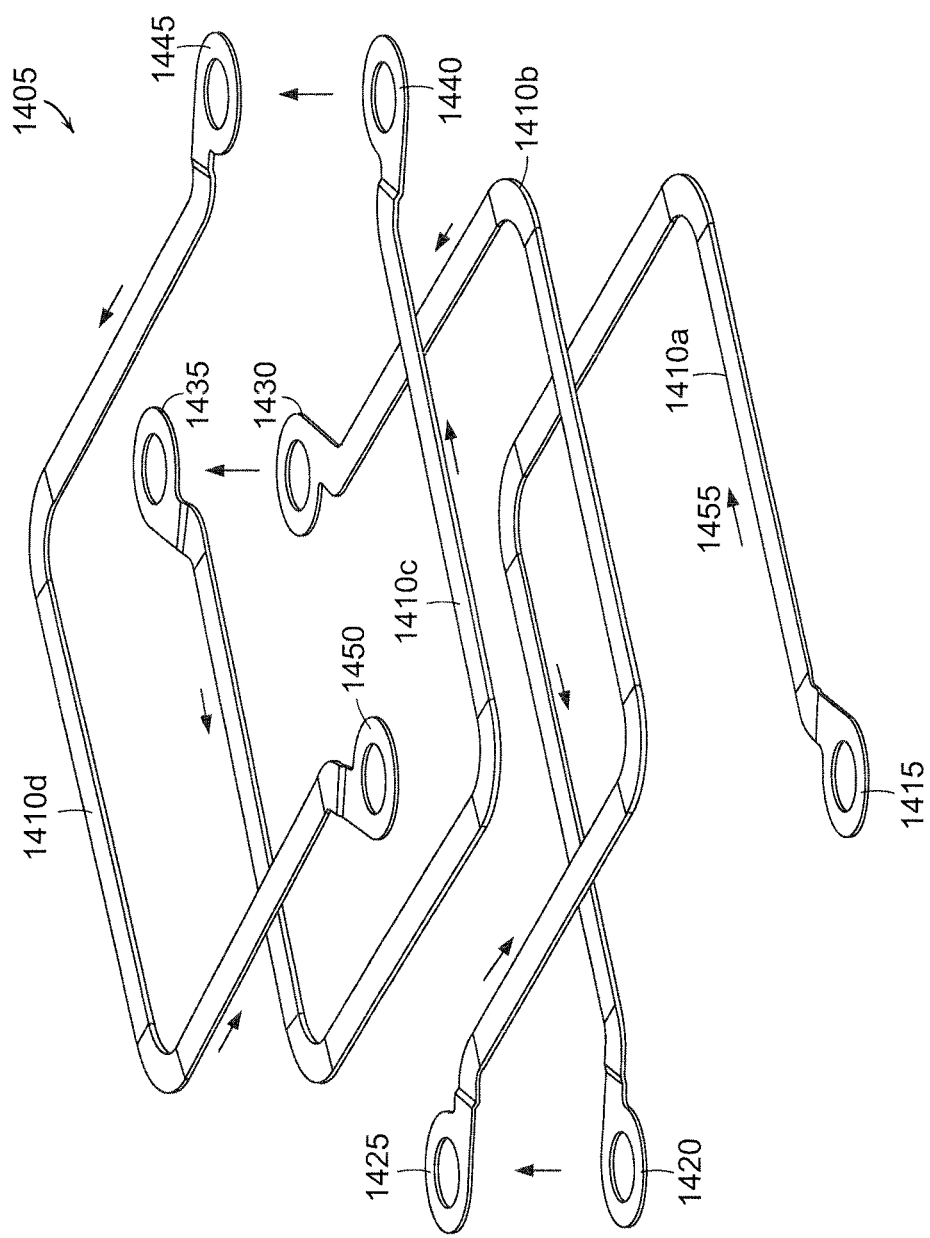

FIGS. 14A-14C illustrate the construction of an example coil from one of the electromagnetic actuators. Instead of being made from one continuous piece of material, the coil may include multiple flat coil segments stacked together and electrically coupled in series. FIG. 14A illustrates four coil segments that are combined into one coil 1400. The coil of a given electromagnetic actuator may include a number of such coils. FIG. 14B illustrates one of the coil segments 1401. FIG. 14C illustrates an exploded view 1405 of the coil of FIG. 14A. Each segment 1410a-d of the example coil may be a flat, U-shaped piece of metal formed by, for example, a stamping or etching process. The segments 1410a-d may be assembled in the configuration shown in FIG. 14C to form a full coil.

FIG. 14C shows four U-shaped coil segments 1410a-d that are stacked on top of each other, where each segment is rotated 270 degrees (or 90 degrees depending on the direction of rotation) with respect to the coil segment it follows in the stack of coil segments. In stacking the segments 1410a-d in rotated positions, the segments 1410a-d may be positioned so that a starting end 1425 of an upper coil segment 1410b in the stack interfaces a finishing end 1420 of an immediately lower coil segment 1410a in the stack. The coil including the four U-shaped coil segments 1410a-d, for example, loops around three times to finish at the same relative position (e.g., ends 1415 and 1450) that it started.

Electric current may flow through the coil, for example, from a starting end of a bottom-most coil segment in the stack to a finishing end of a top-most coil segment in the stack. In the example coil, when assembled, electrical current 1455 may flow through the coil, for example, from a starting point 1415 to an ending point 1450. The current 1415 may begin at point 1415 and flow counter-clockwise around segment 1410a to point 1420. At point 1420, the current continues to point 1425 as points 1420 and 1425 are in electrical contact with each other once assembled, as shown, for example, in FIG. 14A. From point 1425, the current 1415 flows counter-clockwise around segment 1410b to point 1430, where the current continues to point 1435 as described above. From point 1435, the current 1415 flows counter-clockwise around segment 1410c to point 1440, where the current continues to point 1445, and flows counter-clockwise around segment 1410d to point 1450. If combined with other segments, the current may continue to flow from one segment to a subsequent segment in a longer coil. Overall, a method of manufacturing such an electric coil includes fabricating the multiple flat coil segments, stacking the multiple coil segments together where each coil segment is rotated with respect to the coil segment it follows, and fastening the coil segments together to form the electric coil.

To prevent the electrical current from straying from the above-described path, each segment may be coated with an electrically-insulating layer of material, except for the surfaces between which the current is meant to propagate, such as the top surface of point 1420 and the bottom surface of point 1425. Alternatively, instead of being coated, layers of electrically-insulating material may be inserted between the coil segments. When the coil segments 1410a-d are assembled in the form illustrated in FIG. 14A, fasteners, such as bolts, may be inserted through the openings shown at points 1415, 1420, 1425, 1430, 1435, 1440, 1445, and 1450. The segments 1410a-d may also be joined by soldering or brazing in addition to, or instead of, preloading the mechanical and electrical connections with fasteners. When the segments 1410a-d are assembled, there may remain gaps between some of the above points. To allow the fasteners to tightly secure the coil segments 1410a-d together, electrically-insulating spacers may be inserted between the points to fill the gaps. For example, when the segments 1410a-d are assembled, a gap may remain between points 1415 and 1450, and one or more spacers may be inserted between points 1415 and 1450 to fill the gap. On the other hand, no gap should exist between points 1420 and 1425. The fasteners may also be insulated using, for example, heat shrink tubing.

The coil segments 1410a-d may be mechanically and electrically joined together using bolts that pass through openings included in the segments 1410a-d, where the openings are positioned outside the coil path so that a continuous, helical, flat coil may be formed. Fabricating coil segments at a constant thickness may be simple and inexpensive, but, at a constant thickness, the coil segment connections may occur outside the coil path so that intermediate segments do not overlap with the connection points. The shape of the connection points 1415, 1420, 1425, 1430, 1435, 1440, 1445, 1450 may be chosen-so that there is adequate contact area for a good mechanical connection that produces an acceptable contact resistance between the segments. The coil segments may be electroplated, with gold or nickel for example, to further reduce the contact resistance.

The connection points 1415, 1420, 1425, 1430, 1435, 1440, 1445, 1450 may be raised or lowered so that the coil path continues in a smooth manner, without any sudden ledges or stress points, and with the connection centered at the level of connection. For example, for the connection between segments 1410a and 1410b, point 1420 may be lowered and point 1425 may be raised, as illustrated in FIG. 14C. The amount that the points are raiser or lowered by may be one-half of the thickness of the segments 1410a-d. The overall helical path may be set by slight inclines, or a continuous incline, included in supporting structures immediately above and below the coil. The supporting structures may be clamped-down on the coil when the bolts are tightened, and can also include starting levels for the four bolts so that the coil may be formed with smooth transitions and minimal deformation in the segments 1410a-d when the bolts are tightened. A similar approach is possible where three bolts are used and segments repeat more frequently, possibly forming a triangular shaped coil. Use of a greater number of bolts is also possible. The segments may also be fabricated so that a circular path is formed, rather than a rectangular one.

Instead of including raised and lowered sections in the coil segments 1410a-d, the connection points 1415, 1420, 1425, 1430, 1435, 1440, 1445, 1450 may be of half-thickness, where two segments join together to yield the coil path thickness, and the path would continue smoothly. This type of connection may overlap with intermediate segments to a larger degree. Additionally, in some devices, added stress and deformation caused by not raising and lowering the connection points 1415, 1420, 1425, 1430, 1435, 1440, 1445, 1450 in the segments 1410a-d may be acceptable, and the tensioning in the bolts may be used to give the segments 1410a-d their final shape.

Figure 15:
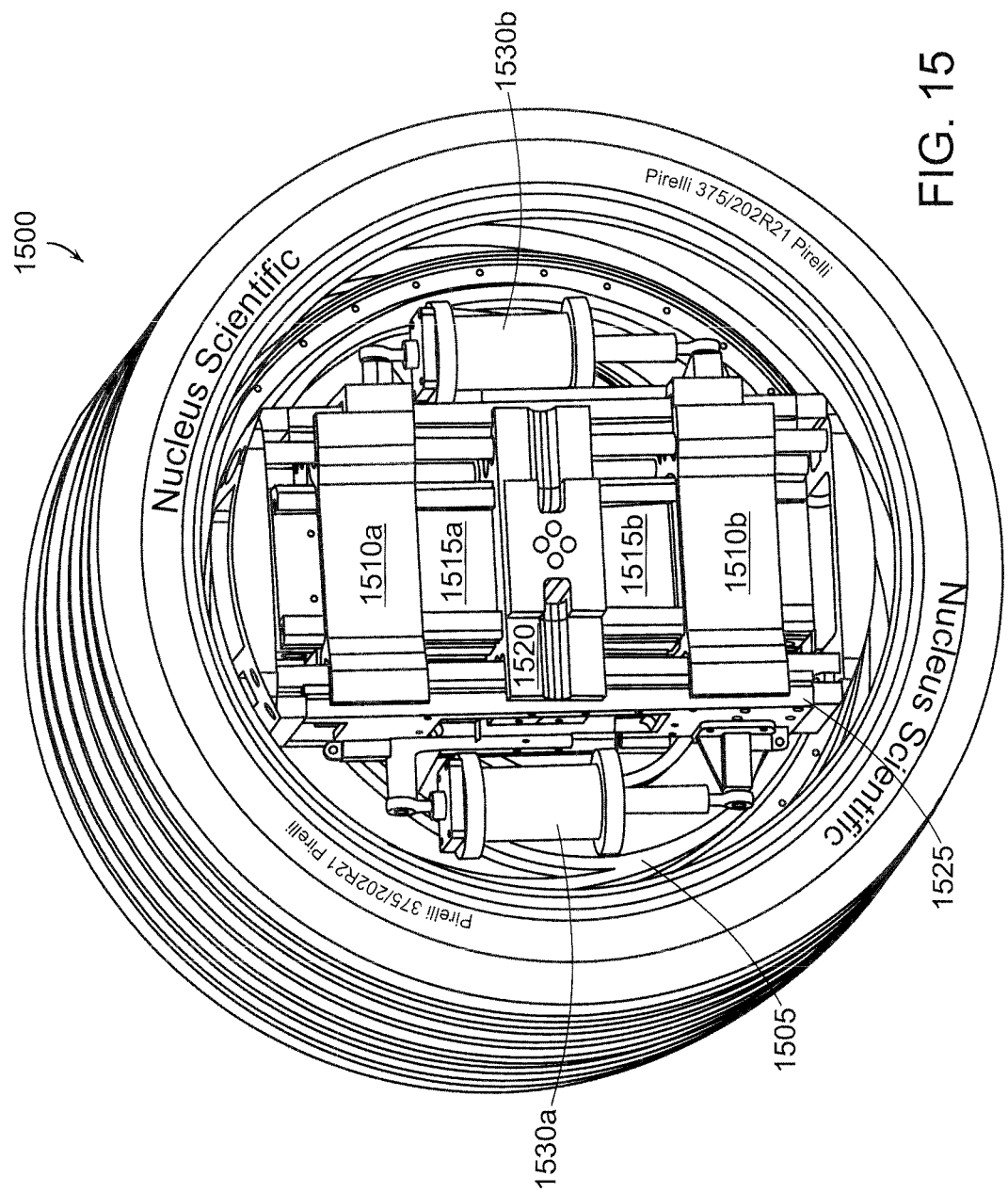
FIG. 15 illustrates a wheel that includes an example rotary device.

FIG. 15 illustrates another example rotary device 1500 inside a wheel. As with the devices described above, the device 1500 may be attached to the chassis of a vehicle. The device 1500 includes a cam 1505, two opposed electromagnetic actuators 1510a, 1510b, a magnetic stator assembly 1520 (including magnetic stators 1515a, 1515b), a support structure 1525, and fluid dampers 1530a, 1530b. The rotary device depicted inside the wheel may be attached to the wheel via the cam 1505 as described below.

Figure 16A:
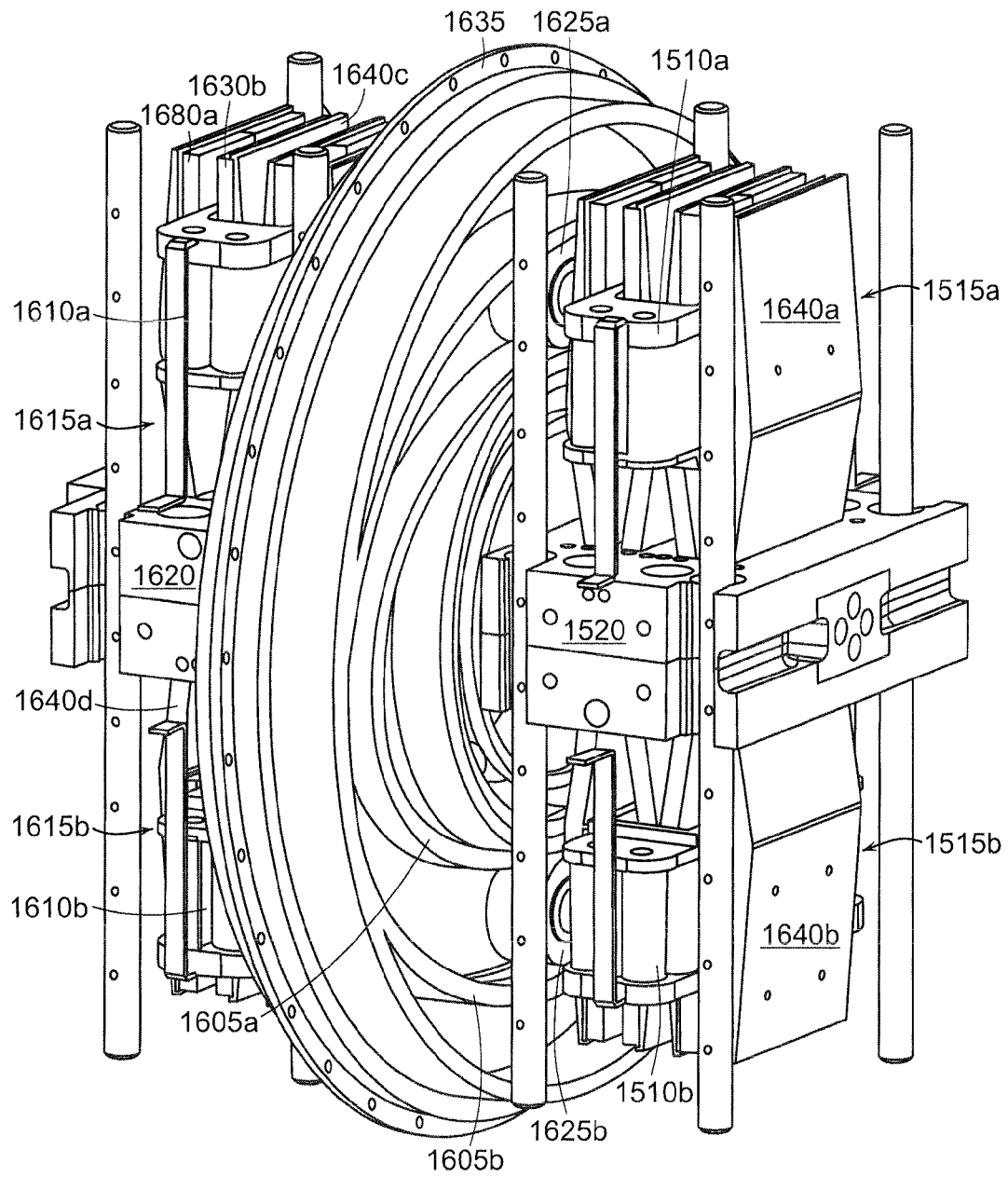
FIGS. 16A and 16B illustrate different views of an example rotary device.

FIG. 16A illustrates the example rotary device 1500 with the tire of the wheel, and some other components, removed. The device 1500 is similar to the devices described above, but includes a central disc 1635 sandwiched between to pairs of electromagnetic actuators 1510a, 1510b, 1610a, 1610b and two magnetic stator assemblies 1520, 1620. Each of the magnetic stator assemblies 1520, 1620 includes two magnetic stators 1515a, 1515b, 1615a, 1615b, which include magnetic flux return paths 1640a-d and magnets (e.g., 1630a, 1630b). The housings surrounding the coils of the electromagnetic actuators 1510a, 1510b, 1610a, 1610b are not shown. Each coil reciprocates along four arrays of magnets, which, as described above, may include multiple magnets. Two of the magnet arrays are located inside the coil (e.g., inner magnetic stator component 1630b) and two are located outside the coil (e.g., outer magnetic stator component 1630a). Each set of magnets are mounted to a magnetic flux return path 1640a-d.

The disc 1635 includes two cams, one on either side of the disc 1635. Each cam of the example device is in the form of a grove that includes an inner surface 1605a and an outer surface 1605b. Coupled to electromagnetic actuators 1510a and 1510b are two pairs of followers 1625a, 1625b, the different followers of each pair interfacing with a respective surface 1605a, 1605b of the cam. Electromagnetic actuators 1610a and 1610b are similarly coupled to followers. As the coils move towards each other, one of the followers of each electromagnetic actuator 1510a, 1510b exerts force on the inner surface 1605a of the cam. As the coils move away from each other, the other follower exerts force on the outer surface 1605b of the cam.

Figure 16B:
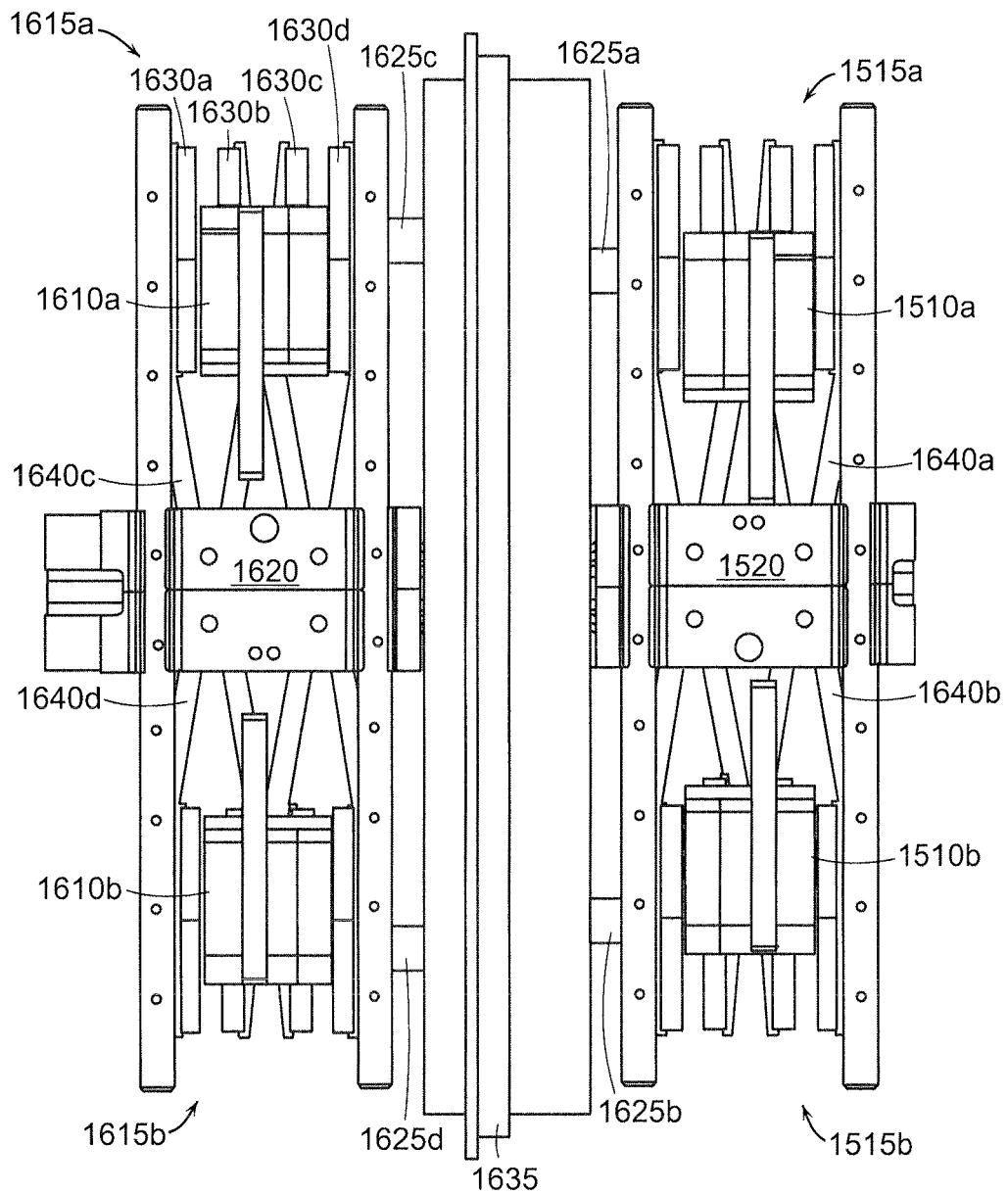

FIG. 16B illustrates a different view of the example rotary device 1500. It should be apparent that each pair of electromagnetic actuators (pair 1510a, 1510b and pair 1610a, 1610b) are at different phases of reciprocation. This is because, in the example device, the cams on either side of the disc 1635 are rotationally offset from each other by, for example, forty-five degrees. This helps to prevent the actuators from stopping at a point on the cams from which it would be difficult to again start. Thus, if one pair of actuators stops on a "dead-spot" of its respective cam, the other pair of actuators would not be at a dead-spot. Alternatively, if the cams were not offset from each other, or if only one cam were used, a controller may control the rotation of the cam so that the actuators do not stop on a dead spot. FIG. 16B also illustrates an arrangement of the coils and magnetic stator components. For example, magnetic stators components 1630b and 1630c are located inside the coil of actuator 1610a, and magnetic stators components 1630a and 1630d are located outside the coil.

Figure 16C:
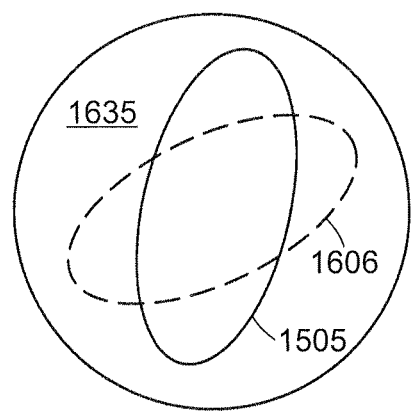
FIGS. 16C and 16D illustrate two rotationally offset cams.

FIG. 16C illustrates two rotationally offset cams 1505, 1606. The cams 1505, 1606 may be part of or mounted on a disc 1635. One cam 1505 may be on one side of the disc 1635, and the other cam 1606 may be on the opposite side, as indicated by the dashed line. In some devices the cam may be offset by forty-five degrees, for example. The cams 1505, 1606 may have any even number of lobes. Cams having two lobes, for example, may be offset by forty-five degrees. Cams having four lobes, for example, may be offset by twenty-two and a half degrees.

Figure 16D:
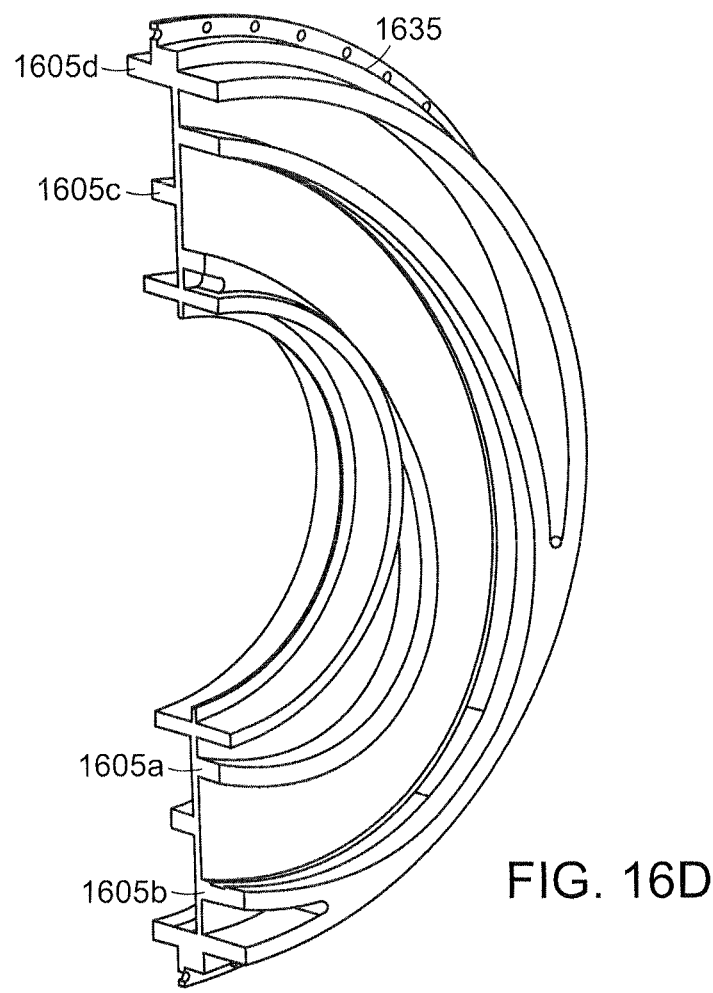

FIG. 16D illustrates a vertical cross-section of a disc 1635 with two rotationally offset cams, each having in inner surface 1605a, 1605c and an outer surface 1605b, 1605d. Due to the offset, the inner surfaces 1605a, 1605c are not in line with each other. Likewise, the outer surfaces 1605b, 1605d are also not in line with each other.

Figure 16E:
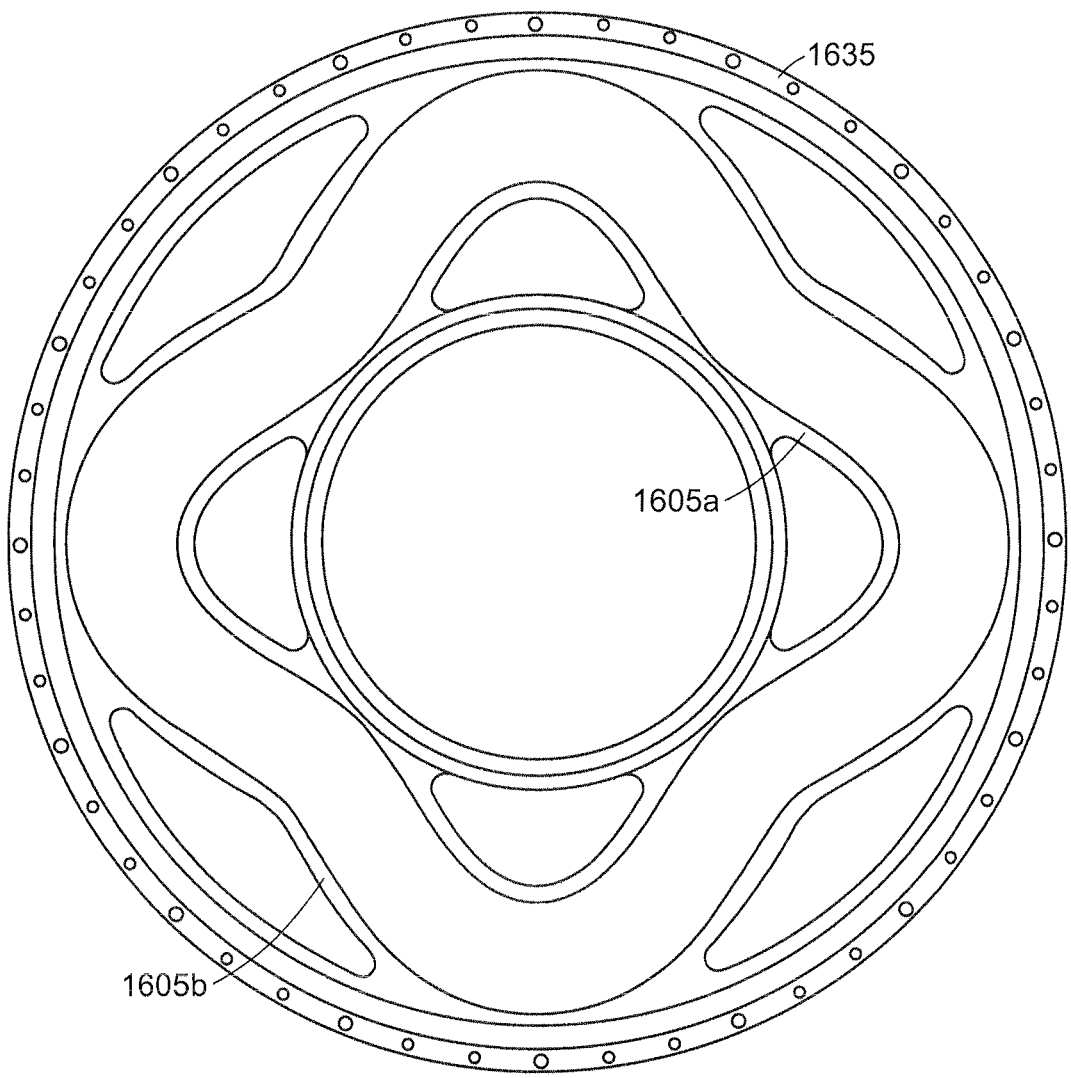
FIG. 16E illustrates an example shape of a cam.

FIG. 16E illustrates that the inner and outer surfaces 1605a, 1605b of a cam may be shaped in a complex pattern, such as, for example, a shape having an even number of lobes. As noted above, the sides of each lobe may be shaped in the form of a sine wave or portions of an Archimedes spiral, for example. The inner and outer surfaces 1605a, 1605b illustrated in FIG. 16E each have four lobes.

Figure 17A:
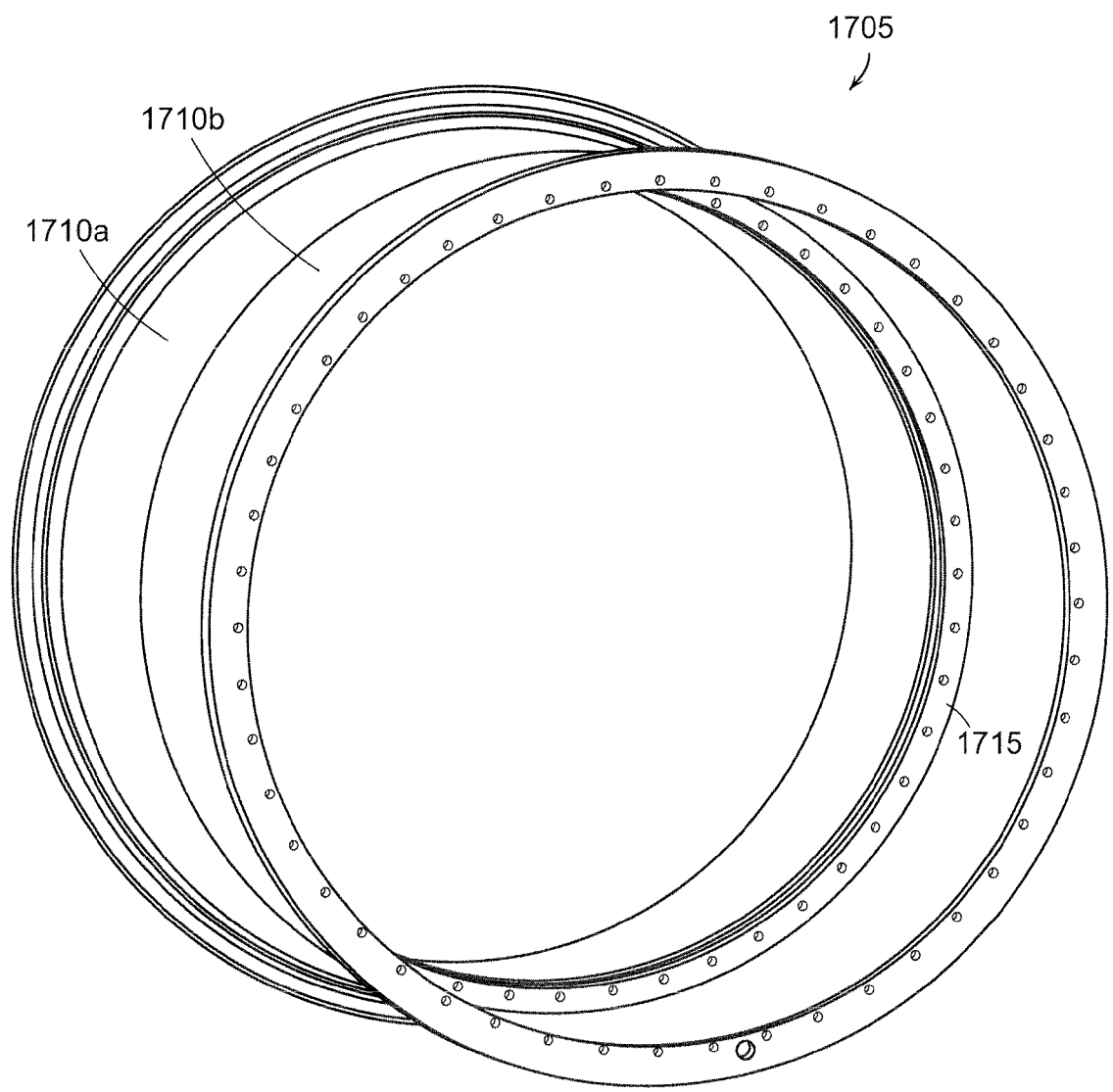
FIGS. 17A and 17B illustrate a disc of an example rotary device coupled to a rim of a wheel.
Figure 17B:
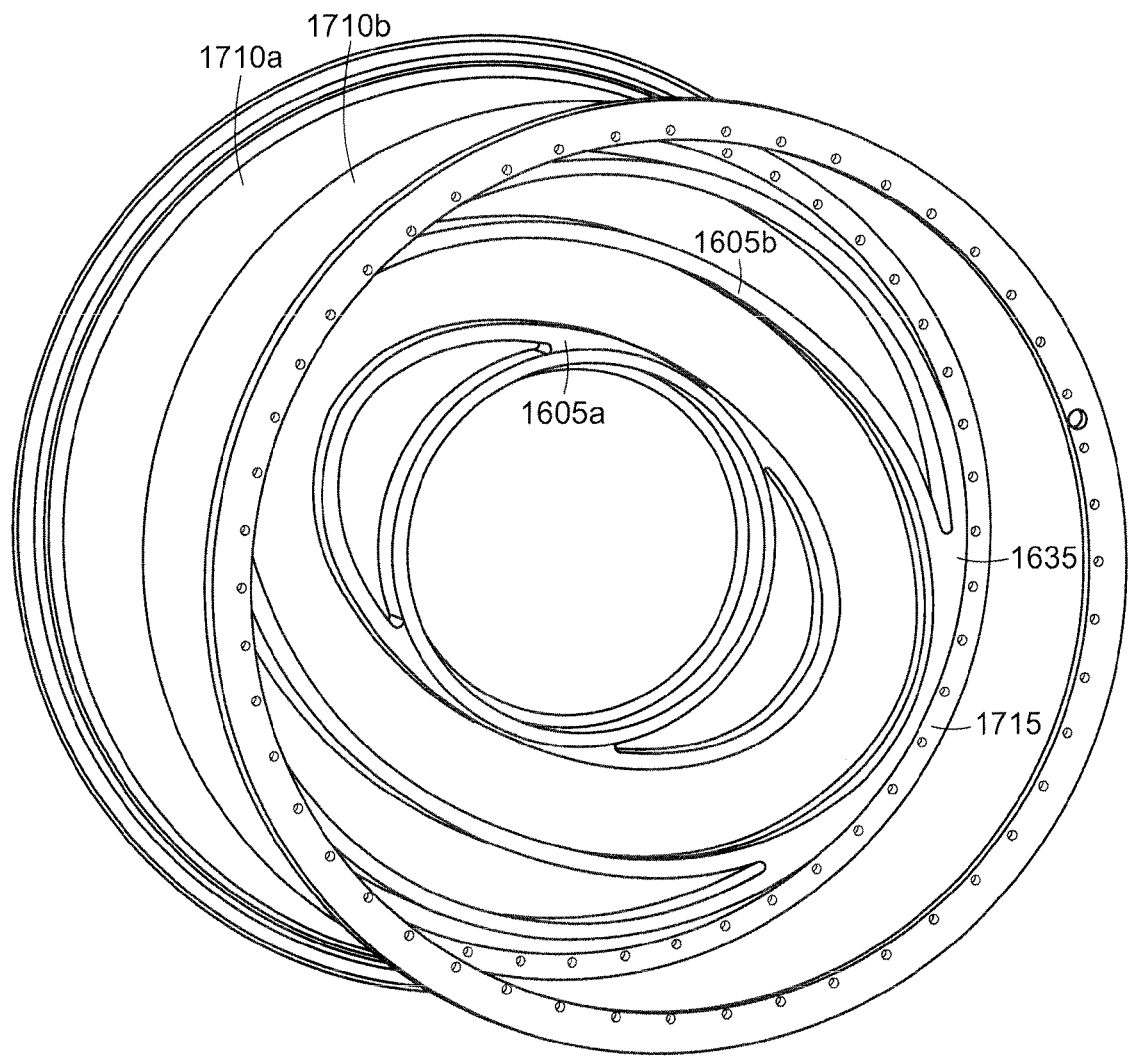

FIG. 17A illustrates how the disc 1635 of the example rotary device may be coupled to the rim 1705 of a wheel. The rim 1705 may consist of one piece to which the disc 1635 may be affixed using fasteners, such as bolts, along an inner ring 1715. Alternatively, the rim 1705 may include two parts 1710a, 1710b that bolt together along ring 1715. When fastened together, the two parts 1710a, 1710b form a full rim 1705 with inner ring 1715. A tire may then be mounted to the rim 1705. FIG. 17B shows how the disc 1635 may be fastened to the inner ring 1715 of the disc 1635.

Figure 18:
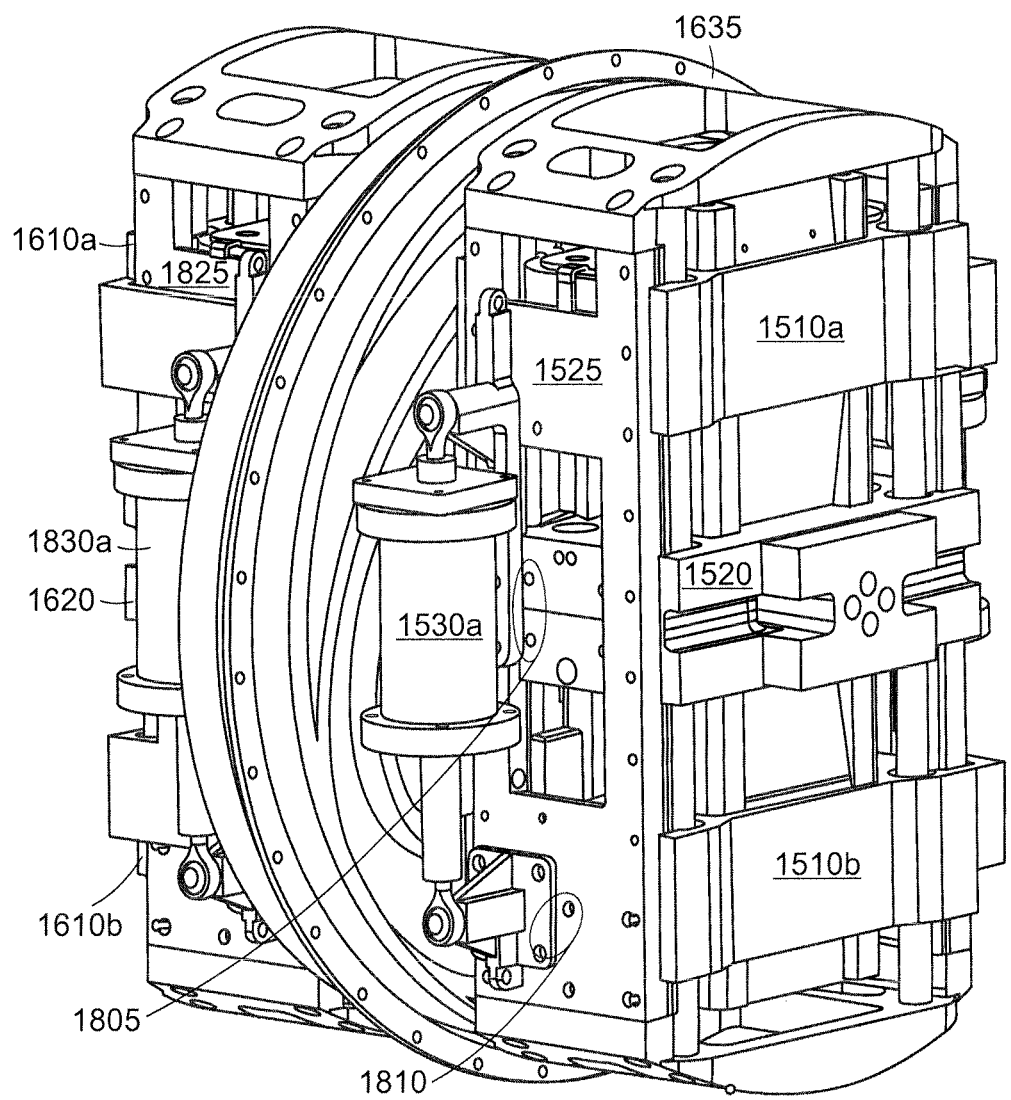
FIG. 18 illustrates two support structures coupling respective magnetic stator assemblies with electromagnetic actuators through a plurality of shafts and fluid dampers.

FIG. 18 illustrates two support structures 1525, 1825 coupling respective magnetic stator assemblies 1520, 1620 with electromagnetic actuators 1510a, 1510b, 1610a, 1610b through a plurality of shafts and fluid dampers 1530a, 1530b, 1830a. Support structure 1525 is slidably coupled to magnetic stator assembly 1520 using fluid dampers 1530a, 1530b. Fluid damper 1530a may be coupled to the support structure 1525, for example, at point 1810 and coupled to magnetic stator assembly 1820a at point 1805. Likewise, support structure 1825 is slidably coupled to magnetic stator assembly 1620 using fluid damper 1830a and a corresponding fluid damper (now shown) on the far side of the device.

Figure 19A:
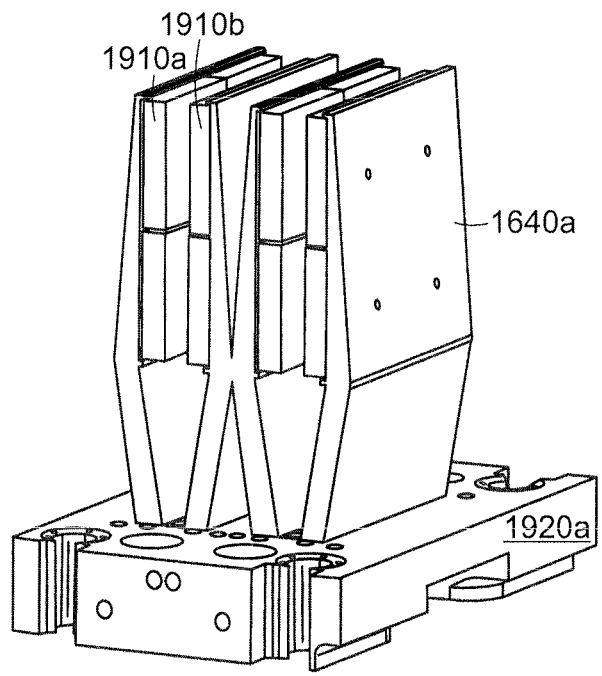
FIGS. 19A-19C illustrate an example arrangement of magnetic stators.
Figure 19B:
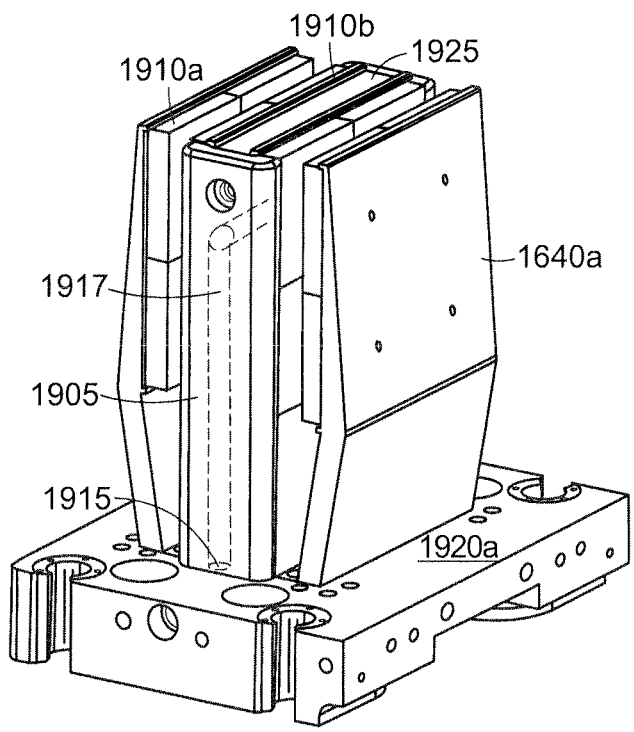
Figure 19C:
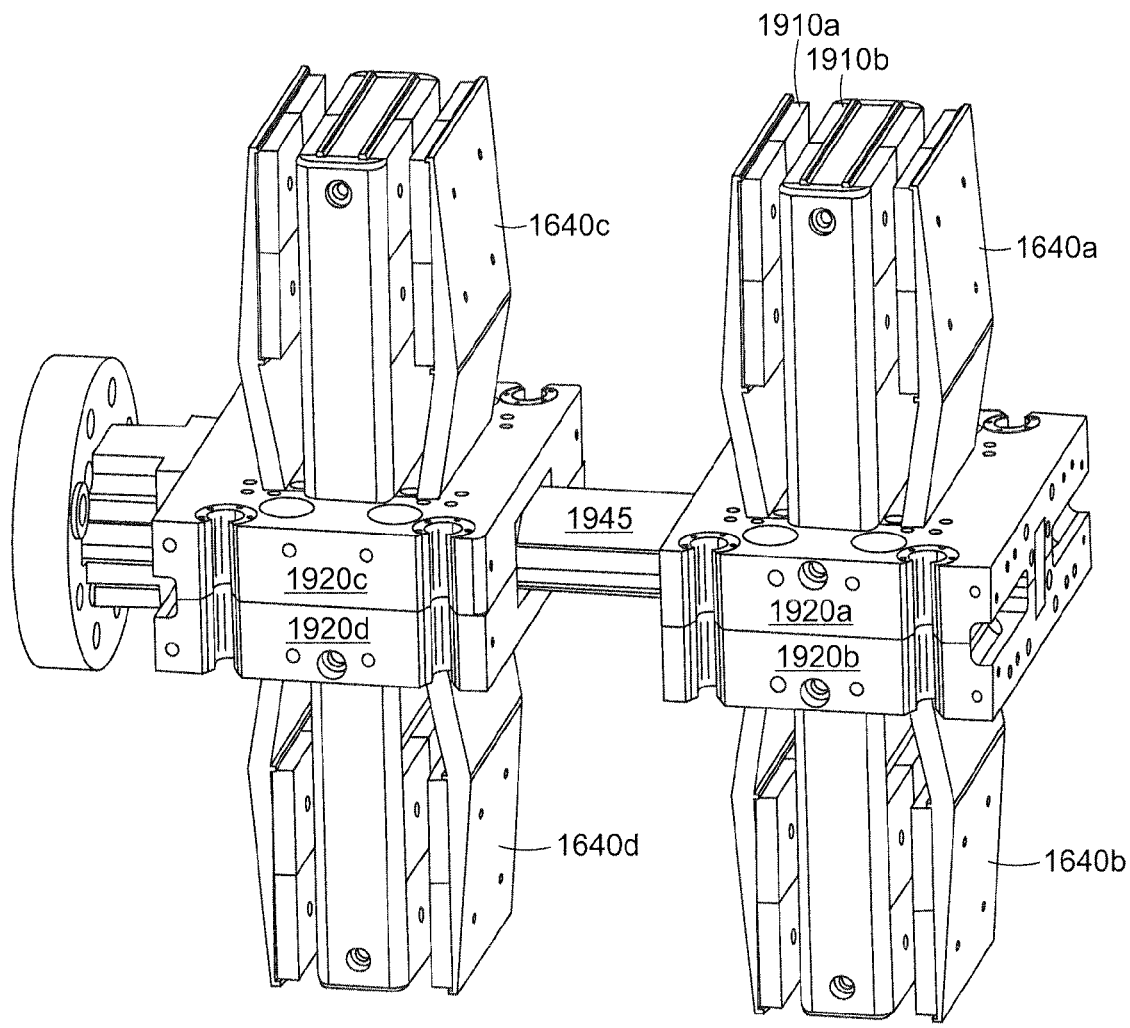

FIGS. 19A-19C illustrate an example arrangement of the components of a magnetic stator assembly. Referring to FIG. 19A, magnet array 1910a is an outer magnet array and magnet array 1910b is an inner magnet array. The overall magnetic flux return path 1640a supports the magnet arrays. The particular geometric shape of the example return path 1640a allows the return path 1640a to be formed using a cost-effective extrusion process. Specifically, four flux paths may be joined together at a center junction and two end junctions, and many such structures may be cut from a single extrusion. Also illustrated is a base structure 1920a on which the magnetic stator components may be mounted.

FIG. 19B illustrates a component 1905 used to deliver liquid coolant to the magnets, which may be sprayed onto the coils as they pass by the magnets. Liquid coolant may be transported from the base structure 1920a to the magnet arrays 1910a, 1910b through a component 1905 that is fastened along the edge of the return path 1640a. The liquid may flow through an opening 1915 in the base structure 1920a, through a channel 1917 of the component 1905, and into a chamber 1925 located in a gap formed by parts of the return path 1640a. From inside the chamber 1925, the liquid coolant may be directed through openings (e.g., holes) in the magnet arrays 1910a, 1910b and sprayed onto the coils as they reciprocate by the openings.

FIG. 19C illustrates four magnetic stators that are coupled to a central mount 1945. If the rotary device is employed in the wheel of a vehicle, for example, the mount 1945 may be coupled to the chassis of the vehicle.

Figure 20A:
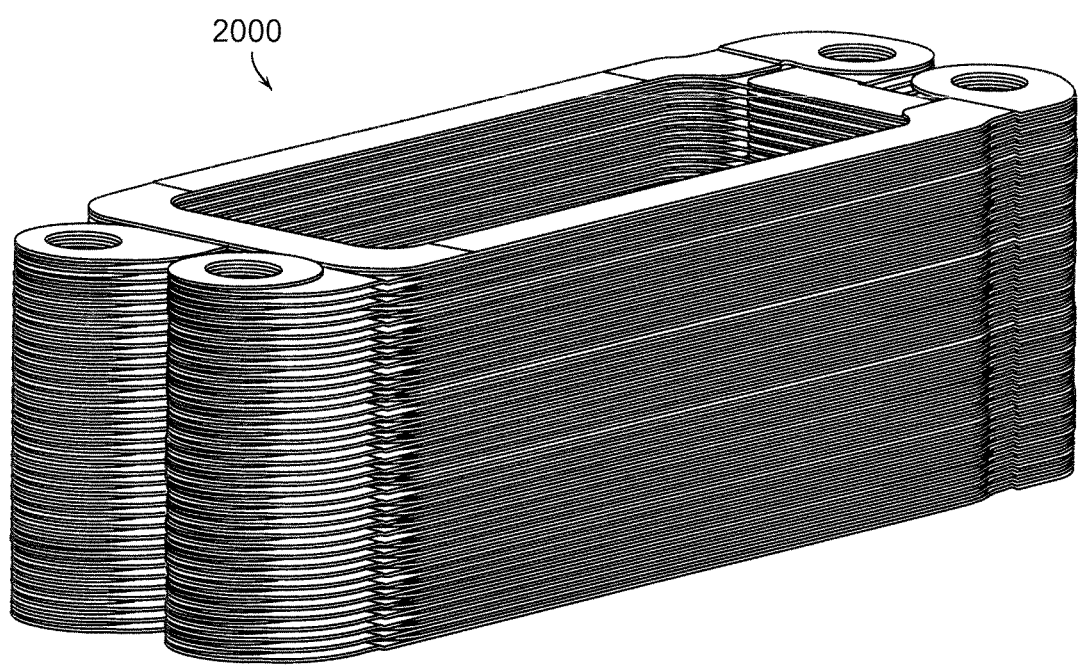
FIGS. 20A-20G illustrate the construction of an example coil of an electromagnetic actuator.
Figure 20B:
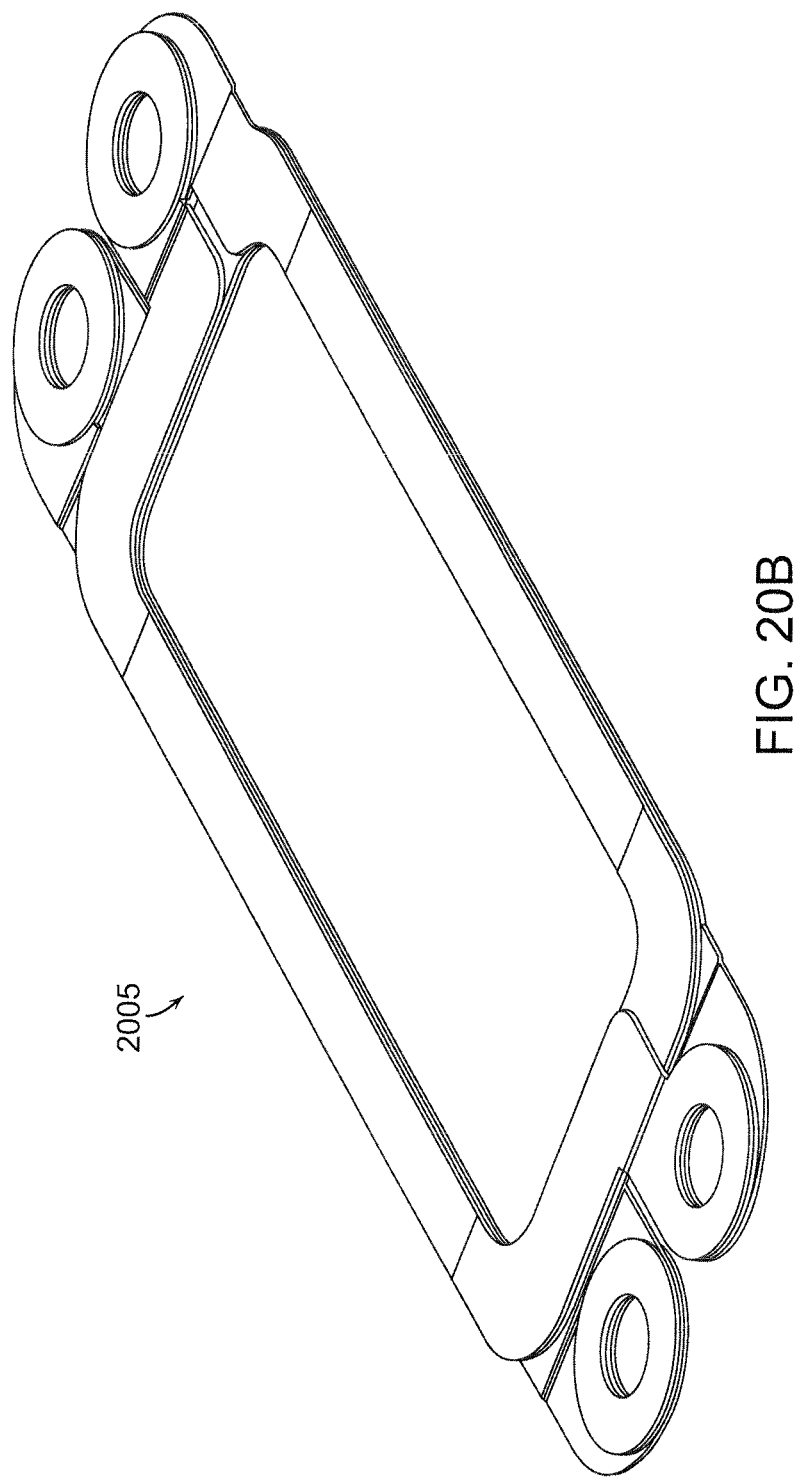
Figure 20C:
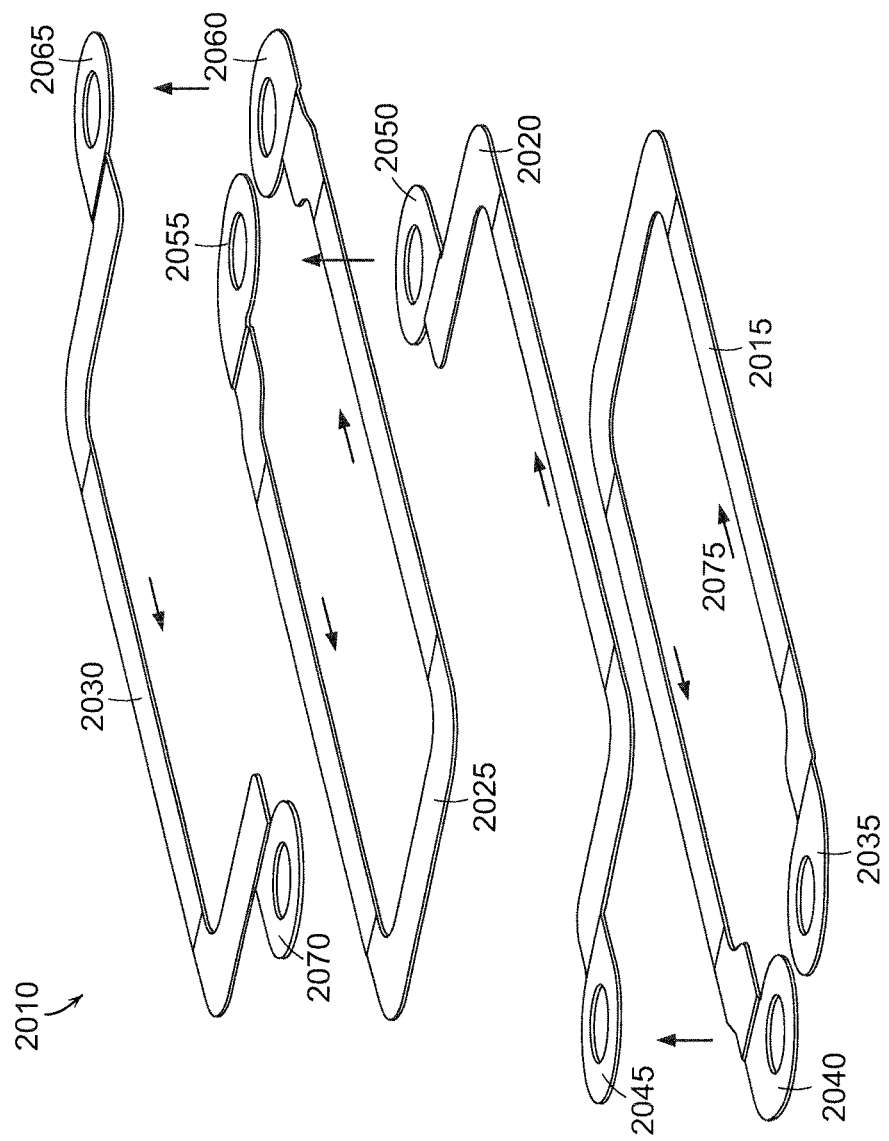

FIGS. 20A-20G illustrate the construction of an example coil from one of the electromagnetic actuators. FIG. 20A shows an entire coil 2000 from an electromagnetic actuator. It should noted that the coil 2000 may consist of many smaller coils. FIG. 20B illustrates four coil segments that are combined into one coil 2005. A number of such segments may be combined to form the larger coil 2000 of FIG. 20A. FIG. 20C is an exploded view 2010 of the coil 2005 of FIG. 20B. Each segment 2015, 2020, 2025, 2030 of the example coil may be a flat piece of metal formed by, for example, a stamping or etching process. The segments 2015, 2020, 2025, 2030 may be assembled in the configuration shown in FIG. 20C to form a full coil. When assembled, electrical current 2075 may flow through the coil, for example, from starting point 2035 to ending point 2070. For example, the current 2075 may begin at point 2035 and flow counter-clockwise around segment 2015 to point 2040. At point 2040, the current continues to point 2045 as points 2040 and 2045 are in electrical contact with each other when the segments are combined. From point 2045, the current 2075 flows counter-clockwise around segment 2020 to point 2050, where the current continues to point 2055 as described above. From point 2055, the current 2075 flows counter-clockwise around segment 2025 to point 2060, where the current continues to point 2065, and flows counter-clockwise around segment 2030 to point 2070.

As described above, to prevent the electrical current from straying from the above-described path, each segment may be coated with an electrically-insulating layer of material, except for the surfaces between which the current is meant to propagate, such as the top surface of point 2040 and the bottom surface of point 2045. When the coil segments are assembled in the form illustrated in FIG. 20B, fasteners, such as bolts, may be inserted through the openings of the segments. When the segments are assembled, there may remain gaps between some of the above points. To allow the fasteners to tightly secure the segments together, electrically-insulating spacers may be inserted between the points to fill the gaps.

Figure 20D:
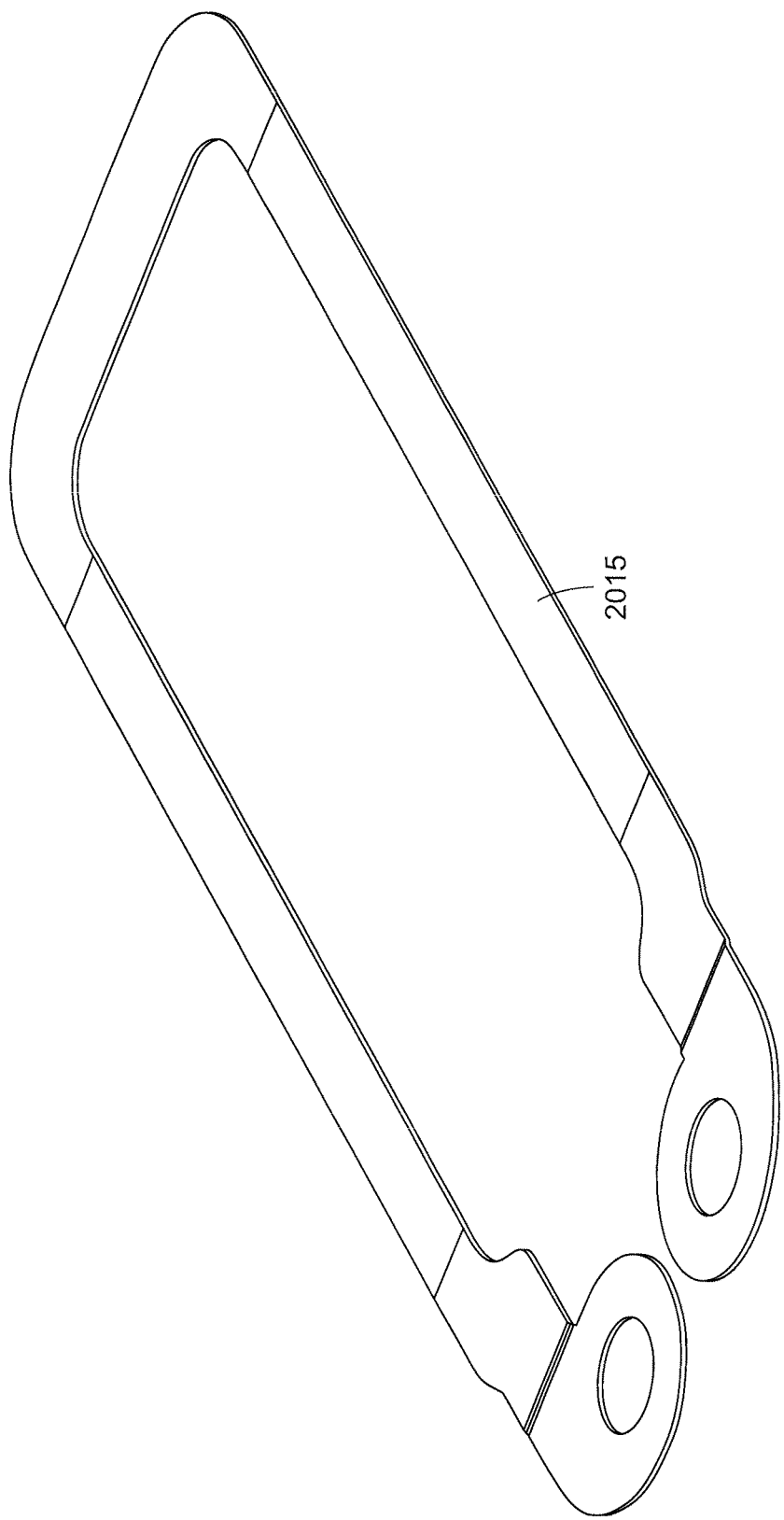
Figure 20E:
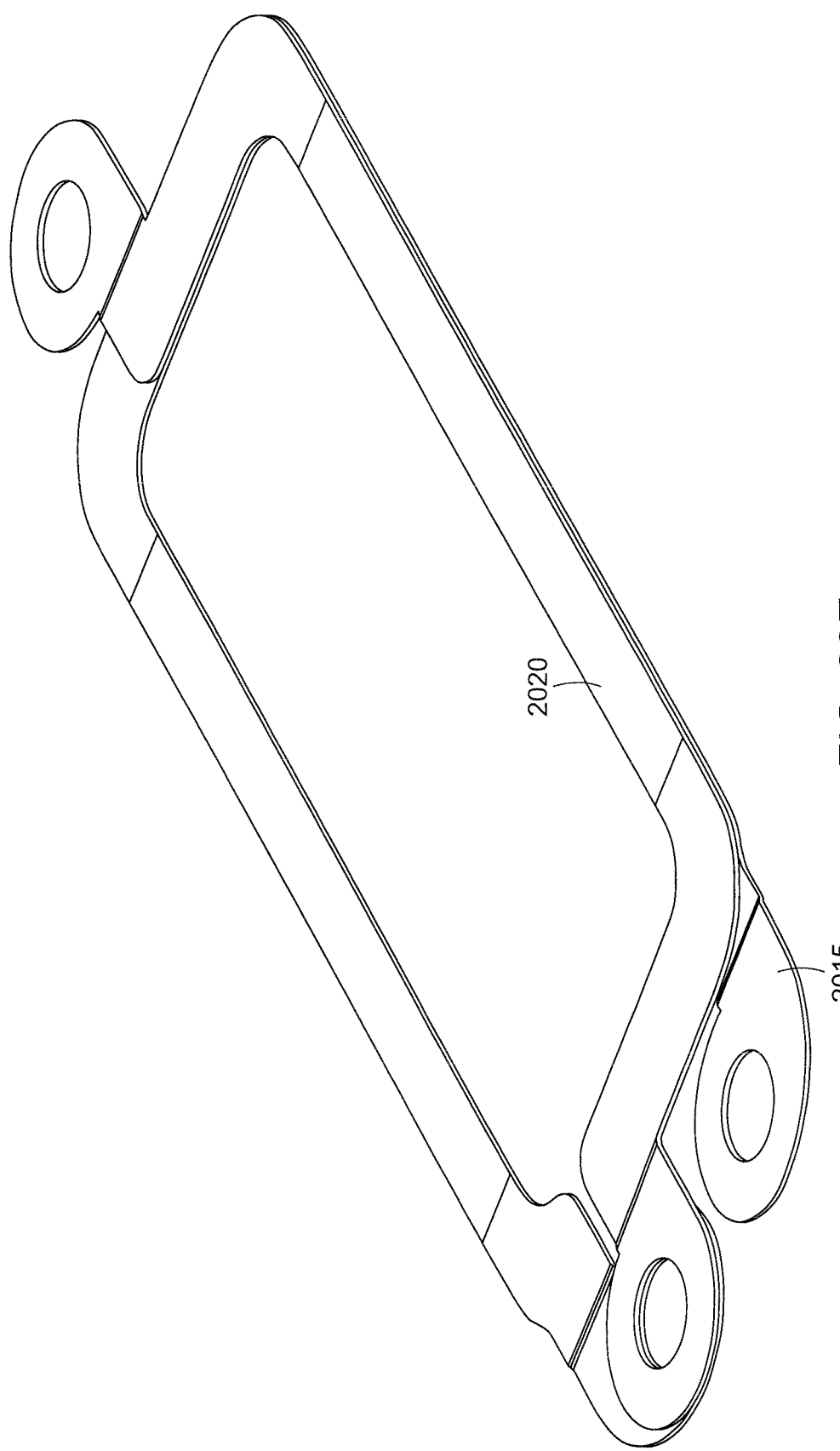
Figure 20F:
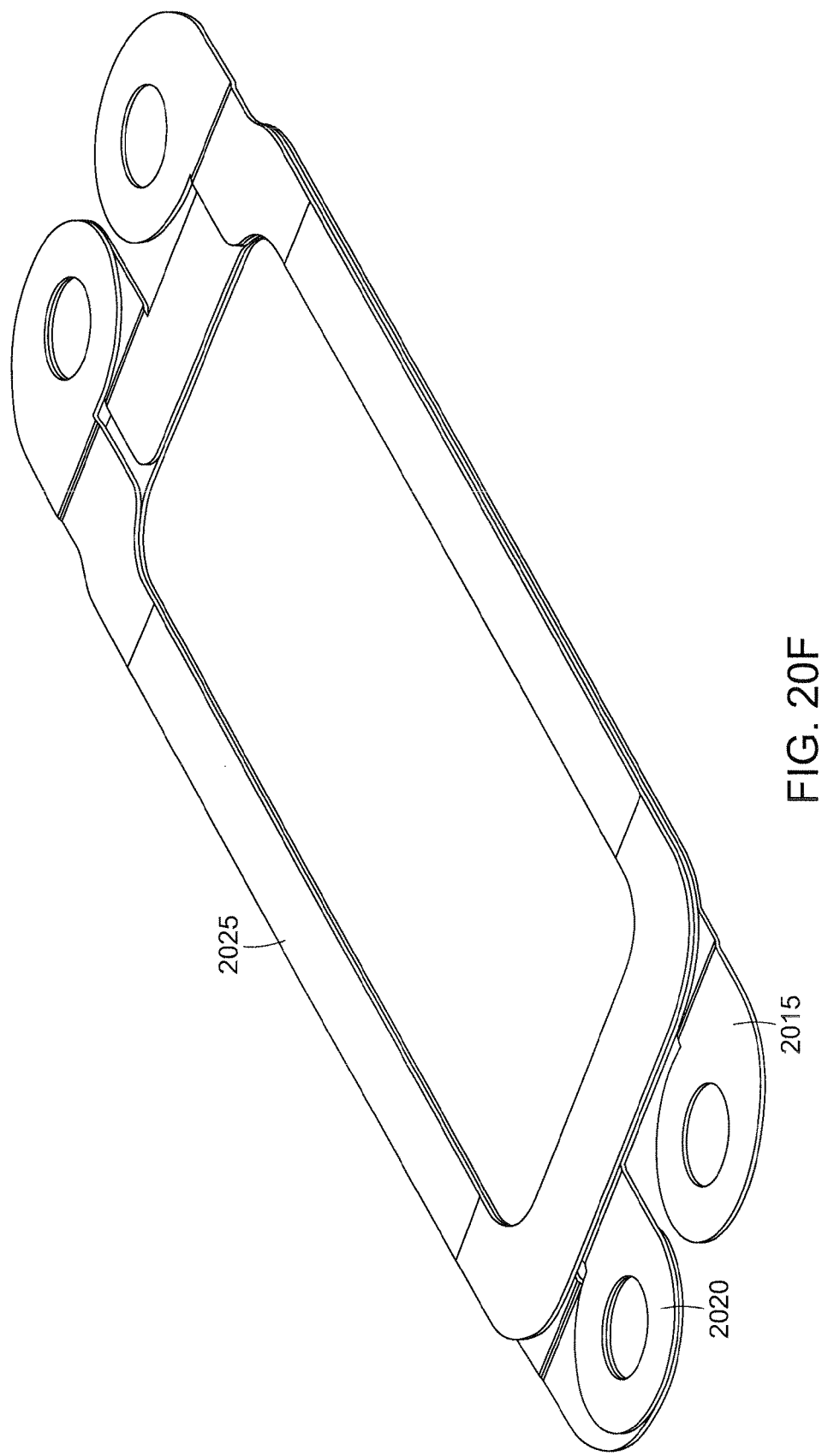
Figure 20G:
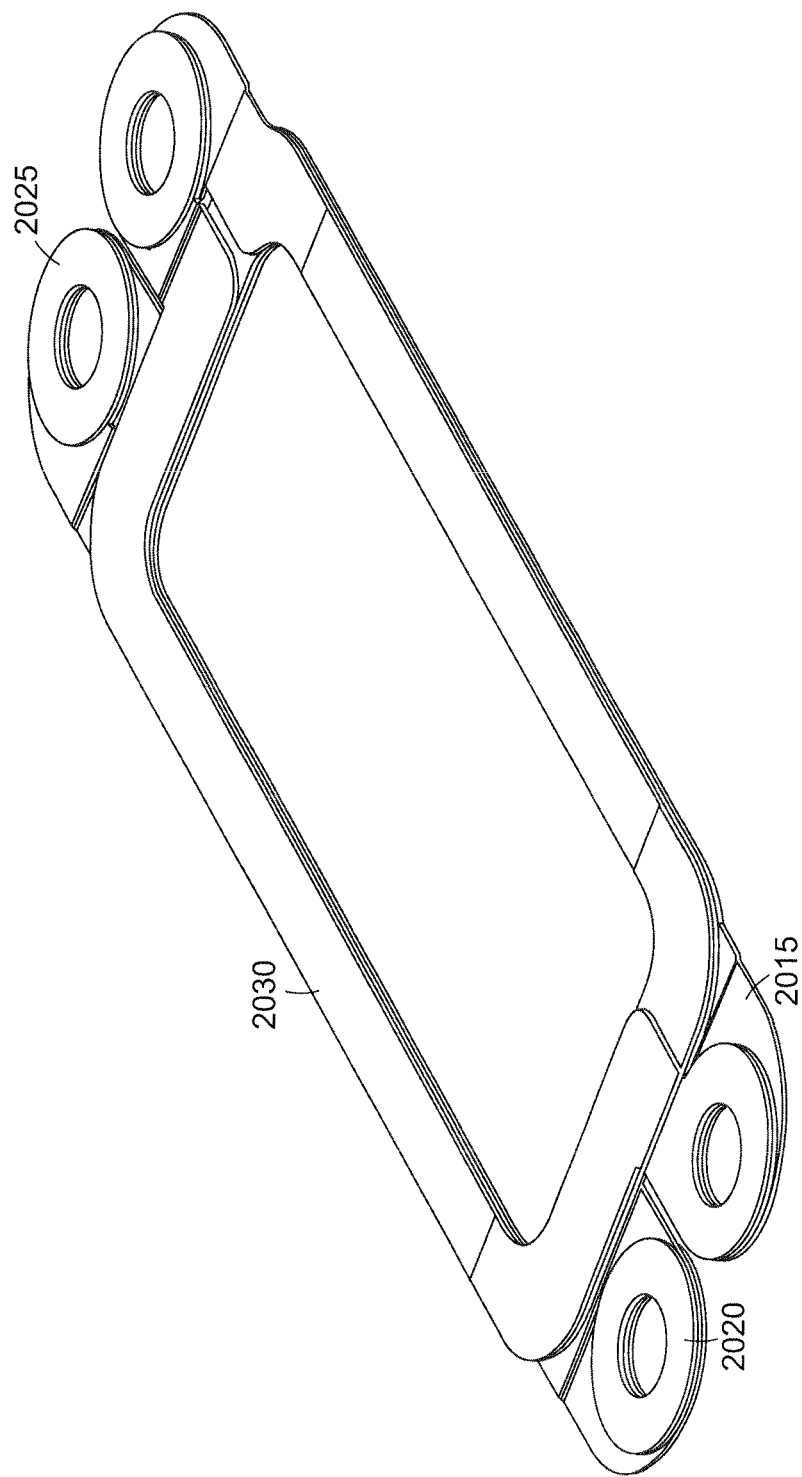

FIG. 20D shows one coil segment 2015. FIG. 20E shows a second coil segment 2020 stacked on top of segment 2015. FIG. 20E shows a third coil segment 2025 stacked on top of segments 2015 and 2020, and FIG. 20G shows a fourth coil segment 2030 stacked on top of segments 2015, 2020, and 2025, resulting in a full coil as illustrated in FIG. 20B.

Figure 21A:
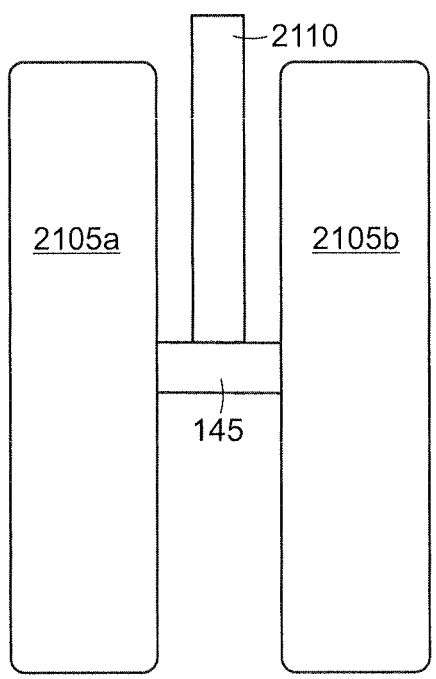
FIGS. 21A and 21B illustrate a side view and a top view of two rotary devices with respective wheels.
Figure 21B:
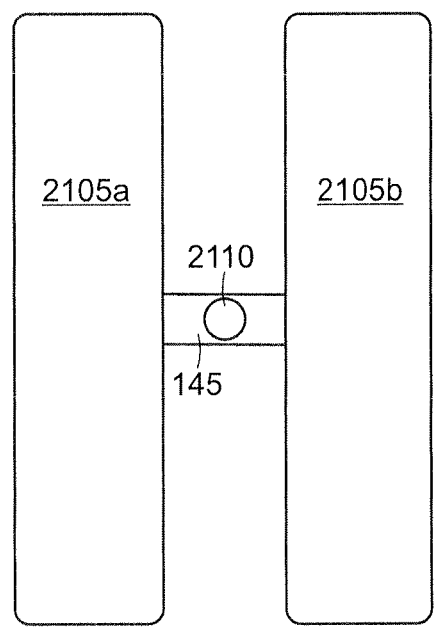

FIG. 21A illustrates a side view of two rotary devices with respective wheels 2105a, 2105b. FIG. 21B illustrates a top view of the same two devices and wheels 2105a, 2105b. The two devices are used in tandem and may be used in vehicular applications. For example, a vehicle may include four pairs of devices, one pair at each corner of the vehicle. Each device includes a magnetic stator assembly, opposed coils, and linear-to-rotary converter (hidden from view). The devices are coupled to respective wheels 2105a, 2105b and are held together with a central mounting structure 145. The mounting structure 145 may include, or be coupled to, a vertical shaft 2110 for coupling to the chassis of a vehicle. The shaft 2110 may allow rotation of the two wheels 2105a, 2105b relative to the chassis of the vehicle and about the shaft 2110.

Figure 22C:
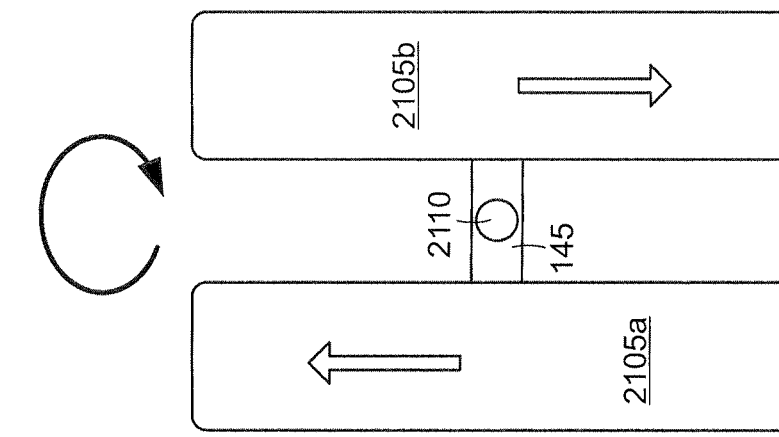
FIGS. 22A-22C illustrate various different rotations of the wheels.
Figure 22B:
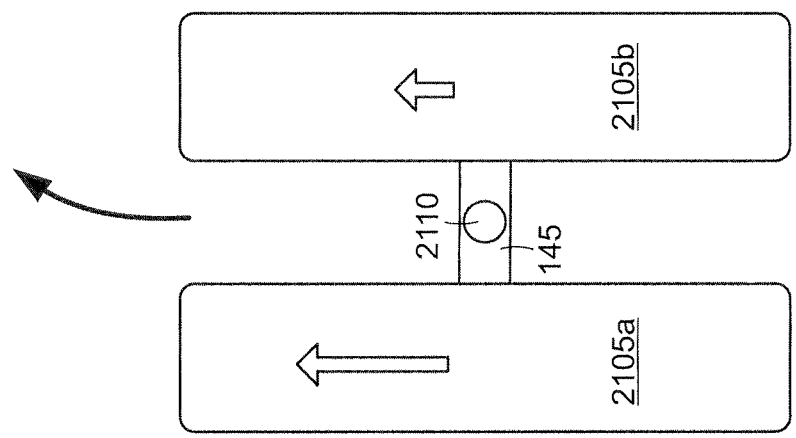
Figure 22A:
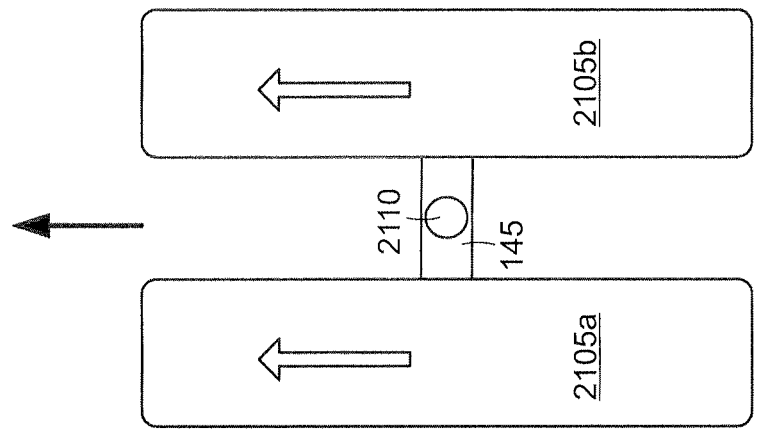

FIGS. 22A-22C illustrate example rotations of the wheels 2105a, 2105b. FIG. 22A shows that the rotary devices may create propulsion for the vehicle by causing both wheels 2105a, 2105b to rotate in the same direction. FIG. 22B shows that the rotary devices may cause the two wheels to turn with respect to the vehicle by rotating the wheels 2105a, 2105b at differential rates. The difference in wheel rotation rates creates propulsion for the vehicle and causes the vehicle to move along a curved path. FIG. 22C shows that the rotary devices may cause the two wheels to turn with respect to the vehicle by rotating the wheels 2105a, 2105b in opposite directions when the vehicle is not in motion.

Figure 23A:
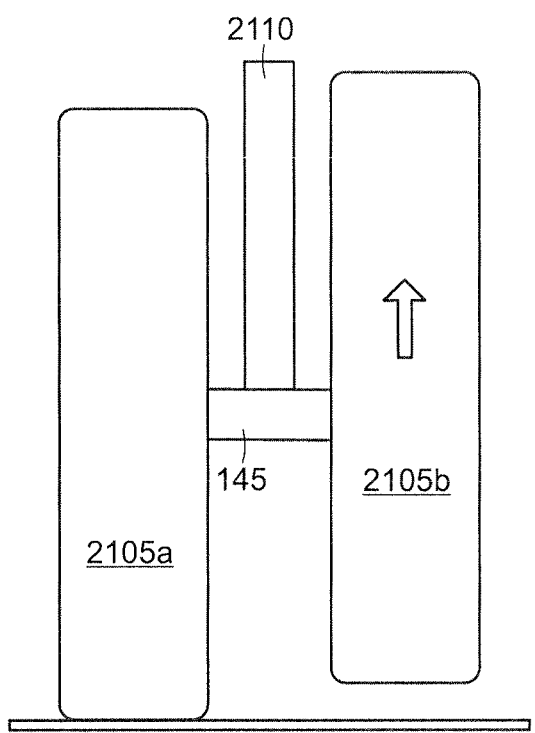
FIGS. 23A and 23B illustrate vertical movement of the wheels.
Figure 23B:
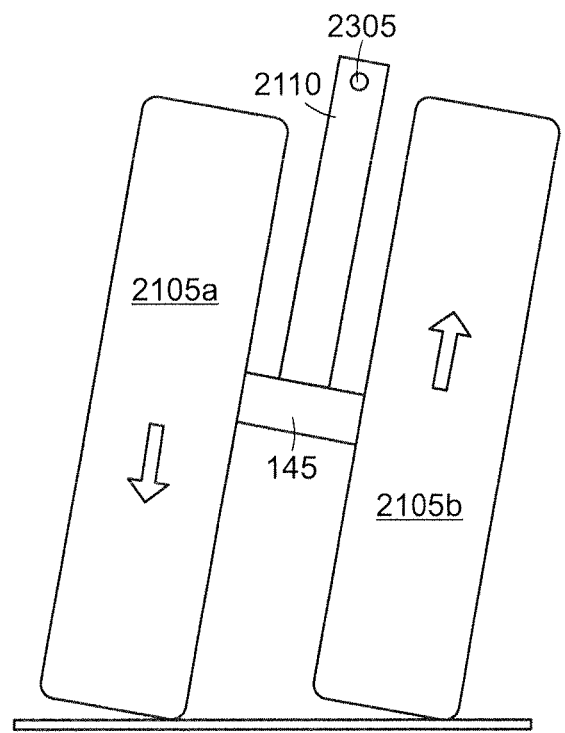

FIGS. 23A and 23B illustrate example vertical movement of the wheels 2105a, 2105b. FIG. 23A shows that one of the devices may cause its respective wheel 2105b move in a vertical direction off of the ground. The wheel 2105b may also be rapidly shook in the vertical direction to remove liquid from the surface of the wheel 1205b. Additionally, both wheels 2105a, 2105b may move up or down together to lower or raise the ride height of the vehicle. The two wheels 2105a, 2105b may even be thrust downward with sufficient force to cause the vehicle to jump. FIG. 23B shows that the shaft 2110 may be coupled to the chassis of the vehicle so as to allow for angular movement of the shaft 2110 relative to the chassis by, for example, using a pivot 2305 or similar component to couple the shaft 2110 with the chassis. In this configuration, different vertical movements of the two wheels 2105a, 2105b causes the wheels 2105a, 2105b to tilt, or camber. For example, one wheel 2105a may move downward and the other wheel 2105b may move upward, causing the wheels 2105a, 2105b, as well as the mount 145 and shaft 2110 to tilt. Alternatively, a pivot, or similar component, may be used to couple the shaft 2110 with the mount 145, causing the wheels 2105a, 2105b and the mount 145 to tilt, but not the shaft 2110.

FIGS. 24A-24F illustrate a top view of a vehicle 2405 having four pairs of rotary devices with respective pairs of wheels 2410a-d. FIG. 24A shows the vehicle 2405 with four pairs of rotary devices and respective wheels 2410a-d, one pair at each corner of the vehicle 2405. The vehicle may also be configured with different wheel arrangements, such as two pairs of rotary devices and respective wheels at the front corners of the vehicle. In such an arrangement, the wheels at the rear corners of the vehicle may be conventional vehicle wheels. As shown in FIG. 24A, all of the wheel pairs 2410a-d may be oriented in the forward direction to provide forward propulsion for the vehicle. FIG. 24B shows that the two front pairs of wheels 2410a, 2410b may be turned to the right, for example, to cause the moving vehicle 2405 to turn to the right. FIG. 24C shows that the rear pairs of wheels 2410c, 2410d may be turned in a complimentary direction, for example, to the left, to improve the turning radius of the vehicle 2405. FIG. 24D shows that each of the wheel pairs 2410a-d may be oriented in a direction that is tangential to a circular path to cause the vehicle 2405 to rotate about its center. FIG. 24E shows that each of the wheel pairs 2410a-d may be oriented in the same direction, other than the forward direction, to cause the vehicle 2405 to move, for example, diagonally or sideways. FIG. 24F shows that each of the wheel pairs 2410a-d may be pointed toward, or away from, the center of the vehicle to prevent any movement of the vehicle, obviating the need for a parking brake. The independent movements of each wheel may be controlled by a respective electrical unit 410 (FIG. 4B) and all movements may be coordinated by a central controller 430 (FIG. 4B) in communication with the electrical units.

While this invention has been particularly shown and described with references to example embodiments thereof, it will be understood by those skilled in the art that various changes in form and details may be made therein without departing from the scope of the invention encompassed by the appended claims. For example, in addition to being used in a motor vehicle, the disclosed devices may also be used in trains, planes, robots, and force-reflecting human interfaces.

What is claimed is:

1. An electric coil assembly comprising:
a plurality of electrically conducting coil segments stacked together and electrically connected in series to form an electric coil, each coil segment having a first hole located at one end and a second hole located at a second end, the coil segments being directly electrically connected end-to-end, the holes of the connected ends of adjacent coil segments being aligned with each other to form aligned holes; and
a plurality of fasteners extending through the aligned holes of the coil segments of the electric coil, wherein at least one of the fasteners passes through aligned holes of multiple pairs of electrically connected adjacent coil segments of the electric coil and the fasteners do not provide an electrically conductive path between any of the coil segments of the electric coil.

2. The electric coil assembly of claim 1, wherein the coil segments are U-shaped and each is rotated 90 degrees with respect to the coil segment it follows.

3. The electric coil assembly of claim 1, wherein all sides of a coil segment are equal lengths.

4. The electric coil assembly of claim 1, wherein adjacent sides of a coil segment are different lengths and opposite sides of the coil segment are equal lengths.

5. The electric coil assembly of claim 1, further including electrically-insulating material on portions of the coil segments.

6. The electric coil assembly of claim 5 wherein all surfaces of the coil segments are coated with an electrically-insulating layer of material except for the top surface of a finishing end of a lower coil segment and the bottom surface of a starting end of an immediately upper coil segment.

7. The electric coil assembly of claim 1, further including electrically-insulating spacers located in gaps between ends of nonadjacent, insulated coil segments.

8. The electric coil assembly of claim 1, wherein the coil segments of the plurality of coil segments are flat coil segments.

9. The electric coil assembly of claim 1, wherein each of the plurality of fasteners has a non-conductive surface so that none of the fasteners has an electrical connection to any of the coil segments.

10. The electric coil assembly of claim 1, wherein all of the coil segments among the plurality of coil segments have the same shape.

11. The electric coil assembly of claim 1, wherein the plurality of fasteners comprise four rods.

12. The electric coil assembly of claim 11, wherein the rods are parallel to each other and are positioned to form a rectangular array.

13. The electric coil assembly of claim 1, wherein the fasteners are bolts which tightly secure the coil segments together.

14. The electric coil assembly of claim 1, wherein the coil segments are arranged in a repeating pattern and the fasteners extend through aligned holes of a full stack of coil segments.

15. The electric coil assembly of claim 14, wherein the fasteners are bolts which tightly secure the coil segments together.

16. An electric coil assembly comprising:
a plurality of electrically conducting coil segments stacked together and electrically coupled in series to form an electric coil, each coil segment having a first hole located at one end and a second hole located at a second end, the coil segments being directly electrically connected end-to-end, the holes of the connected ends being aligned with each other to form aligned holes; and
a plurality of fasteners extending through the aligned holes of the coil segments of the electric coil, wherein the fasteners do not provide an electrically conductive path between any of the coil segments of the electric coil.

17. The electric coil assembly of claim 16, wherein the coil segments of the plurality of coil segments are flat coil segments.

18. The electric coil assembly of claim 16, wherein each of the plurality of fasteners has a non-conductive surface so that none of the fasteners has an electrical connection to any of the coil segments.

19. The electric coil assembly of claim 16, wherein all of the coil segments among the plurality of coil segments have the same shape.

20. The electric coil assembly of claim 16, wherein the plurality of fasteners comprise four rods.

21. The electric coil assembly of claim 20, wherein the rods are parallel to each other and are positioned to form a rectangular array.

22. The electric coil assembly of claim 16, wherein the fasteners are bolts which tightly secure the coil segments together.

23. The electric coil assembly of claim 16, wherein the coil segments are arranged in a repeating pattern and the fasteners extend through aligned holes of a full stack of coil segments.

24. The electric coil assembly of claim 23, wherein the fasteners are bolts which tightly secure the coil segments together.

25. The electric coil assembly of claim 16, wherein each of the plurality of fasteners has a non-conductive outer portion so that none of the fasteners has an electrical connection to any of the coil segments.

* * * * *